(12) United States Patent
Menezo

(10) Patent No.: US 7,502,120 B2
(45) Date of Patent: Mar. 10, 2009

(54) FIBER OPTIC INTERFEROMETRIC SENSOR ARRAY

(75) Inventor: Sylvie Menezo, Nantes (FR)

(73) Assignee: Sercel, Carquefou (FR)

( * ) Notice: Subject to any disclaimer, the term of this patent is extended or adjusted under 35 U.S.C. 154(b) by 246 days.

(21) Appl. No.: 11/301,255

(22) Filed: Dec. 13, 2005

(65) Prior Publication Data
US 2007/0024857 A1 Feb. 1, 2007

(30) Foreign Application Priority Data
Jul. 28, 2005 (FR) .................... 05 08067

(51) Int. Cl.
G01B 9/02 (2006.01)
G02B 6/00 (2006.01)
(52) U.S. Cl. ........................ 356/478; 385/12
(58) Field of Classification Search .............. 356/478; 385/12; 250/227.19, 227.27
See application file for complete search history.

(56) References Cited
U.S. PATENT DOCUMENTS

| | | | | |
|---|---|---|---|---|
| 5,361,130 A | * | 11/1994 | Kersey et al. | 356/478 |
| 5,408,091 A | * | 4/1995 | Perraud et al. | 250/227.18 |
| 5,498,867 A | * | 3/1996 | Senuma et al. | 250/231.18 |
| 5,696,857 A | | 12/1997 | Frederick | |
| 5,929,990 A | * | 7/1999 | Hall | 356/519 |
| 5,987,197 A | | 11/1999 | Kersey | |
| 5,991,026 A | * | 11/1999 | Kluth et al. | 356/478 |
| 6,084,233 A | * | 7/2000 | Hodgson et al. | 250/227.14 |

(Continued)

FOREIGN PATENT DOCUMENTS

WO WO 00/62021 A1 10/2000

OTHER PUBLICATIONS

Brooks et al., "Fiber-optic interferometric sensor arrays with freedom from source phase-induced noise," Optics Letters, Jul. 1986, vol. 11, No. 7, pp. 473-475.

(Continued)

Primary Examiner—Patrick J Connolly
(74) Attorney, Agent, or Firm—Law Office of Tim Cook P.C.

(57) ABSTRACT

The invention relates to an apparatus for multiplexing Fiber Optic Interferometric Sensors (FOISs), which apparatus comprises means (1) forming the an optical source for providing m*n distinct wavelengths $\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn}$, the optical source including means for generating m groups (111, 112, ..., 11m) of light pulses, each group 11j ($1 \leq j \leq m$) being made up of n light pulses $P_k(\lambda_{j1}), P_k(\lambda_{j2}), \ldots, P_k(\lambda_{jn})$ of distinct wavelengths $\lambda_{j1}, \lambda_{j2}, \ldots, \lambda_{jn}$, the n light pulses $P_k(\lambda_{j1}), P_k(\lambda_{j2}), \ldots, P_{k(\lambda jn)}$ being time delayed one from another, Fiber Optic Interferometric Sensors distributed in m groups (51, 52, ..., 5m) of n sensors each, then sensors of a same group being located at the same point and set into a star like arrangement around the input point of the group, and each of the n sensors of a same group 5j, $1 \leq j \leq m$, being associated with wavelength selective means so that it is interrogated by one light pulse only among the pulses $P_k(\lambda_{j1}), P_k(\lambda_{j2}), \ldots, P_k(\lambda_{jn})$ of distinct wavelengths respectively $\lambda_{j1}, \lambda_{j2}, \ldots, \lambda_{jn}$.

34 Claims, 34 Drawing Sheets

U.S. PATENT DOCUMENTS

| | | | |
|---|---|---|---|
| 6,122,305 A * | 9/2000 | Putnam et al. | 372/94 |
| 6,212,306 B1 * | 4/2001 | Cooper et al. | 385/12 |
| 6,282,334 B1 * | 8/2001 | Hodgson et al. | 385/12 |
| 6,365,891 B1 * | 4/2002 | Hodgson et al. | 250/227.14 |
| 6,591,025 B1 | 7/2003 | Siems et al. | |
| 6,678,211 B2 * | 1/2004 | Vakoc | 367/149 |
| 6,856,401 B1 * | 2/2005 | Ronnekleiv | 356/477 |
| 7,157,693 B2 * | 1/2007 | Thingbo et al. | 250/227.18 |
| 2005/0088660 A1 * | 4/2005 | Ronnekleiv | 356/478 |
| 2005/0271395 A1 * | 12/2005 | Waagaard et al. | 398/189 |
| 2006/0152733 A1 * | 7/2006 | Waagaard | 356/478 |
| 2006/0181711 A1 * | 8/2006 | Waagaard et al. | 356/478 |
| 2007/0019201 A1 * | 1/2007 | Waagaard et al. | 356/478 |

OTHER PUBLICATIONS

Crickmore et al., "Remotely pumped and interrogated 96 channel fibre-optic hydrophone array," Optical Fiber Sensor Conf. 16, Nov. 2003, pp. 760-763.

* cited by examiner

FIBER OPTIC INTERFEROMETRIC SENSOR ARRAY

The invention is related to a Fiber Optic Interferometric Sensor (FOIS) array implementing wavelength and time division multiplexing.

The invention can be dedicated to seismic sensing applications where the sensor arrays are made of several receiver points located at different places; each receiver point may contain several sensors. Nevertheless the invention is not limited to seismic sensing applications and can be dedicated to any sensing applications involving an array of FOISs spread into groups of sensors.

Some external perturbations applied on an optical fiber length (pressure variations, temperature variations, vibrations, . . . ) cause the fiber length and index of refraction to change, leading to a change of the time propagation (or phase) of the light field propagating in the fiber. An FOIS is commonly made of two fibers : at its entrance, the light is divided into two optical fields:

the optical field propagating in a fiber length submitted to the perturbation to measure (an acoustic signal for example) : this fiber length forms the sensing part of the FOIS, the optical field propagating in a fiber length isolated from the perturbation: this fiber forms the reference fiber of the FOIS.

When the FOIS is submitted to an external perturbation, the difference in time propagation, through the FOIS, of the two optical fields will change. This change in time propagation (or phase) difference is representative of the external perturbation applied on the sensing part of the FOIS.

An FOIS interrogating system ensures the dynamic reading of the phase difference between two optical fields. It is made of an optical source providing the light, a telemetry fiber bringing the light to the FOIS, a return fiber bringing the light from the FOIS to the photo-detector on which the combination of the two optical fields leads to an interferometric signal bearing the information on the phase difference between the two optical fields, and an electronic demodulation system computing the phase difference from the photo-detector output interferometric signal. In order to increase the FOIS sensitivity to the measurand, that is to say the change in phase, involved by the measurand, of the optical field propagating in the sensing arm of the FOIS, the sensing fiber length can be packaged on an external body bringing measurand amplification. In the next sections the sensing part of the FOIS will be denominated the 'sensor'.

In some applications, the sensors involved in an array can be as many as a few thousands. The decision to go for such arrays mainly depends on their cost and reliability.

In a FOIS array, the interrogating system is ideally shared between several FOIS so as to reduce the array cost: the optical source, the telemetry and return fibers, the photo-detector, and the electronic demodulation system can interrogate many FOISs. A FOIS array is thus made of one or more optical sources, of which light is guided to a group of FOISs. Each FOIS locally brings its information on the optical field that goes through it. The return fiber brings the modified optical fields to one or more photo-detectors. The interferometric signals from the different FOISs then need to be separated or demultiplexed. Demultiplexing of the interferometric signals is achieved by separating the optical fields associated with each FOIS:

The optical fields can be separated in the time domain if each optical field associated with an FOIS occupies a different time window: Time Division Multiplexing (TDM) is thus achieved.

The optical fields can be separated in the wavelength domain if each optical field associated with an FOIS has a different wavelength: Wavelength Division Multiplexing (WDM) is thus achieved.

A combination of TDM and WDM techniques can be implemented.

Several systems were demonstrated to arrange FOIS in arrays. Among them, an implementation of the Time Division Multiplexing (TDM) technique is widely employed. It is based on a scheme illustrated by FIG. 1 and using a reference interferometer associated with the fiber optic sensing interferometer (the FOIS). Referring to FIG. 1, the system 10 is made of an optical source 100 of which light is coupled in an optical fiber 170, an optical switch 120 generating a light pulse P from the continuous wave light emitted by the optical source 100, a reference interferometer 130 isolated from the signal to measure, a fiber optic sensing interferometer 140 forming the FOIS, and a photo-detector 70. The light pulse P is lead to the reference interferometer 130 by the optical fiber 170. The reference interferometer 130 is made of two fiber arms forming two optical paths $130_a$ and $130_b$ of difference D. The optical path $130_a$ comprises means $13_1$ capable of phase modulating the optical field that goes through it so as to generate a carrier frequency for the signal to measure. Several techniques are employed in the state of the art, among which one which integrates an Acoustic Optic Modulator (AOM) as means $13_1$: the AOM shifts the optical carrier frequency of a light propagating through it by a frequency fc (characteristic of the AOM), fc~30 MHz. At the output of the reference interferometer 130, the pulse P gives rise to two optical pulses $P_a$ and $P_b$, delayed one from another by a time t(D) corresponding to the time propagation of light through the optical path difference D. Pa and Pb pulses are then guided to the fiber optic sensing interferometer 140. The FOIS 140 is made of two fiber arms forming two optical paths $140_a$ and $140_b$ of difference D' very closed to D. The optical path $140_b$ is submitted to an external perturbation M that modifies it, and thus modifies the phase of an optical field that goes through it. The optical path $140_a$ is isolated from the external perturbation M. At the exit of the FOIS 140, two pulse couples are rose up: $[P_{a,a}, P_{b,a}]$ and $[P_{a,b}$ et $P_{b,b}]$. The pulses $P_{a,a}$ and $P_{b,a}$ respectively result from the pulses $P_a$ and $P_b$ that traveled through the short optical path $140_a$ of the FOIS 140. The pulses $P_{a,b}$ and $P_{b,b}$ respectively result from the pulses $P_a$ and $P_b$ that traveled through the long optical path $140_b$ that sees the influence of the external perturbation M. Thus the two pulse couples $[P_{a,a}, P_{b,a}]$ and $[P_{a,b}$ et $P_{b,b}]$ are delayed one from another by a time t(D') corresponding to the time propagation of light through the optical path difference D'; and the two pulses of each couple are delayed one from another by a time t(D) corresponding to the time propagation of light through the optical path difference D. The times t(D) and t(D') being very closed, the two light pulses $P_{a,b}$ (that saw the external perturbation influence M) and $P_{b,a}$ (isolated from the external perturbation M) are synchronized and the two optical fields can interfere on the photo-detector 70. Their interfering signal gives information on their phase difference, and consequently on the external perturbation M.

It can be noticed that the reference interferometer 130 can be either placed before or after the sensing interferometer 140.

As an example, the document <<Fiber interferometric sensor arrays with freedom from source phase induced noise>> in <<Optics Letters>>, vol. 11, July 1986, n° 7, pp. 473-475 (denominated Document D1) presents a Time Division Multiplexing Technique based on the measurement principle described above. FIG. 2a illustrates the implemented TDM technique; it includes an optical source 100, an optical switch 120 generating a light pulse P in a telemetry fiber 170a, a reference interferometer 130 comprising means $13_1$ capable of phase modulating the optical field that goes through it, and a photo-detector 70. The light pulse P is lead by the telemetry fiber 170a to a group of n FOISs (Mach Zender interferometers) 141, 142, ..., 14n. The reference interferometer 130 is here placed after the FOISs. Each of the FOIS 141, 142, ..., 14n respectively comprises a short optical path 141a, 142a, ..., 14n and a long optical path 141b, 142b, ..., 14n forming the sensing part of the interferometer. The optical path difference between the short and long paths (141a, 141b), (142a, 142b), ..., (14na, 14nb) of each FOIS 141, 142, ..., 14n is equal to D' and is very closed to the optical path difference D between the short and long paths 130a and 130b of the reference interferometer 130. The interrogation of each FOIS 141, 142, ..., 14n is then based on the principle of interrogation of one FOIS as described above by FIG. 1. Indeed the light pulse P at the entrance of the fiber optic coupler 161a gives rise at its exit to two pulses $P_1$ and $P'_1$, $P_1$ being lead to the interferometric sensor 141, and $P'_1$ being lead to the fiber optic coupler 162a. The pulse $P'_1$ gives rise to two pulses, $P_2$ and $P'_2$, at the exit of the fiber optic coupler 162a, $P_2$ being lead to the interferometric sensor 142, and $P'_2$ being lead to the fiber optic coupler 163a. And so on, the pulse $P'_{n-2}$ at the entrance of the fiber optic coupler 16(n–1)a gives rise at its output to two pulses $P'_{n-1}=P_n$ and $P_{n-1}$, $P_{n-1}$ being lead to the sensing interferometer 14(n–1), and $P'_{n-1}=P_n$ being lead to the sensing interferometer 14n. The n pulses $P_1$, $P_2$, ..., $P_n$ respectively formed at the entrance of the n FOISs 141, 142, ..., 14n can thus interrogate respectively the n FOISs 141, 142, ..., 14n the same way as described above in the method illustrated by FIG. 1 for one pulse interrogating one FOIS. The pulses coming out from each FOIS 141, 142, ..., 14n are then coupled in the return fiber 170b, respectively by the fiber optic couplers 161b, 162b, ..., 16(n–1)b, and are then lead to the reference interferometer 130. At the exit of each n couple (FOIS 141, reference interferometer 130), (FOIS 142, reference interferometer 130), ..., (FOIS 14n, reference interferometer 130), the n pulses $P_1$, $P_2$, $P_3$, ..., $P_n$ give rise to n interferometric signals on the photo-detector. In addition, the (n–1) fiber sections 171, 172, ..., 17(n–1) added in between each fiber optic coupler 161a, 162a, ... and 16(n–1)a, that is to say in between each FOIS 141, 142, ..., 14n ensure that the pulses $P_1$, $P_2$, $P_3$, ..., $P_n$ are time delayed one from another at the entrance of the FOISs. The n interferometric signals resulting from the n FOISs 141, 142, ..., 14n are thus time delayed one from another on the photo-detector 70 and can be time gated. The (n–1) fiber optic sections 171, 172, ..., 17n must be of accurate length so that the n pulses bearing the interferometric signals from the n FOISs don't overlap on the photo-detector 70. More precisely, the optical paths formed by the fiber optic sections 171, 172, ..., 17(n–1) added in between the FOISs 141, 142, ..., 14n are here made equal to D", D" being very closed to the optical path difference D in the reference interferometer 130, and consequently very closed to the optical path difference D' in each FOIS 141, 142, ..., 14n. The n pulses carrying the interferometric signals from the n FOISs are thus time delayed by t(D") corresponding to the time propagation by the light through the optical path D" (t(D")~t(D)~t(D')).

It is obvious that the TDM FOIS interrogating system illustrated by FIG. 2a requires to add some fiber optic sections of accurate lengths, in between each FOIS.

FIG. 2b shows another implementation of this TDM technique, in which the Mach Zender FOISs 141, 142, ..., 14n of FIG. 2a are replaced by Michelson FOISs. The light pulse P, at the output of the optical switch 120 is lead by the optical fiber 170 to a circulator 160, and then lead by the telemetry fiber 170 a to an array of n Michelson FOISs 141, 142, ..., 14n. In accordance with FIG. 2a, n pulses $P_1$, $P_2$, $P_3$, ..., $P_n$ time delayed one from another, are respectively formed at the entrance of the n Michelson FOISs 141, 142, ..., 14n. Each FOIS 141, 142, ..., 14n comprises a short optical path, respectively 141a, 142a, ..., 14na terminated by a mirror 54, and a long optical path, respectively 141b, 142b, ..., 14nb (forming the sensing part of the FOIS) terminated by a mirror 54. The round trip difference between the short and long optical paths (141a, 141b), (142a, 142b), ..., (14na, 14nb) of FOIS 141, 142, ..., 14n is equal to D' and is very closed to the optical path difference D in the reference interferometer 130. The light pulses $P_1$, $P_2$, $P_3$, ..., $P_n$ respectively formed at the entrance of the n FOISs 141, 142, ..., 14n respectively interrogate the FOIS 141, 142, ..., 14n the same way as described above. After reflection on the mirrors 54, the light pulses coming out from each FOIS 141, 142, ..., 14nare coupled back in the optical fiber 170a by the fiber optic couplers respectively 161a, 162a, 16(n–1)a, and lead by the circulator 160 to the return fiber 170b, and the reference interferometer 130. At the exit of each n couple (FOIS 141, reference interferometer 130), (FOIS 142, reference interferometer 130), ..., (FOIS 14n, reference interferometer 130), the n pulses $P_1$, $P_2$, $P_3$, ..., $P_n$ give rise to n interferometric time delayed signals on the photo-detector 70. Each pulse carrying the interferometric signal of each FOIS can thus be separately time gated. As the TDM FOIS interrogating system illustrated by FIG. 2a, the system illustrated by FIG. 2b, requires to add (n–1) fiber optic sections 171, 172, ..., 17n–1 of accurate lengths, in between each FOIS 141, 142, ..., 14n. The (n–1) fiber optic sections each forms an optical path D"/2 (that is to say a D" round trip optical path).

FIG. 2c shows a third implementation of this TDM technique, in which the FOISs 141, 142, ..., 14n are Michelson interferometers, and in which the (n–1) fiber optic sections 171, 172, ..., 17(n–1) of FIG. 2a or 2b ensuring the time delays between the interference pulses on photo-detector 70 are suppressed. The time delays between the n interference pulses from FOIS 141, 142, ..., 14nare ensured respectively by the fiber optic sections 141b, 142b, ..., 14(n–1)b forming the sensing long arm of the FOIS 141, 142, ..., 14(n–1). FOIS 141, 142, ..., 14(n–1) comprises a short optical path, respectively 141a, 142a, ..., 14na terminated by a mirror 54 and a long optical path, respectively (141b+142a), (142b+143a), ..., (14(n–1)b+14na), 14nb terminated by a mirror 54. The round trip difference between the short and long optical paths (141a, 141b+142a), (142a, 142b+143a), ..., (14(n–1) a, 14(n–1)b+14na), (14na, 14nb) in the FOIS 141, 142, ..., 14n is equal to D', and is very closed to the optical path difference D in the reference interferometer 130. In this specific way of implementation no fiber optic sections needs to be added in between each FOIS, but the X-talk phenomenon between the sensors becomes significant since the pulse $P_{i+1}$ entering FOIS 14(i+1), ($1 \leq i \leq n-1$) is guided by the fiber section 14ib forming the sensing part of FOIS 14i. The interferometric signal of FOIS 14(i+1) is thus marked, to some extent, by the FOIS 14i response. In addition to this, if the fiber optic section 14ib forming the sensing part of FOIS 14i is cut (which is likely to happen since this section can be highly stressed), one losses all the FOISs following FOIS 14i on the telemetry fiber.

To sum up, the techniques implementing Time Division Multiplexing, have the drawbacks that they:

Either require to add a number of fiber sections of accurate lengths in between each FOIS (FIGS. 2a et 2b); the number of added fiber sections is equal to the number of multiplexed FOISs.

Either lead to arrays with poor X-talk performances between the multiplexed sensors, and reduced reliability (FIG. 2c).

The Time Division Multiplexing technique presented by document D1 can be combined with a Wavelength Division Multiplexing technique: the document <<Remotely pumped and interrogated 96 channel fiber optic hydrophone array>>, published in <<Optical Fiber Sensor Conference 16>>, November 2003, pp 760-763 (referred below as document D2) describes an implementation of combined TDM and WDM techniques. Referring to FIG. 3, the lights emitted by six optical sources 101, 102, . . . , 106 of different wavelengths respectively $\lambda 1, \lambda 2, \ldots, \lambda 6$ are multiplexed on a telemetry fiber 170 by a wavelength multiplexer 107a. An optical switch 120 periodically generates a light pulse containing the lights of different wavelengths $\lambda 1, \lambda 2, \ldots, \lambda 6$. The light pulse is lead to a reference interferometer 130 (identical to the one described in FIGS. 1 and 2). The light of wavelength $\lambda 1$ (respectively $\lambda 2, \ldots, \lambda 6$) is extracted from the telemetry fiber 170 by the optical component 121a (respectively 122a, . . . , 126a); the pulse $P(\lambda_1)$ (respectively $P(\lambda_2), \ldots, P(\lambda_6)$) is then lead to the sub-array 121 (respectively 122, . . . , 126) containing 16 FOISs. In each sub-array 121, 122, . . . , 126, the 16 FOISs are TDM multiplexed as described by document D1. At the output of sub-array 121 (respectively 122, . . . , 126), the light of wavelength $\lambda 1$ (respectively $\lambda 2, \ldots, \lambda 6$) that carries the 121 sub-array FOIS responses (respectively 122, . . . , 126) is inserted on the return fiber 171 by the component 121b (respectively 122b, . . . , 126b). The return fiber is terminated by a wavelength demultiplexer 107b that separates the lights of different wavelengths $\lambda 1, \lambda 2, \ldots, \lambda 6$. Each wavelength $\lambda 1, \lambda 2, \ldots, \lambda 6$ is lead to its photo-detector, respectively 71, 72, . . . , 76. On photo-detector 71 (respectively 72, . . . , 76) the 16 pulses carrying the interferometric signals from the 16 FOISs of sub-array 121 (respectively 122, . . . , 126) are time delayed one from another and can be time gated for demultiplexing. The combination of TDM and WDM techniques makes for higher multiplexing density. Nevertheless, as pointed out in Document D1, the TDM technique implemented in Document D2 (identical to that implemented in Document D1), has the drawbacks that, in each sub-array 121, 122, . . . , 126:

It either requires to add a number of fiber sections of accurate lengths in between each FOIS (FIGS. 2a et 2b); the number of added fiber sections is equal to the number of multiplexed FOISs.

It either leads to arrays with poor X-talk performances between the multiplexed sensors, and reduced reliability (FIG. 2c).

Seismic applications require that the sensors are located at specific places in the array. Also ease of fabrication of the array, reliability and low X-talk between sensors are great benefits.

For seismic applications such as <<Deep Ocean Bottom Cable>> (DOBC), the arrays are made of several Receiver Points (RP), called nodes, distinct one from another and geographically spaced by a given distance. Each node comprises four sensors geographically located at the same point; the four sensors, one hydrophone and three geophones, form a Receiver Point or measurement node. The X-talk level required between the four sensors is very low (<-50 dB).

For such applications, the systems proposed by Documents D1, D2 and D3, and more generally in the state of the art, show some drawbacks among which the fabrication constraints (need to add some fiber sections of accurate length in between each sensor, some sensors being located at the same point), poor X-talk performances and reduced reliability.

The present invention is aimed at getting rid of the drawbacks, mentioned above, involved when multiplexing FOISS. More specifically, its objectives are:

To get rid of the fabrication constraints to add fiber sections of accurate length in between each Fiber Optic Interferometric Sensor (FOIS) to interrogate (whether the sensors are located at the same node or not).

To keep X-talk and reliability performances.

The invention concerns an apparatus for multiplexing Fiber Optic Interferometric Sensors (FOISs), which apparatus comprises:

means forming the optical source for providing m*n distinct wavelengths $\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn}$, which means comprise other means for generating m groups of light pulses, each group 11j ($1 \leq j \leq m$) being made up of n light pulses $P_k(\lambda_{j1}), P_k(\lambda_{j2}), \ldots, P_k(\lambda_{jn})$ of distinct wavelengths $\lambda_{j1}, \lambda_{j2}, \ldots, \lambda_{jn}$, the n light pulses $P_k(\lambda_{j1}), P_k(\lambda_{j2}), \ldots, P_k(\lambda_{jn})$ being time delayed one from another, Fiber Optic Interferometric Sensors distributed in m groups of n sensors each, the n sensors of a same group being located at the same point and set into a star like arrangement around the input point of the group, and each of the n sensors of a same group 5j, $1 \leq j \leq m$, being associated with wavelength selective means so that it is interrogated by one light pulse only among the pulses $P_k(\lambda_{j1}), P_k(\lambda_{j2}), \ldots, P_k(\lambda_{jn})$ of distinct wavelengths respectively $\lambda_{j1}, \lambda_{j2}, \ldots, \lambda_{jn}$.

Other characteristics, objectives and advantages of the present invention will become apparent in the following detailed description illustrated by the appended figures, given as non restrictive examples and among which:

Figure 14:
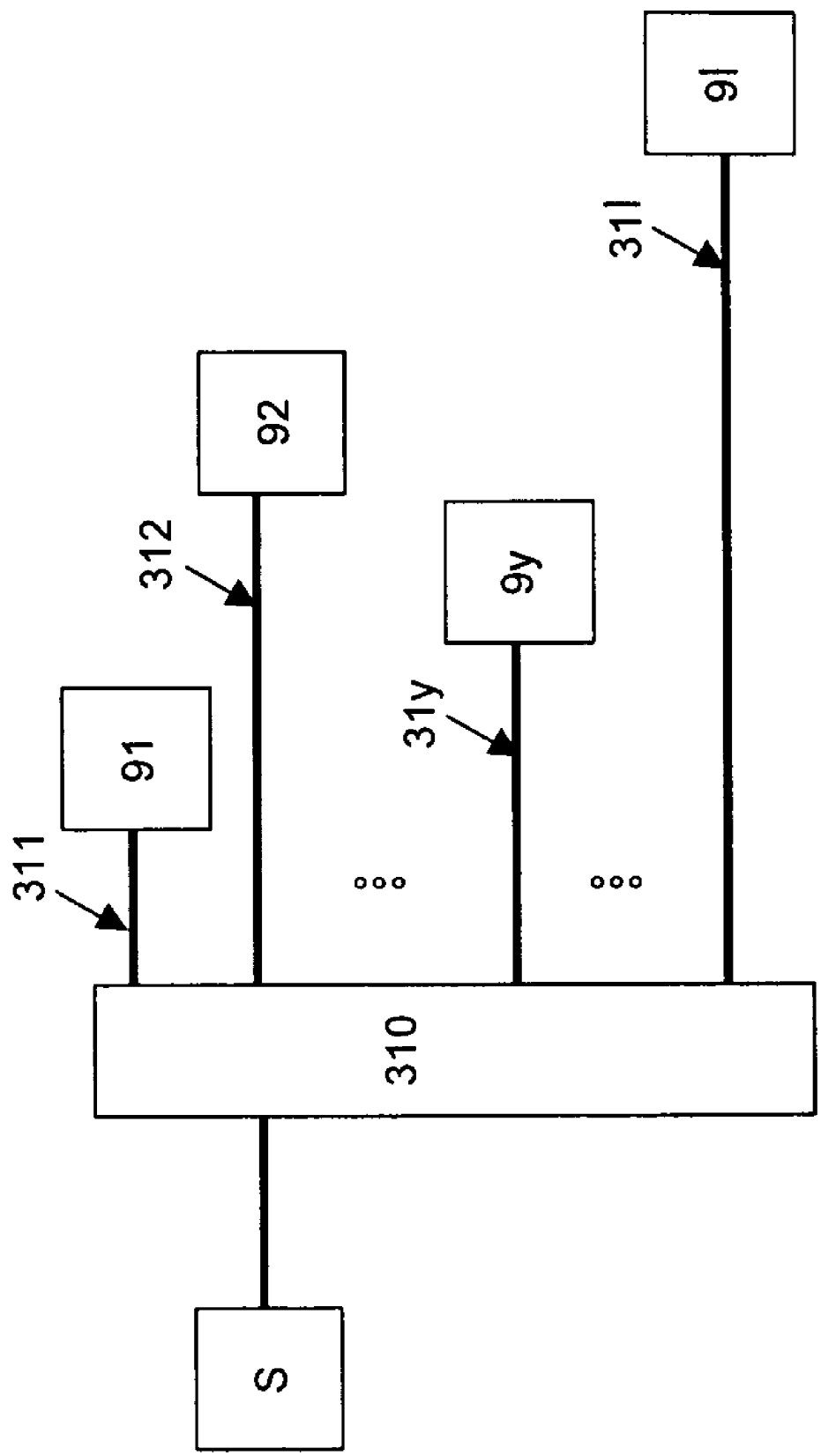
Figure 16:
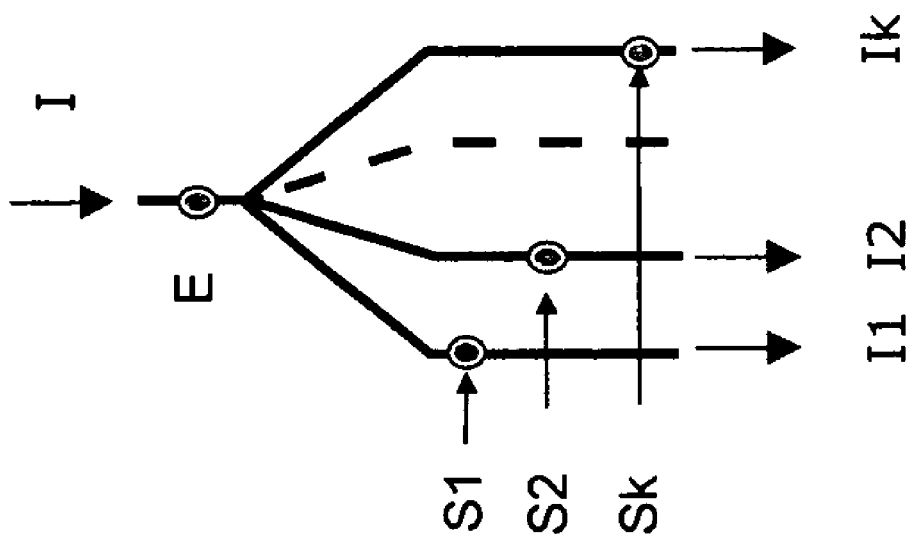
Figure 15:
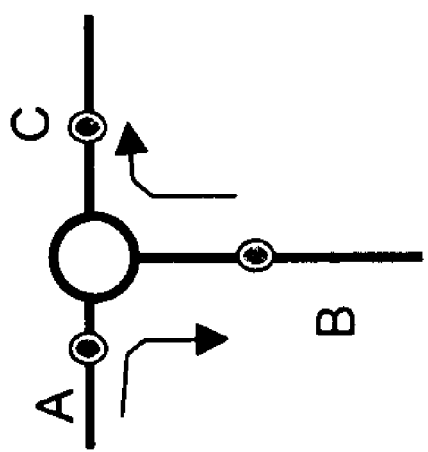
Figure 17A:
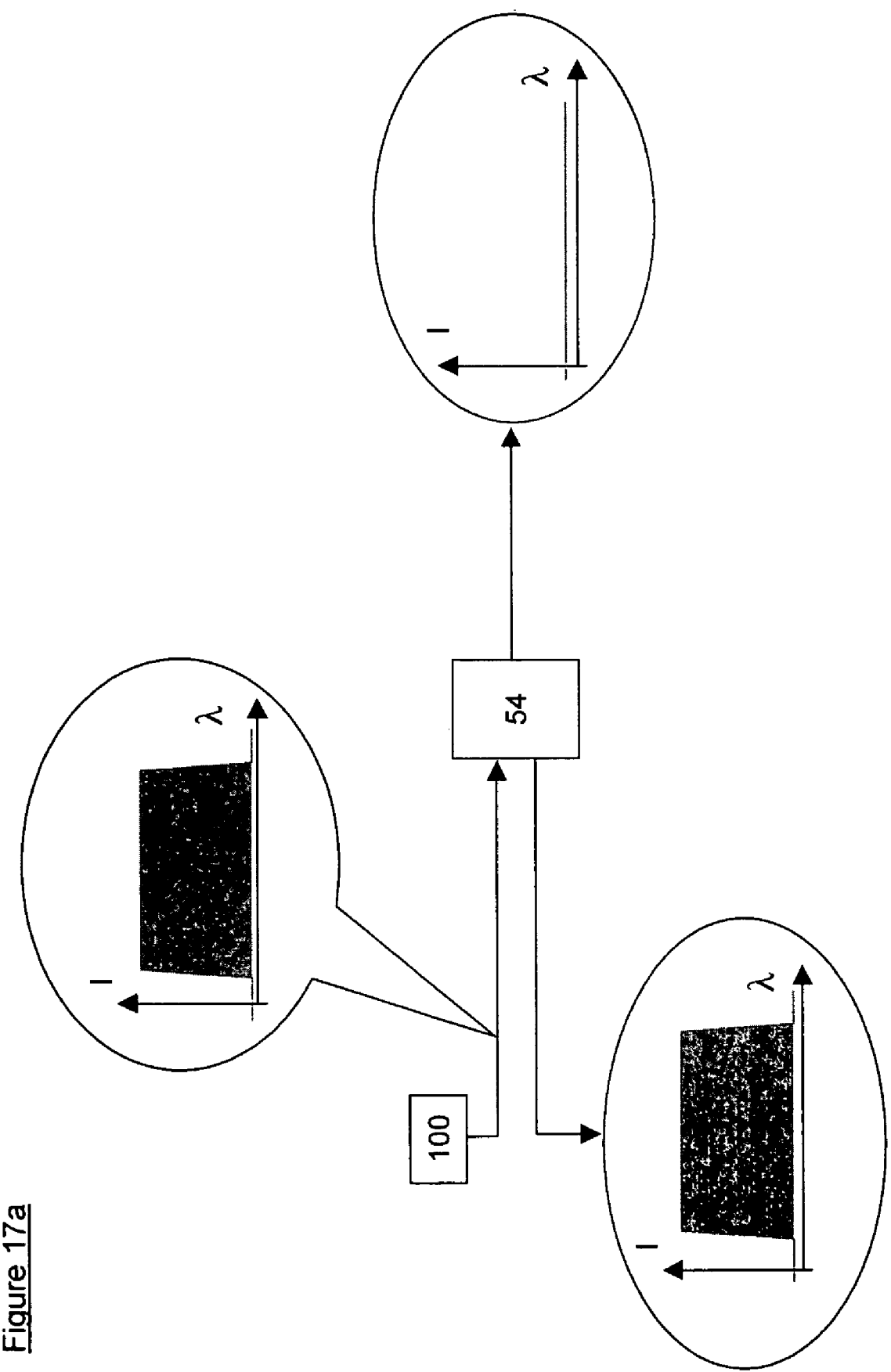
Figure 17B:
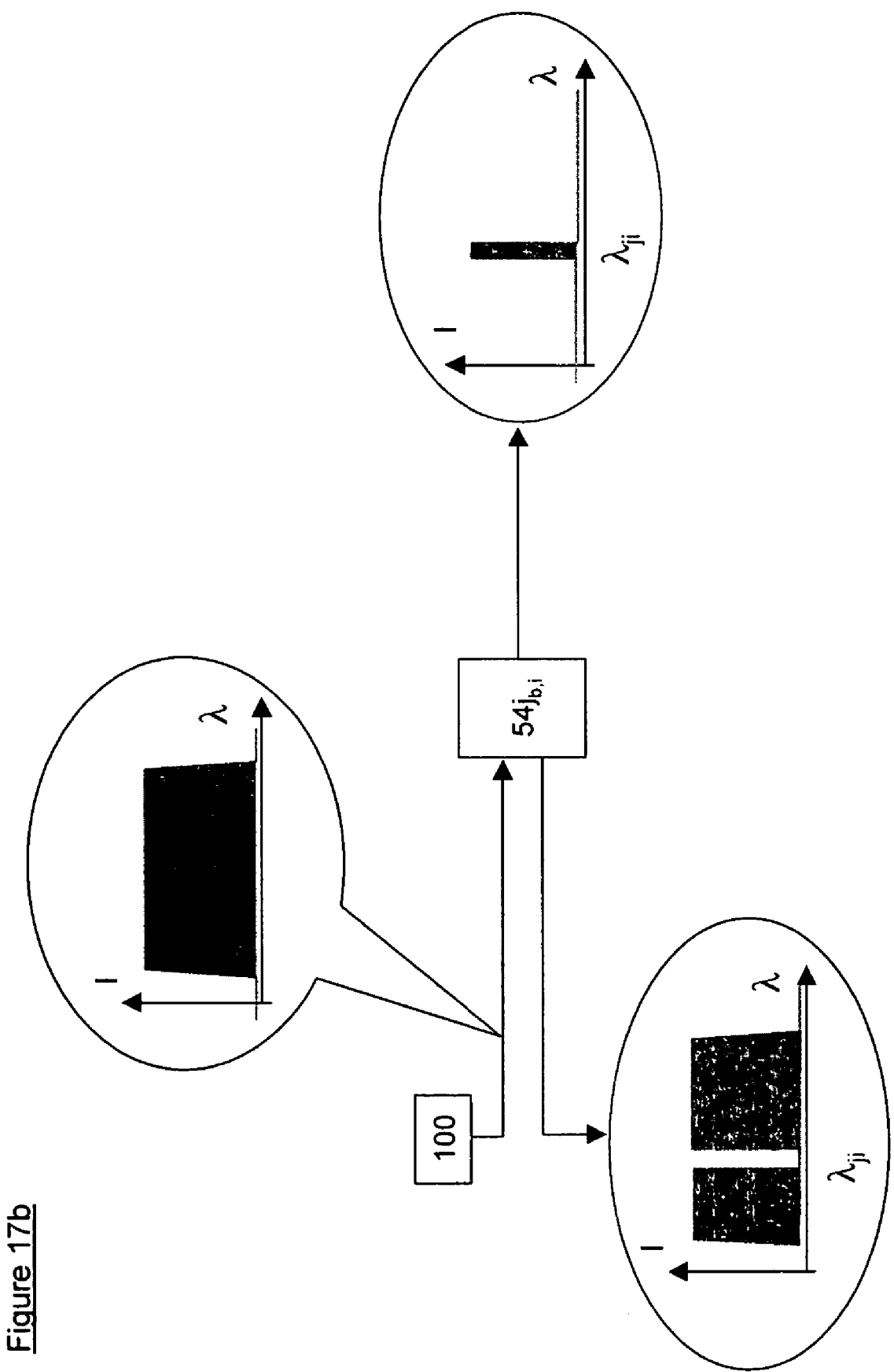
Figure 18A:
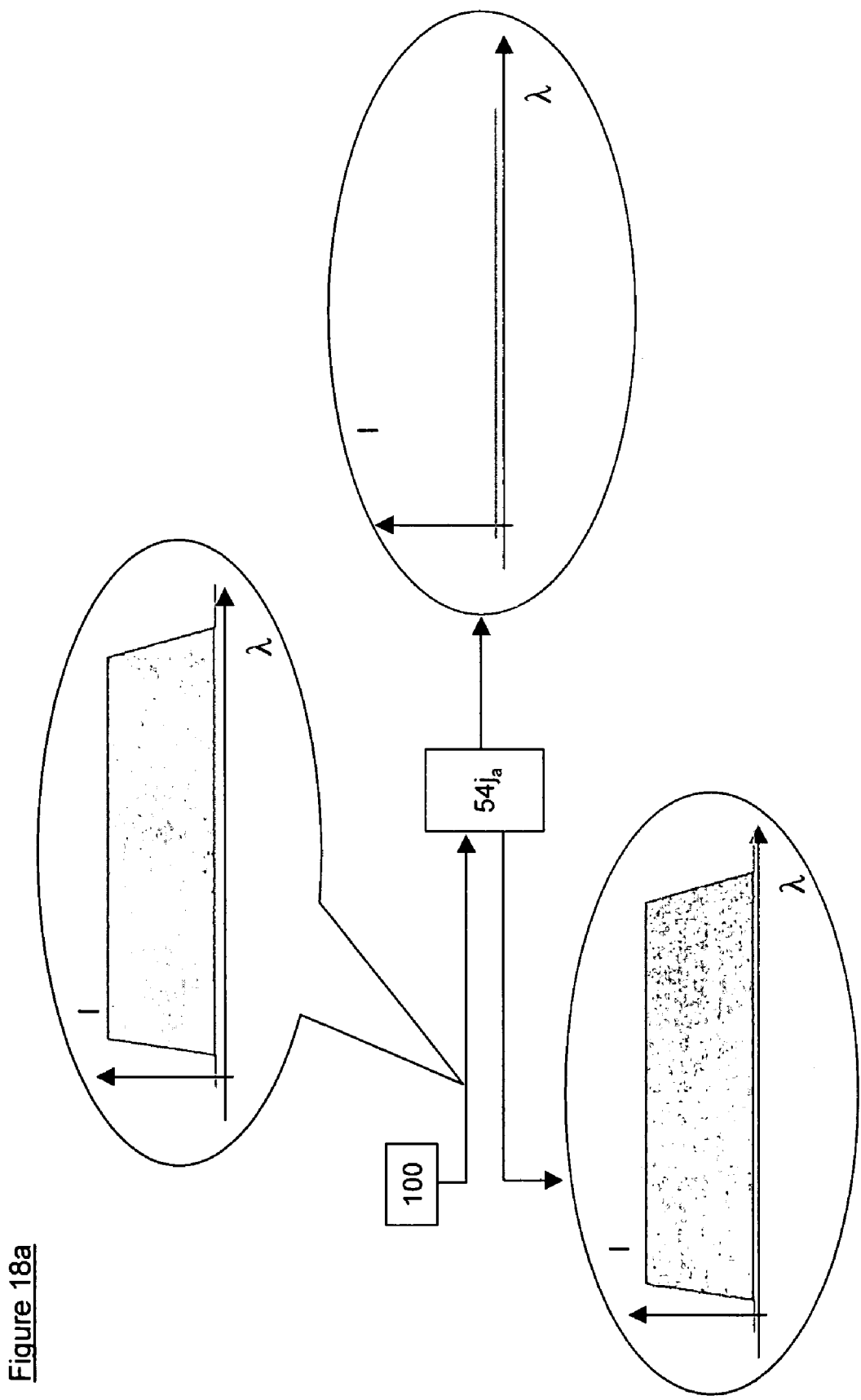
Figure 18B:
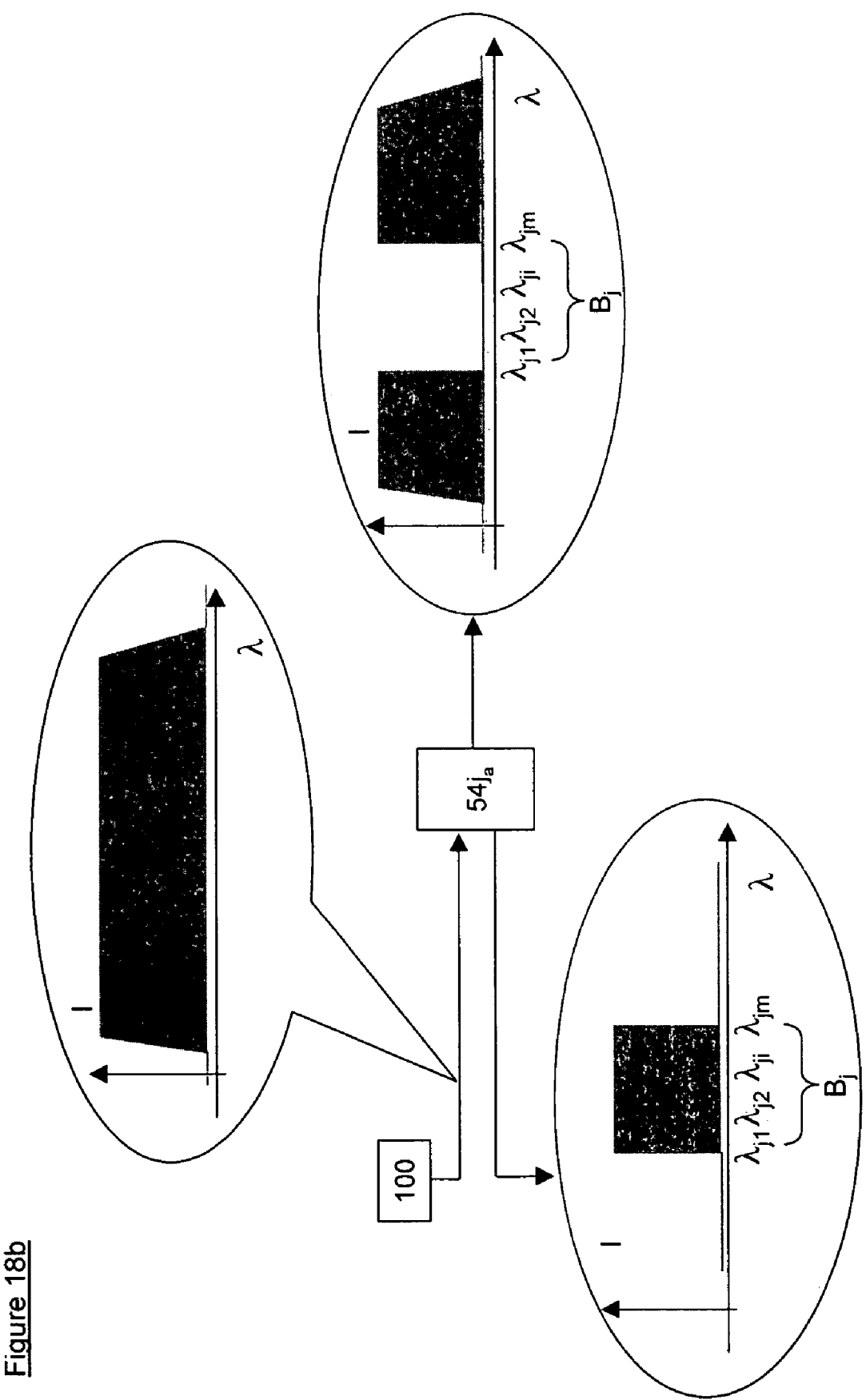
Figure 18C:
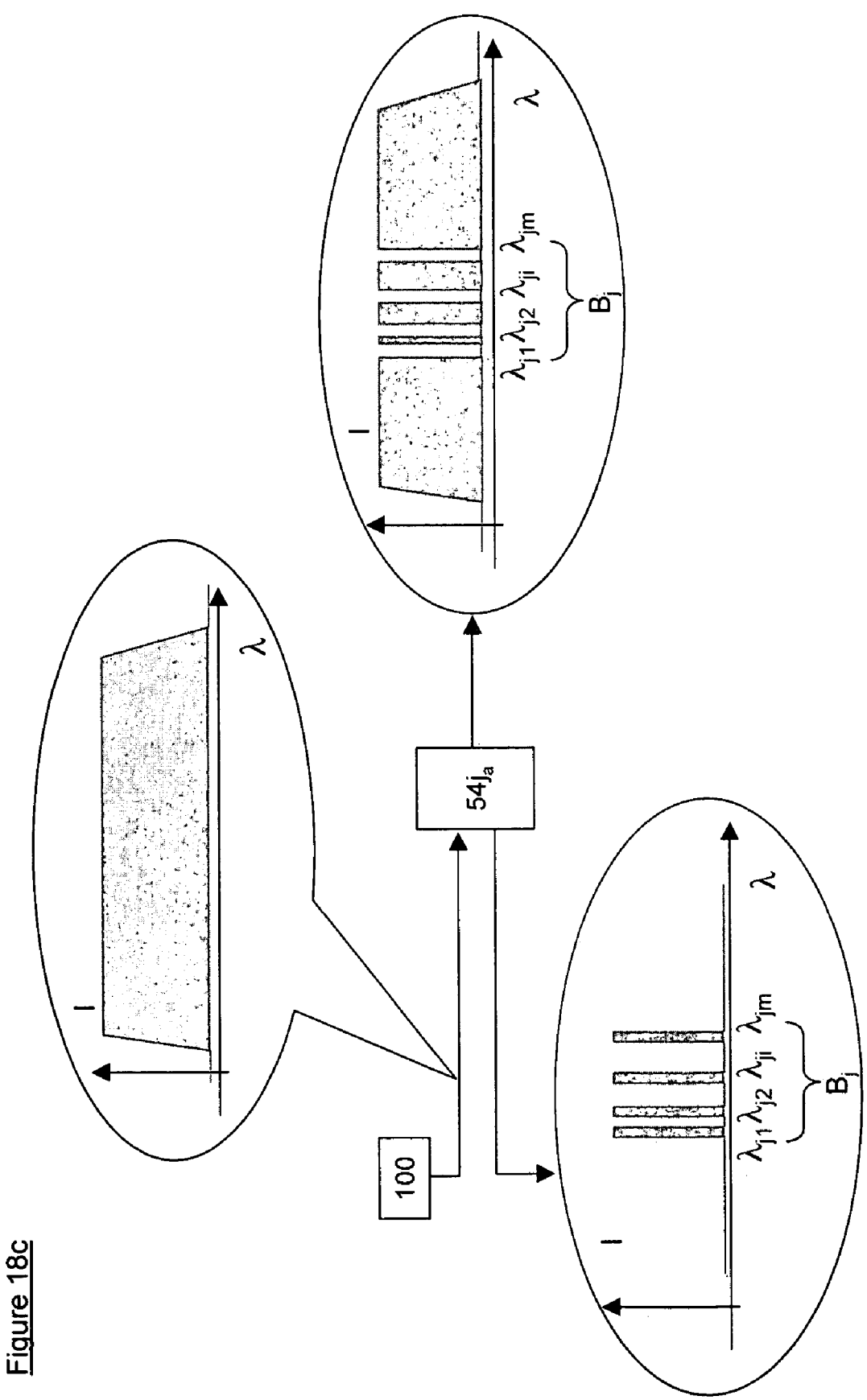

FIG. 14 shows a scheme of a system in accordance with the present invention, based on a combination of the TDM and WDM techniques, and capable of interrogating l sub-arrays of m nodes of n FOISs; the n FOISs of a node being spread out around the input point of the node in a 'star' arrangement, the distance or fiber length between any two nodes of a sub-array being allowed to be of any value, and the distance or fiber length between any two sub-arrays being allowed to be of any value;

FIG. 15 to 23 show the main characteristics of the fiber optic components employed in the state of the art or/and in the present invention;

FIG. 15 describes the operation of a fiber optic circulator on an incident light; the component being employed in the state of the art and in the present invention;

FIG. 16 describes the operation on an incident light of a fiber optic coupler of type <<1 input towards k outputs>>; the component being employed in the state of the art as a <<1 input towards 2 outputs>> coupler, and in the present invention as a <<1 input towards $\geq 2$ outputs>> coupler;

FIG. 17a shows the reflection and transmission properties of a non wavelength-selective mirror lit up by a broad band light source; the component being employed in the state of the art and in the present invention;

FIG. 17b shows the reflection and transmission properties of a Fiber Bragg Grating lit up by a broad band light source; the component being employed in the state of the art and in the present invention;

FIGS. 18a, 18b and 18c show the reflection and transmission properties for some possible mirrors of the present invention.

Figure 1:
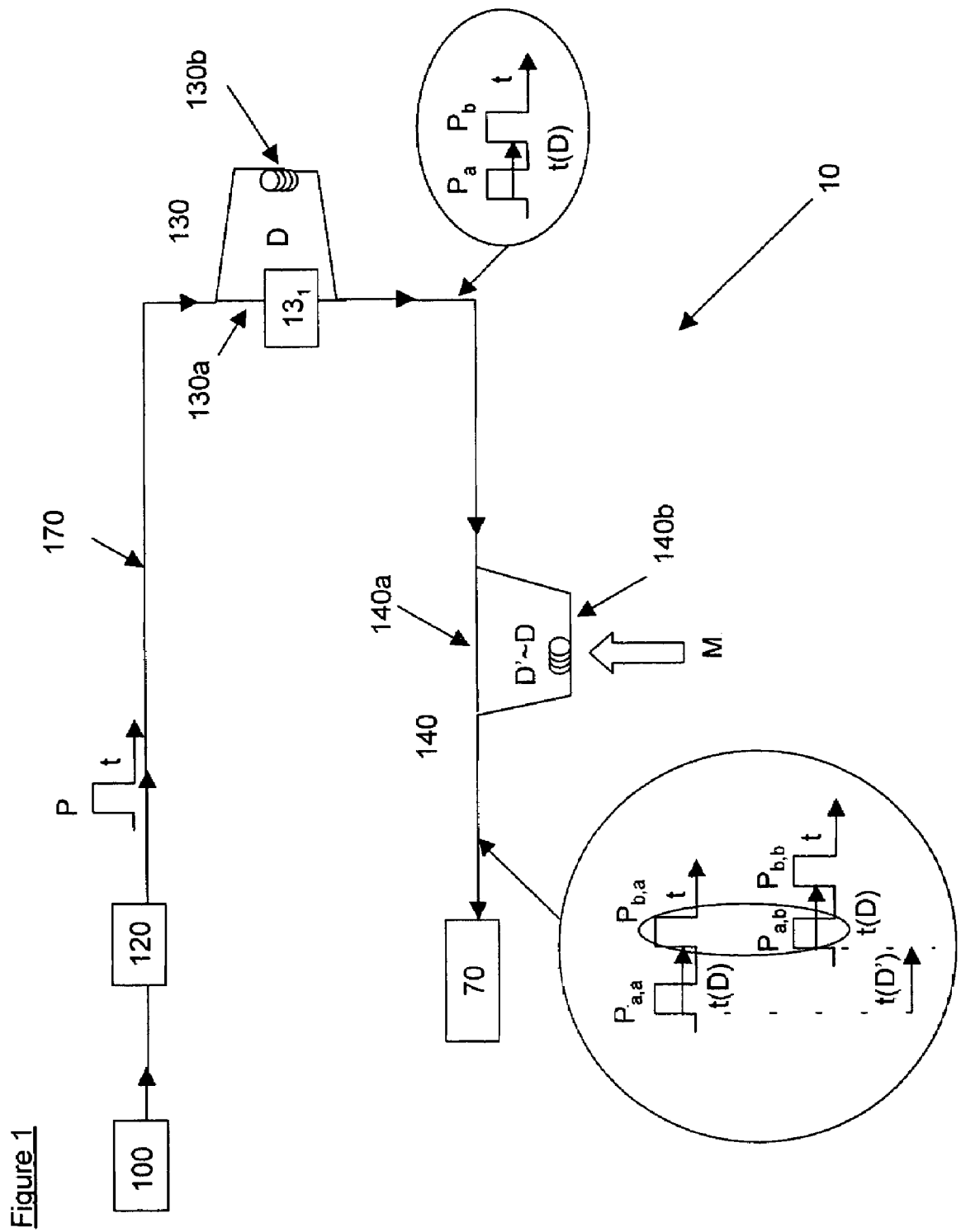
FIG. 1 shows a scheme of interrogation of one FOIS by a pulsed light
Figure 2A:
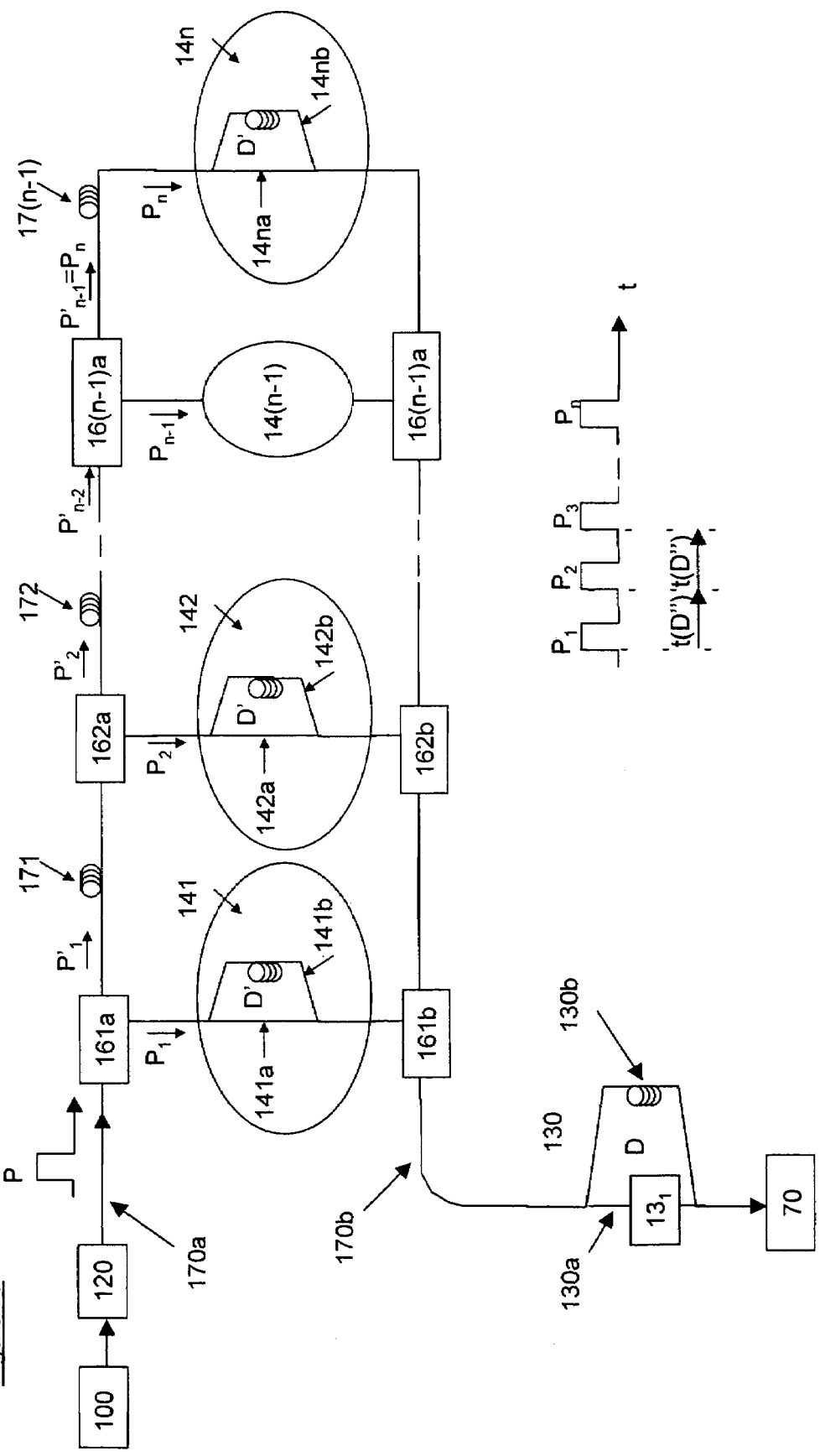
FIG. 2a, 2b, 2c show different schemes of the implementation of the Time Division Multiplexing of several FOISs interrogated as described by FIG. 1 and in the state of the art.
Figure 2B:
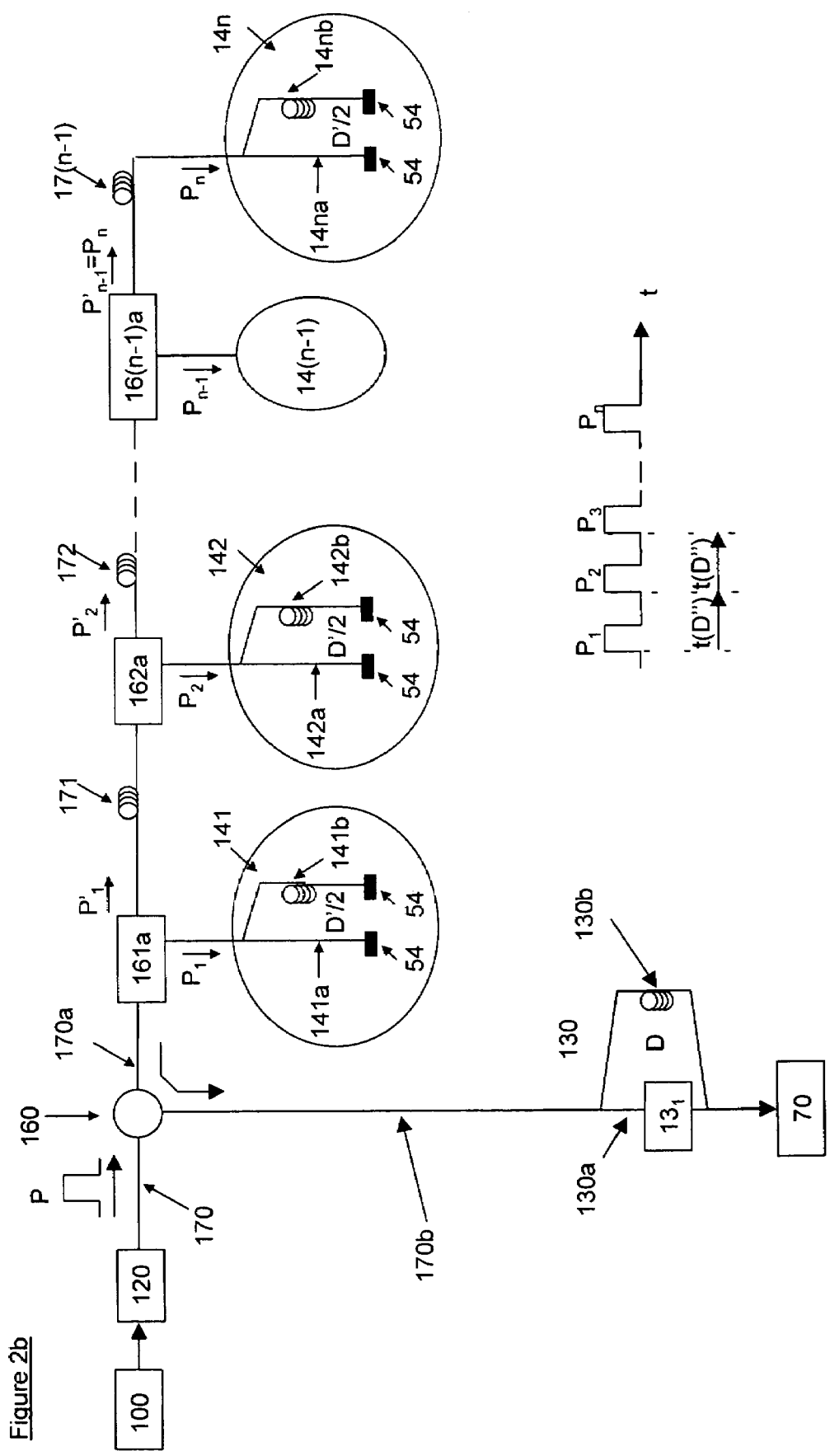
Figure 2C:
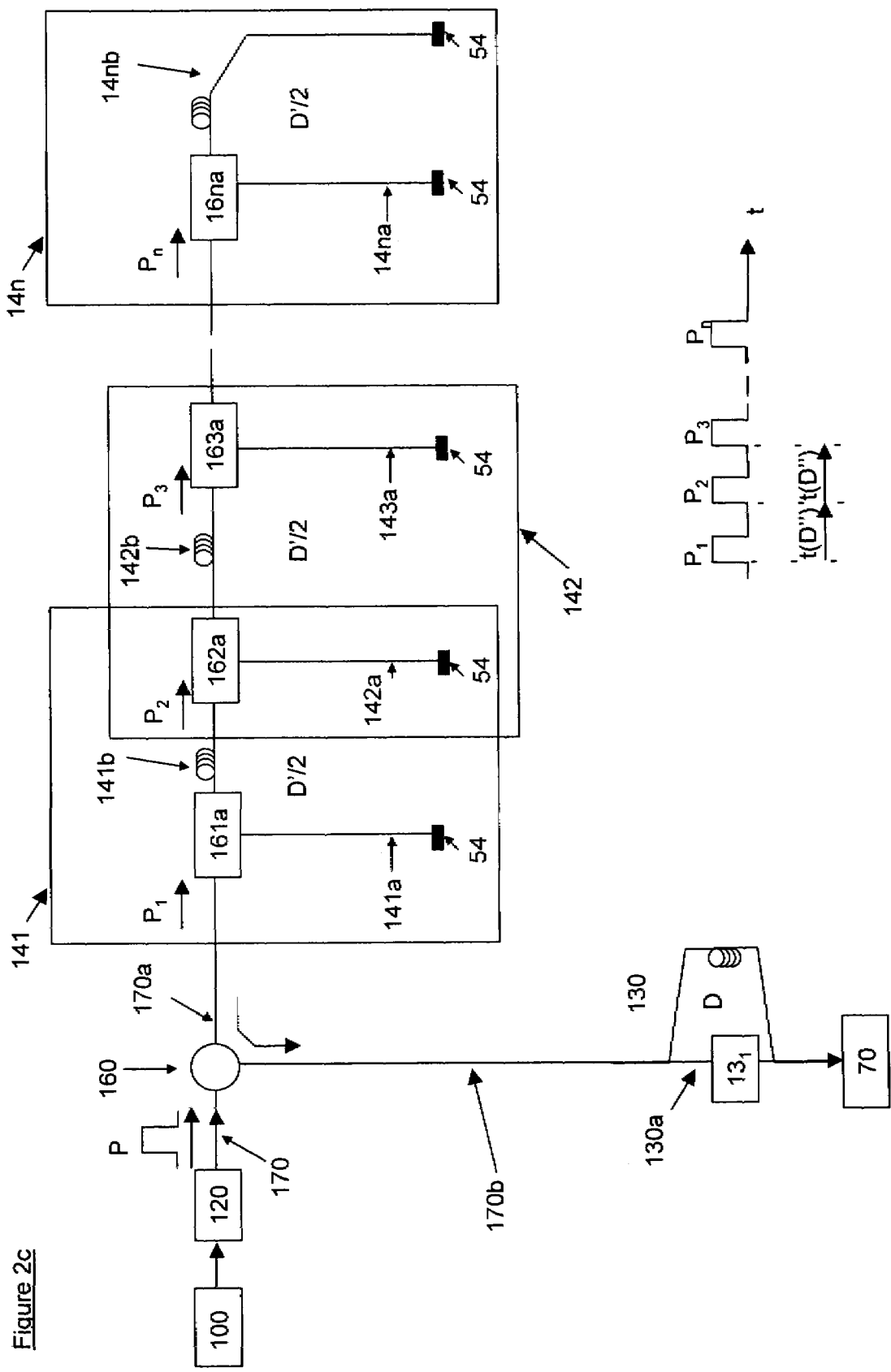
Figure 3:
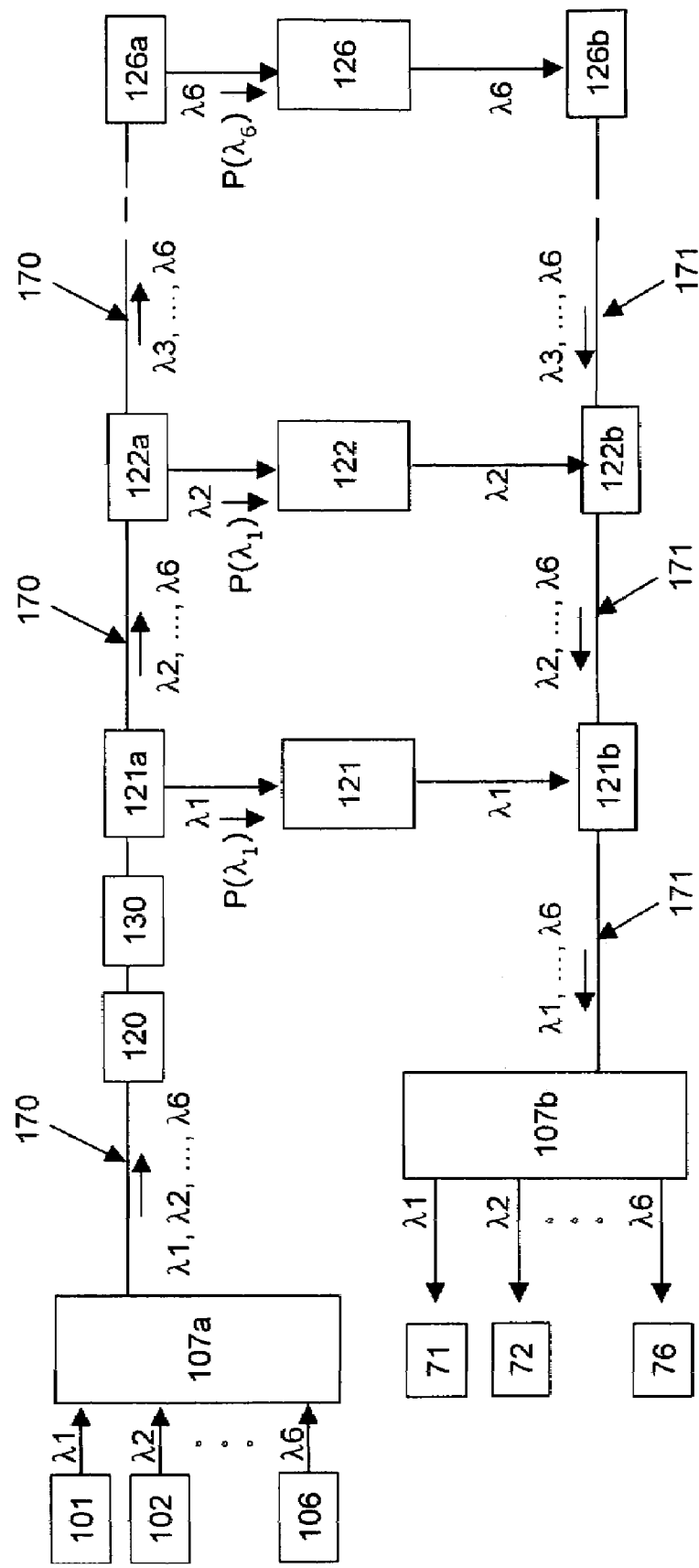
FIG. 3 shows a scheme combining the TDM technique described by FIG. 2 and a WDM technique for multiplexing a number of FOISs as usually done in the state of the art.
Figure 4:
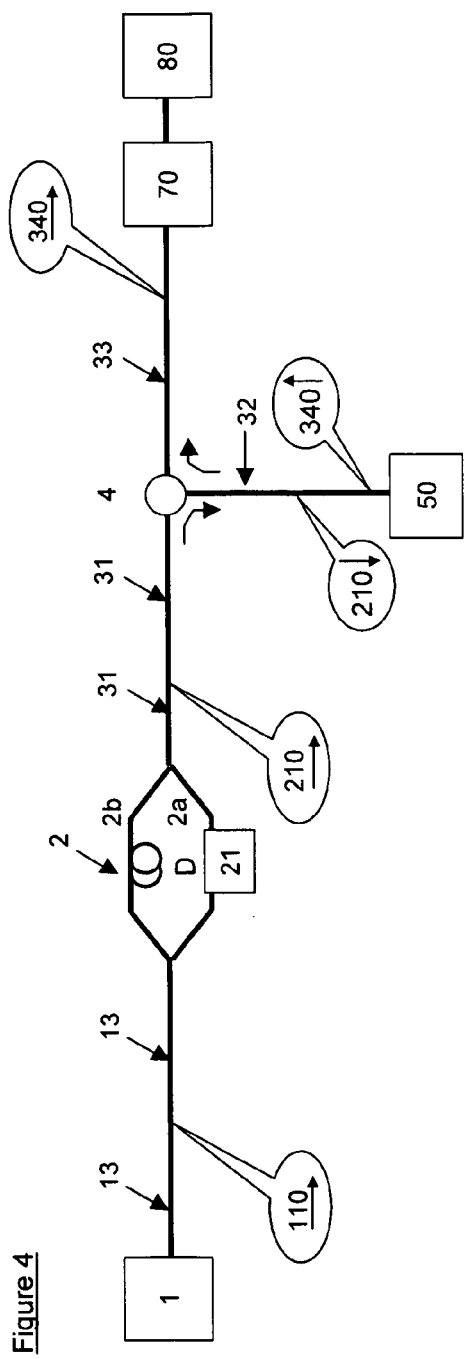
FIG. 4 shows a scheme of a system in accordance with the present invention, based on a combination of the TDM and WDM techniques, and capable of interrogating one group (or node) of n FOISs localized at the same point.
Figure 19:
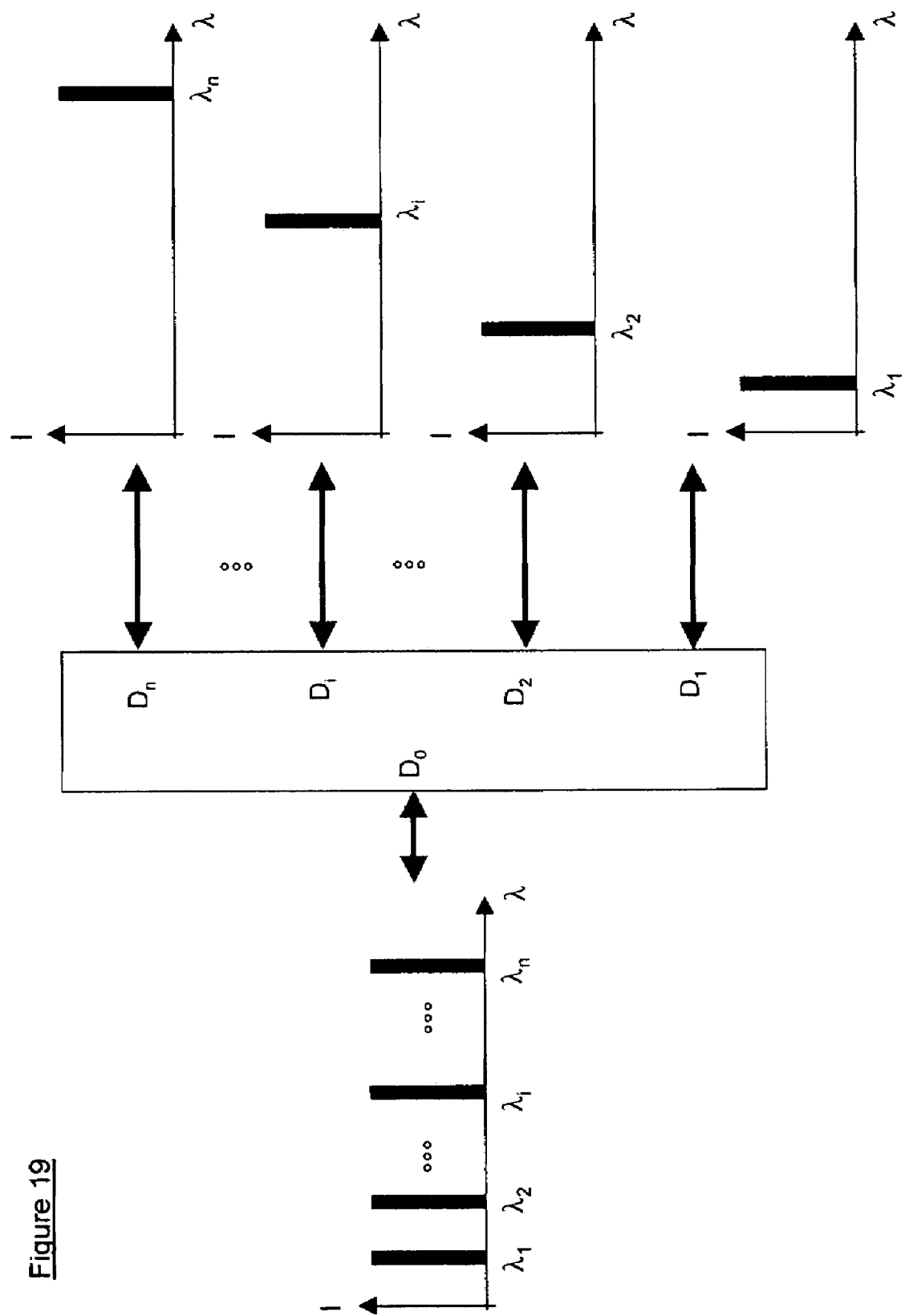
Figure 20:
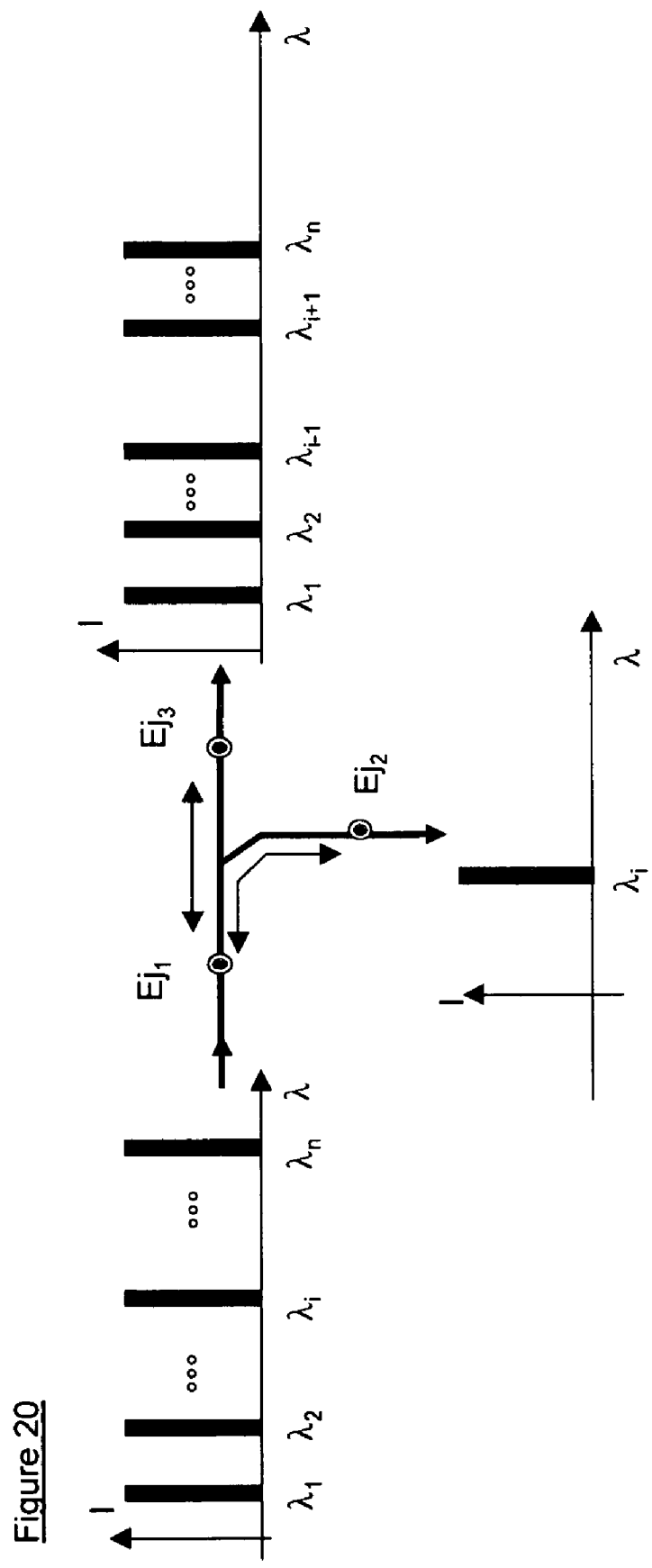
Figure 21:
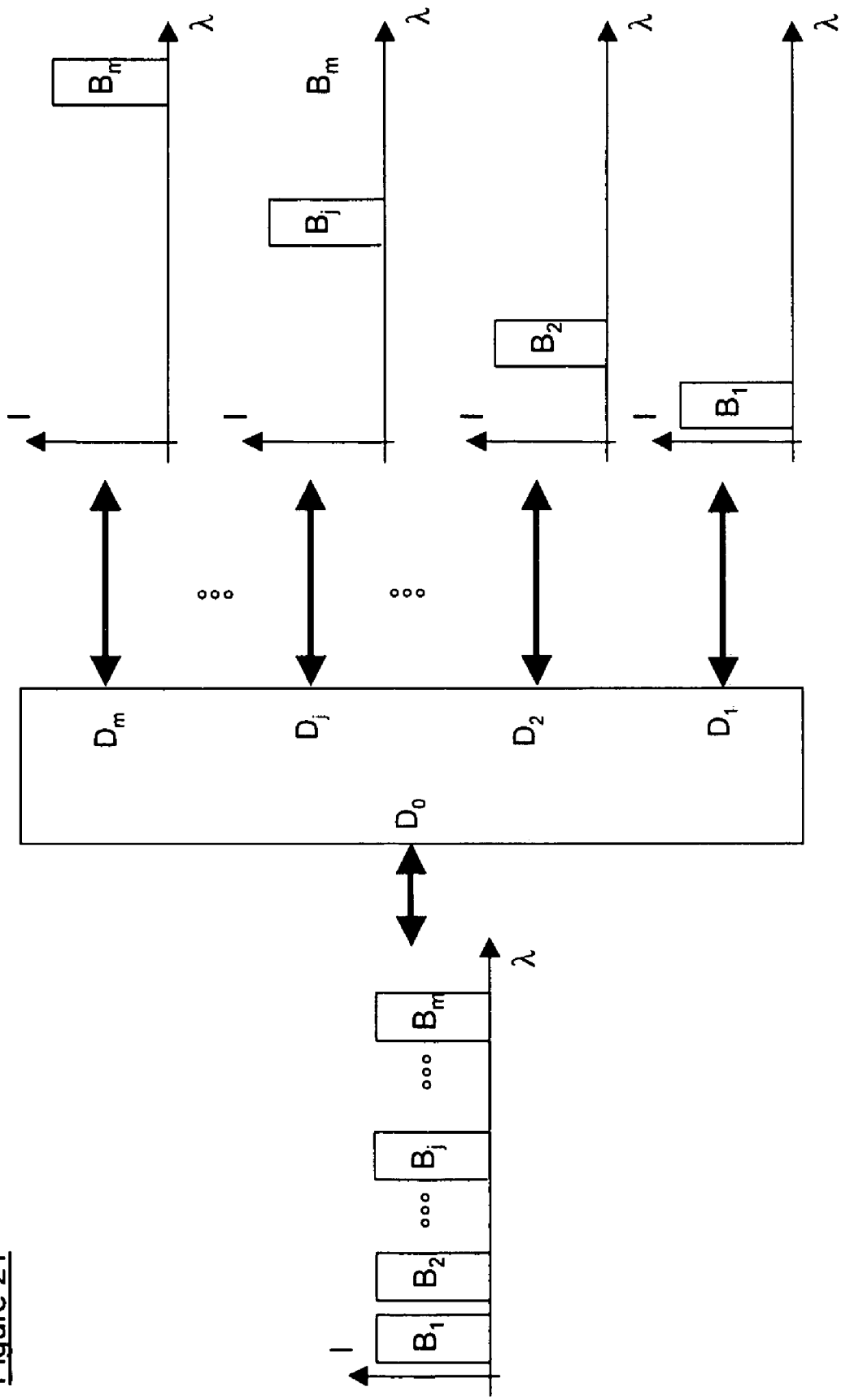
Figure 22:
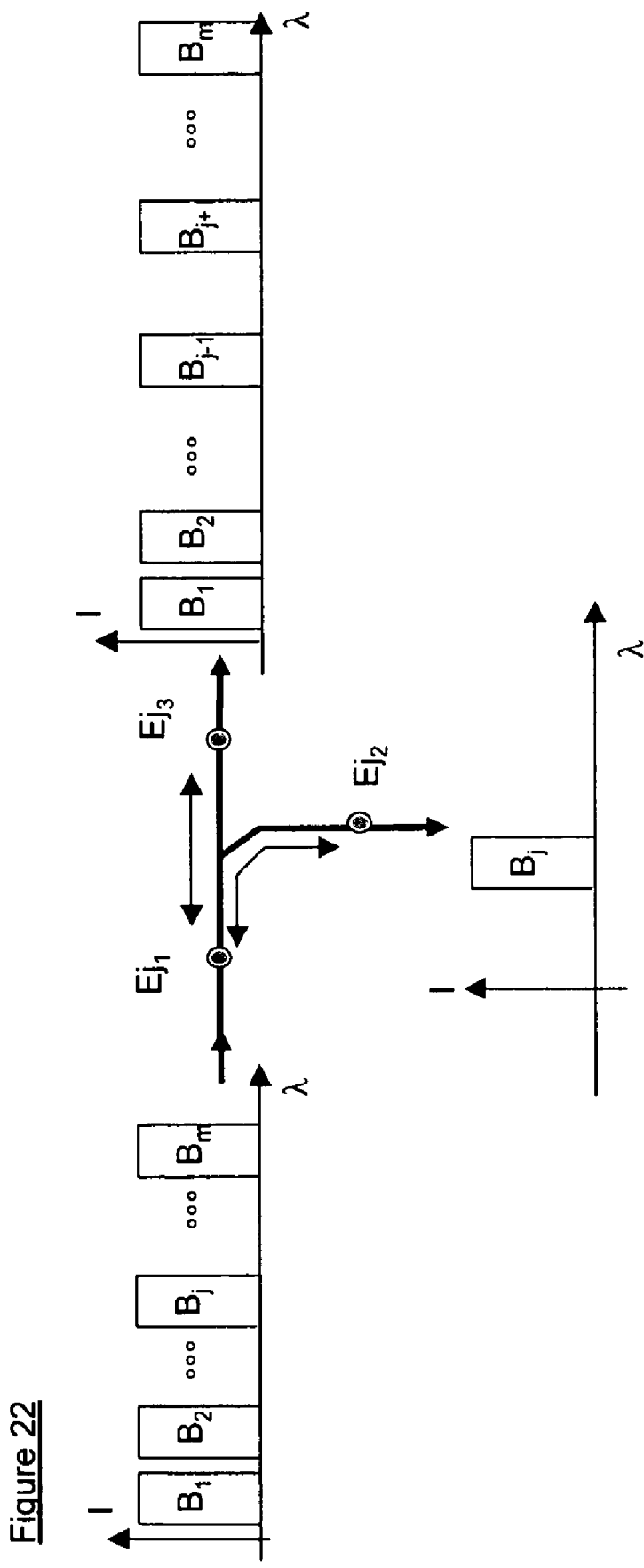
Figure 23:
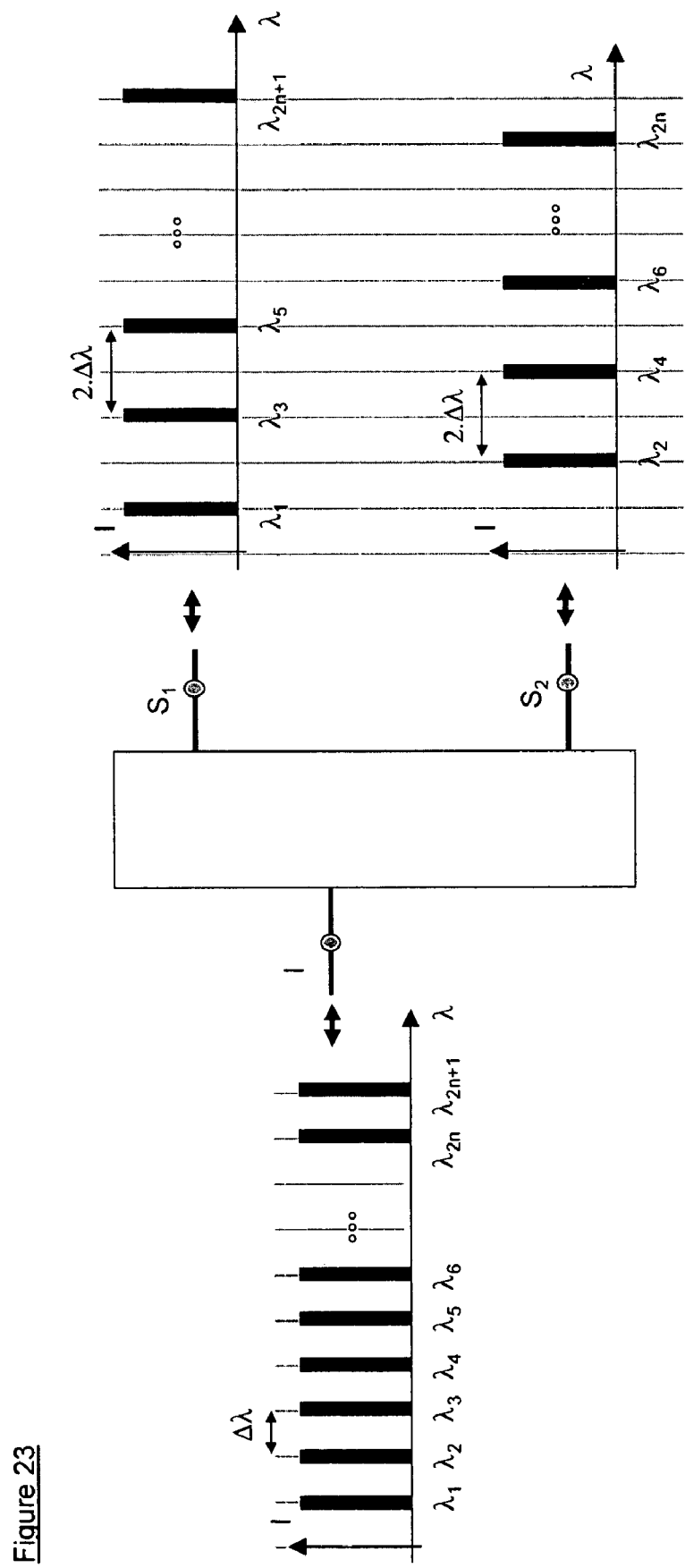

FIG. 19 describes the operation of a wavelength demultiplexer of type <<1 input towards n outputs>> on a incident light comprising n specific wavelengths; the component being employed in the state of the art and in the present invention;

FIG. 20 describes the operation of a wavelength-dropping component on an incident light comprising a number of specific wavelengths; the component being employed in the state of the art;

FIG. 21 describes the operation of a wavelength band demultiplexer of type <<1 input towards m outputs>> on an incident light comprising m specific bands of wavelengths; the component being employed in the present invention;

FIG. 22 describes the operation of a wavelength band-dropping component on an incident light comprising a number of specific bands of wavelength; the component being employed in the present invention;

FIG. 23 describes the operation of an interleaver component; the component being employed in the present invention;

FIG. 4 shows a scheme of a system in accordance with the present invention, based on a combination of the TDM and WDM techniques, and capable of interrogating one group (or node) of n FOISs localized at the same point. The proposed scheme is based on the state of the art principle (described in FIG. 1) of interrogation of one FOIS by a pulsed light and it implements a new wavelength selective Time Division Multiplexing technique associated with a specific arrangement of FOISs, spread out around the input point of the group in a 'star' arrangement. The system comprises means 1 capable of generating a group 110 of n light pulses in an optical fiber 13. Following the light path, the system also comprises a reference interferometer 2 comprising a short path 2a that contains means 21 capable of phase modulating the optical field that goes through it, and a long path 2b; the optical path difference between the short arm 2a and long arm 2b being equal to D a fiber optic circulator 4 a group 50 of n FOISs localized at the same point or node a photo-detector 70 a demodulator 80

At the output of the reference interferometer 2, the group 110 of n light pulses gives rise to the group 210 of n couples of light pulses; at the output of the group 50 of n FOISs spread out around the input point of the group in a 'star' arrangement, the group 210 of n couples of light pulses gives rise to the group 340 of n*2 couples of light pulses.

Figure 5:
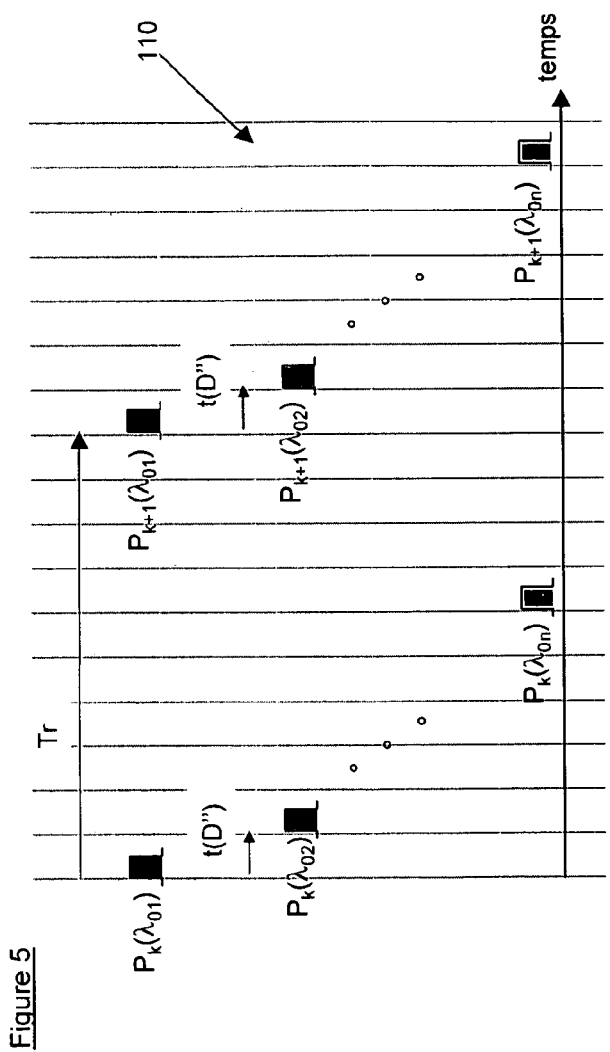
FIG. 5 is a representation of the light sent in the telemetry fiber that is required to interrogate the aforementioned group (or node) of n FOISs localized at the same point; this light is made up of n light pulses, each of which having a specific wavelength, and each of which being delayed one from another, the group of n pulses being periodically generated at a repetition rate Tr.

FIG. 5 is a representation of the light sent in the telemetry fiber that is required to interrogate the group (or node) of n FOISs localized at the same point. This light forms the group 110 of n light pulses $P_k(\lambda_{o1})$, $P_k(\lambda_{o2})$, ..., $P_k(\lambda_{on})$, each of which having a specific wavelength $\lambda_{o1}$, $\lambda_{o2}$, ..., $\lambda_{on}$, and each of which being delayed one from another by a time t(D") very closed to the time t(D). The group 110 is periodically generated by the means 1 at a repetition rate Tr. On FIG. 5, the first repeated group of 110=$P_k(\lambda_{o1})$, $P_k(\lambda_{o2})$, ..., $P_k(\lambda_{on})$ is referred as $P_{k+1}(\lambda_{o1})$, $P_{k+1}(\lambda_{o2})$, ..., $P_{k+1}(\lambda_{on})$. In the remaining part of the present description one will only take into account the group 110, the description being equivalent for the repeated groups of 110.

FIG. 5a, 5b, 5c, 5d show schemes of possible ways of construction for means 1; means 1 are capable of generating the group 110 of n light pulses $P_k(\lambda_{o1})$, $P_k(\lambda_{o2})$, ..., $P_k(\lambda_{on})$, each pulse having a specific wavelength, respectively $\lambda_{o1}$, $\lambda_{o2}$, ..., $\lambda_{on}$ and each pulse being delayed one from another by the time t(D") very closed to t(D) (which is equal to the time propagation of light through the optical path difference D in the reference interferometer 2).

Figure 5A:
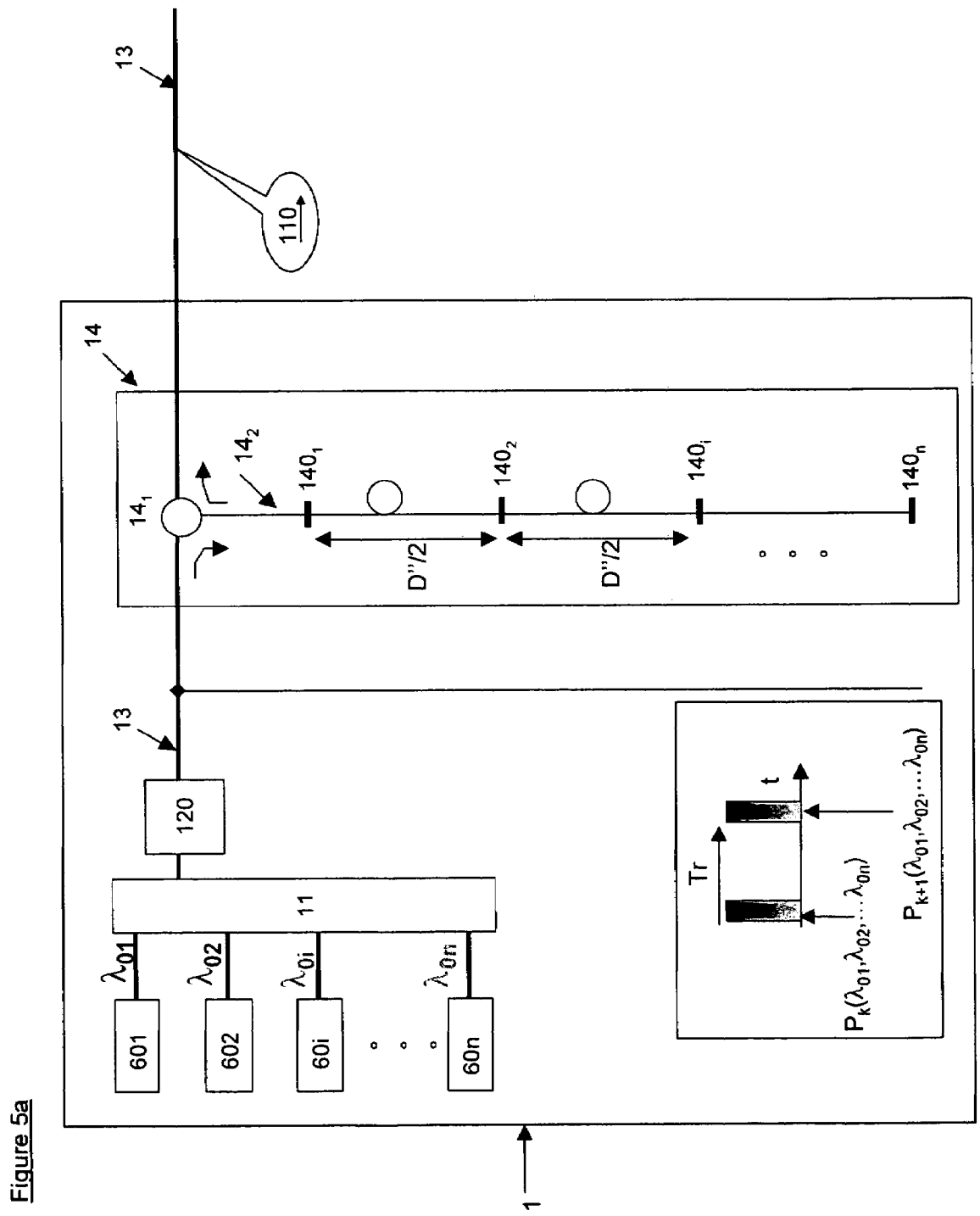
FIG. 5a, 5b, 5c, 5d show schemes of some possible ways of construction for means 1 capable of generating the n pulse-group represented in FIG. 5
Figure 5B:
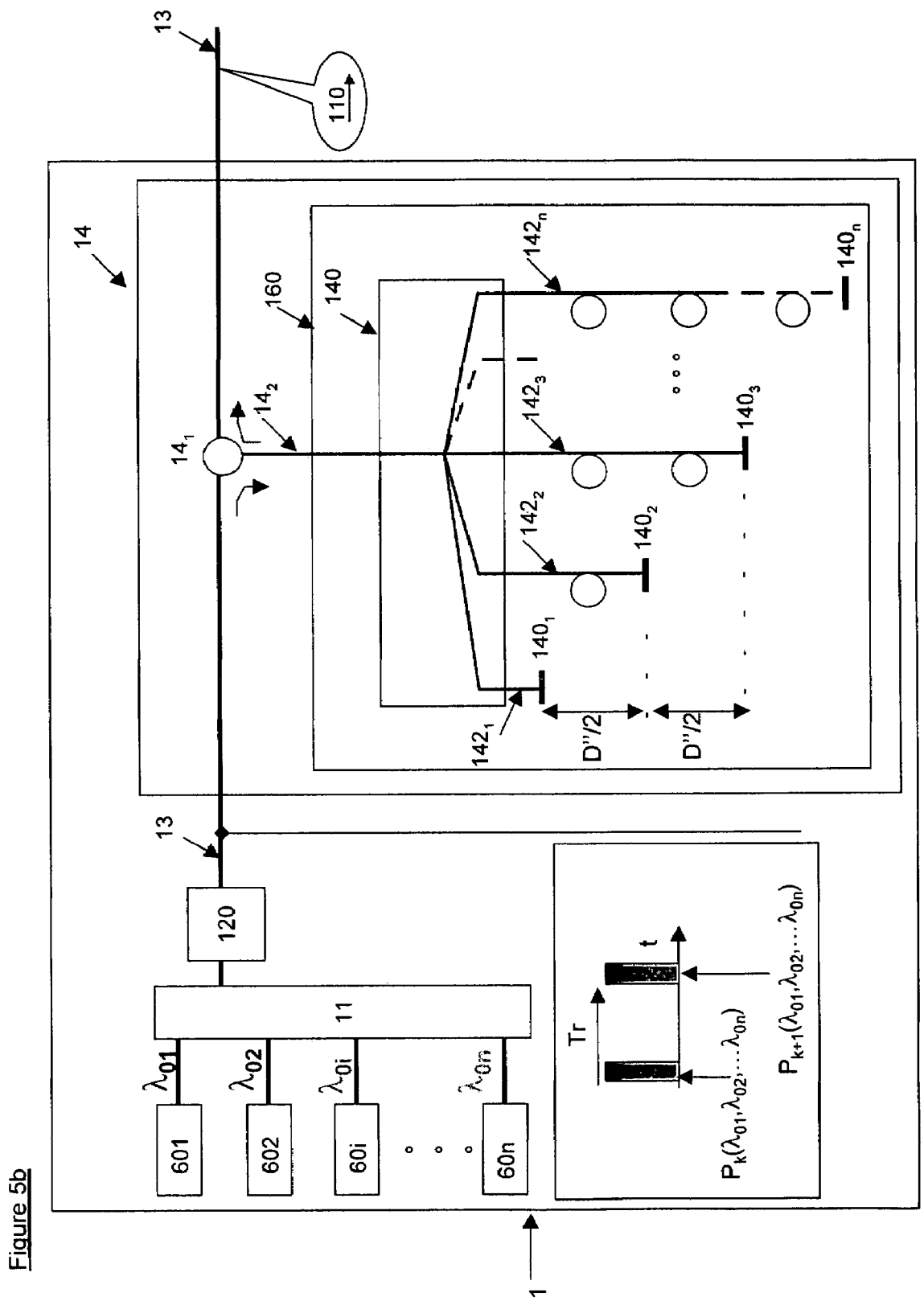
Figure 5C:
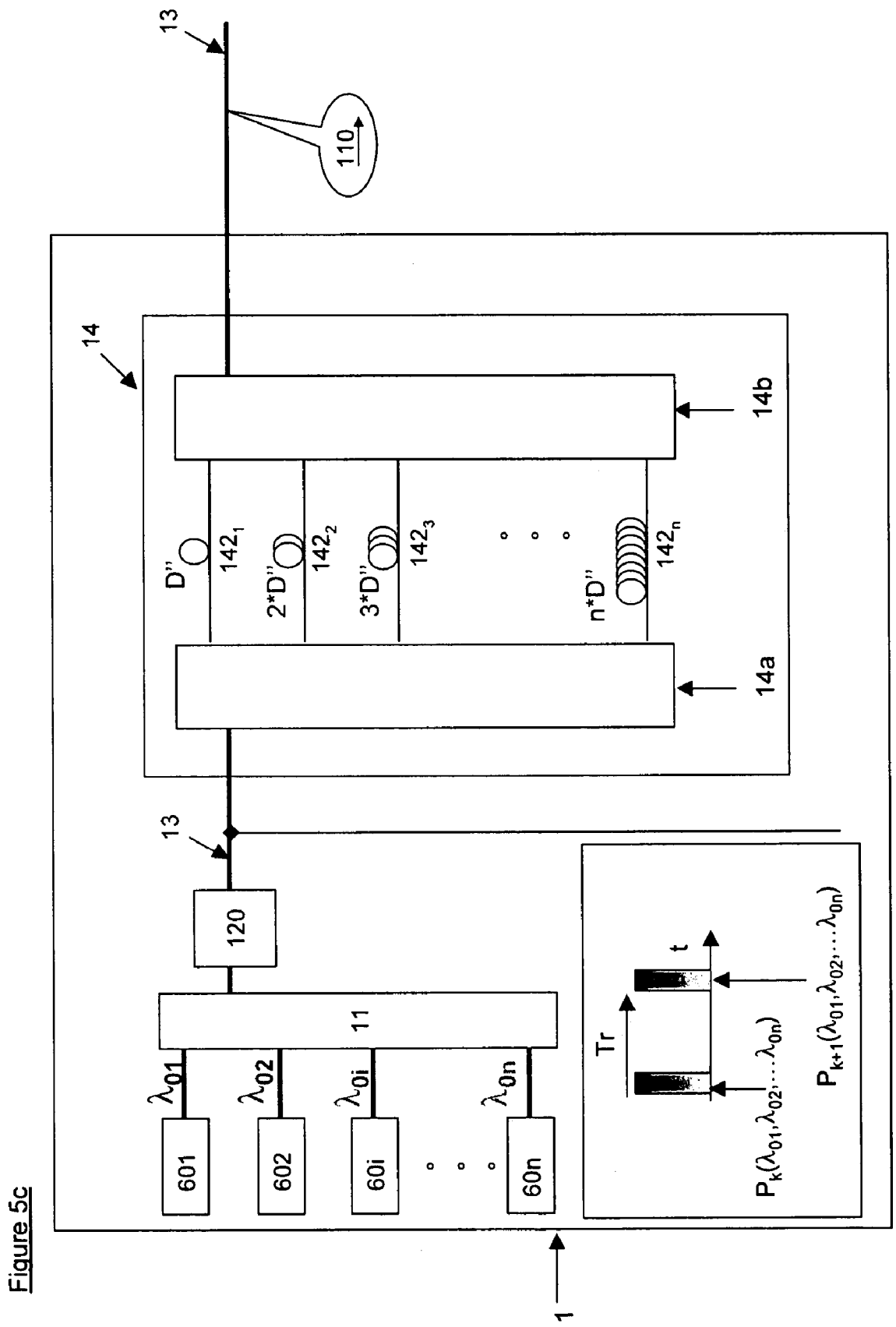

The possible ways of construction for means 1 illustrated by FIGS. 5a, 5b and 5c first comprise n optical sources 601, 602, . . . , 60n which emit respectively a light of wavelength $\lambda_{01}, \lambda_{02}, \ldots, \lambda_{0n}$ distinct one from another. A wavelength multiplexer 11 (of type <<n inputs towards 1 output), located at the output of the optical sources array 601, 602, . . . , 60n combines the n lights of specific wavelength $\lambda_{01}, \lambda_{02}, \ldots, \lambda_{0n}$ into an optical fiber 13. The wavelength multiplexer 11 is followed by an optical switch 120 on the optical fiber 13. At the output of the wavelength multiplexer 11, the light is a Continuous Wave (CW) light comprising the n lights of different wavelengths $\lambda_{01}, \lambda_{02}, \ldots, \lambda_{0n}$. The optical switch 120 periodically pulses the CW light at its input to generate a light pulse at its output, $P_k = P_k(\lambda_{01}, \lambda_{02}, \ldots, \lambda_{0n})$ repeated at a repetition rate Tr and containing the n wavelengths $\lambda_{01}, \lambda_{02}, \ldots, \lambda_{0n}$. The generated light pulse $P_k = P_k(\lambda_{01}, \lambda_{02}, \ldots, \lambda_{0n})$ is then lead by the fiber 13 to means 14. The means 14 are capable of generating, from the light pulse $P_k = P_k(\lambda_{01}, \lambda_{02}, \ldots, \lambda_{0n})$, the group 110 made up of n light pulses $P_k(\lambda_{01})$, $P_k(\lambda_{02}), \ldots, P_k(\lambda_{0n})$ of specific wavelengths respectively $\lambda_{01}, \lambda_{02}, \ldots, \lambda_{0n}$. The n light pulses $P_k(\lambda_{01}), P_k(\lambda_{02}), \ldots, P_k(\lambda_{0n})$ are delayed one from another by the time t(D") very closed to t(D) which is equal to the time propagation of light through the optical path difference D in the reference interferometer 2.

The means 14 can be constructed in several ways: FIGS. 5a, 5b and 5c illustrate three non restrictive examples.

In the way of construction illustrated by FIG. 5a, the means 14 comprise a fiber optic circulator $14_1$ which couples the light out from fiber 13 into a fiber $14_2$. Fiber $14_2$ comprises n mirrors $140_1, 140_2, \ldots, 140_n$ which selectively reflects, respectively the light of wavelength $\lambda_{01}, \lambda_{02}, \ldots, \lambda_{0n}$ (and transmits all the non reflected wavelengths). The mirrors are separated one from another on fiber $14_2$ by a round trip optical path that is equal to D". The lights of different wavelengths that are reflected by the mirrors get back to the circulator 14, that leads them to fiber 13. At the output of the means 14, the light pulse $P_k(\lambda_{01}, \lambda_{02}, \ldots, \lambda_{0n})$ gives rise to n light pulses $P_k(\lambda_{01}), P_k(\lambda_{02}), \ldots, P_k(\lambda_{0n})$, each of specific wavelength respectively $\lambda_{01}, \lambda_{02}, \ldots, \lambda_{0n}$, the n light pulses $P_k(\lambda_{01}), P_k(\lambda_{02}), \ldots, P_k(\lambda_{0n})$ being delayed one from another by the time t(D") corresponding to the time propagation of light through the round trip optical path that separates to consecutive mirrors $140_{i+1}, 140_i$ ($1 \leq i \leq n-1$) on fiber $14_2$. Mirrors $140_1, 140_2, \ldots, 140_n$ are preferentially Fiber Bragg Gratings.

In the way of construction illustrated by FIG. 5b, the means 14 comprise a fiber optic circulator $14_1$ which couples the light out from fiber 13 into a fiber $14_2$, a wavelength demultiplexer 140 (of type <<n inputs towards 1 output>>) separating the n lights of wavelength $\lambda_{01}, \lambda_{02}, \lambda_{03}, \ldots, \lambda_{0n}$ contained in pulse $P_k = P_k(\lambda_{01}, \lambda_{02}, \lambda_{03}, \ldots, \lambda_{0n})$ on n output fibers $142_1$, $142_2, 142_3, \ldots, 142_n$. Each of the n fibers $142_1, 142_2, 142_3, \ldots, 142_n$ is terminated by a mirror, respectively $140_1, 140_2, 140_3, \ldots, 140_n$; the aforementioned mirrors can be wavelength selective or not. The fiber optic sections $142_{i+1}$ (delimited by the corresponding output of the wavelength demultiplexer and mirror $140_{i+1}$) and $142_i$ (delimited by the corresponding output of the wavelength demultiplexer and mirror $140_i$), where $1 \leq i \leq n-1$, form two optical path of round trip difference D". Each pulse light $P_k(\lambda_{01}), P_k(\lambda_{02}), \ldots, P_k(\lambda_{0n})$, of wavelength $\lambda_{01}, \lambda_{02}, \lambda_{03}, \ldots, \lambda_{0n}$, travels through its associated fiber section, respectively $142_1, 142_2, 142_3, \ldots, 142_n$, and is reflected back by its associated mirror, respectively $140_1, 140_2, 140_3, \ldots, 140_n$. Back to the wavelength demultiplexer 140, the n light pulses are recombined onto the fiber $14_2$ and lead by the circulator $14_1$ to the fiber 13. At the output of the circulator $14_1$, the n light pulses $P_k(\lambda_{01}), P_k(\lambda_{02}), \ldots, P_k(\lambda_{0n})$ are delayed one from another by the time t(D") corresponding to the round trip difference of the optical paths formed by two consecutive fiber sections $142_i, 142_{i+1}$ where $1 \leq i \leq n-1$.

In the way of construction illustrated by FIG. 5c, the means 14 comprise, a wavelength separator 14a of type <<1 input towards n outputs>>. From the light pulse $P_k = P_k(\lambda_{01}, \lambda_{02}, \lambda_{03}, \ldots, \lambda_{0n})$ made up of the n lights of wavelengths $\lambda_{01}, \lambda_{02}, \ldots, \lambda_{0n}$, the wavelength separator 14a separate the n wavelengths $\lambda_{01}, \lambda_{02}, \ldots, \lambda_{0n}$ on n fibers respectively $142_1$, $142_2, 142_3, \ldots, 142_n$ so as to form n light pulses $P_k(\lambda_{01})$, $P_k(\lambda_{02}), P_k(\lambda_{03}), \ldots, P_k(\lambda_{0n})$ on the n fibers, respectively $142_1, 142_2, 142_3, \ldots, 142_n$. The optical path difference between two consecutive fiber sections $142_i$ and $142_{i+1}$ where $1 \leq i \leq n-1$, is equal to D". The wavelength combiner 14b of type <<n inputs towards 1 output>> combines the n light pulses $P_k(\lambda_{01}), P_k(\lambda_{02}), P_k(\lambda_{03}), \ldots, P_k(\lambda_{0n})$ back onto fiber 13. At this stage, the n light pulses $P_k(\lambda_{01}), P_k(\lambda_{02}), \ldots, P_k(\lambda_{0n})$ of specific wavelengths $\lambda_{01}, \lambda_{02}, \ldots, \lambda_{0n}$ are delayed one from another by the time t(D") and form the group 110 of light pulses. Means 14a and 14b can be achieved with a set of inter-leavers, or by a wavelength multiplexer and demultiplexer respectively.

Figure 5D:
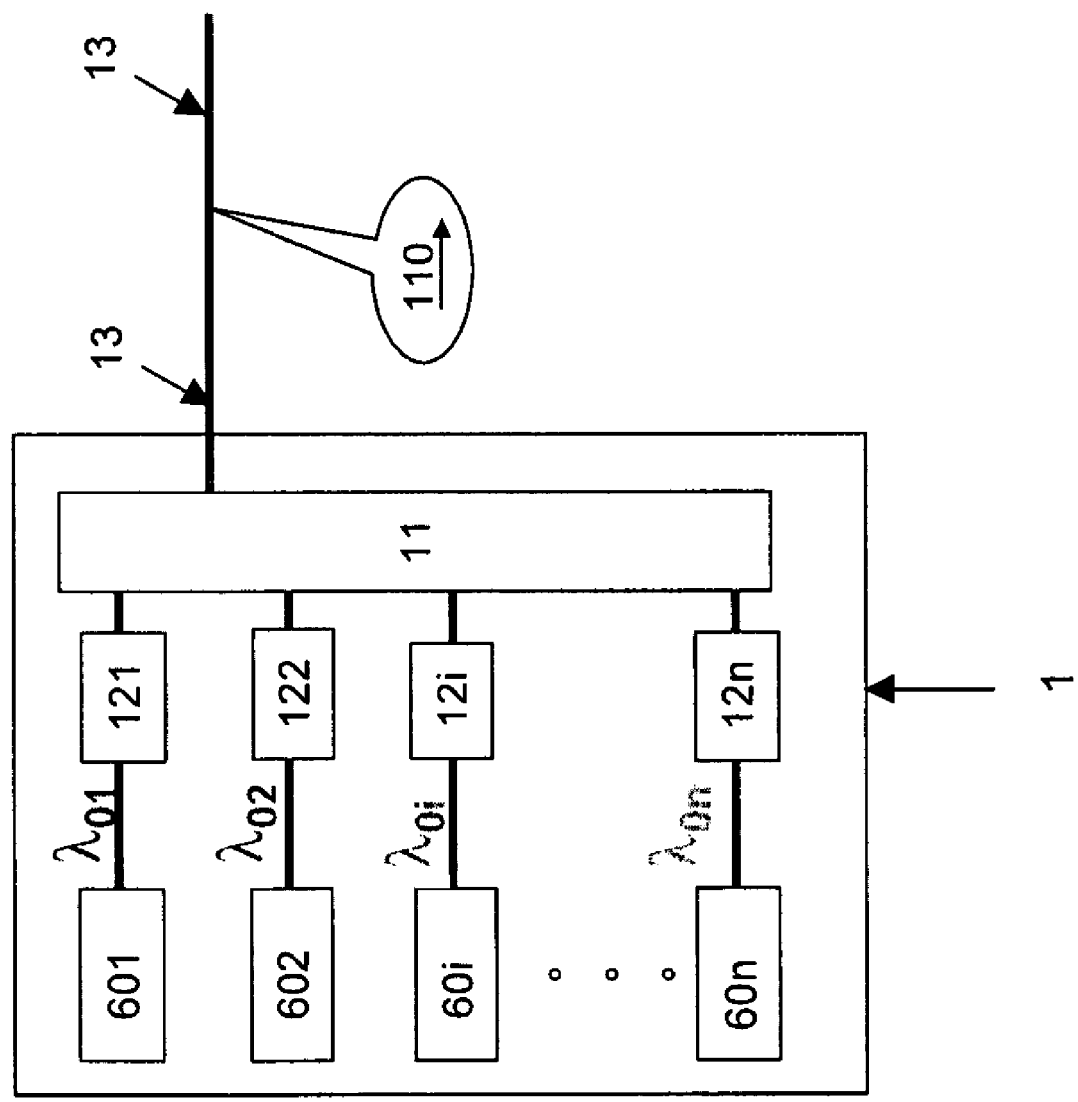

FIG. 5d shows another possible way of construction for means 1. In that scheme, n optical sources 601, 602, . . . , 60n emit each a light of wavelength, respectively $\lambda_{01}, \lambda_{02}, \ldots, \lambda_{0n}$ distinct one from another. The n optical sources are each followed by an optical switch, respectively 121, 122, . . . , 12n, and by a wavelength multiplexer 11 (of type <<n inputs towards 1 output) combining the output lights of switches 121, 122, . . . , 12n of wavelength respectively $\lambda_{01}, \lambda_{02}, \ldots, \lambda_{0n}$ onto the optical fiber 13. From the continuous wave lights of wavelength $\lambda_{01}, \lambda_{02}, \ldots, \lambda_{0n}$, at their input, the optical switches 121, 122, . . . , 12n, periodically generate with a repetition rate Tr, the light pulses $P_k(\lambda_{01}), P_k(\lambda_{02}), \ldots, P_k(\lambda_{0n})$ respectively, delayed one from another by a time t(D"). Therefore, the optical switches 121, 122, . . . , $12_n$ need to be activated successively with a time delay equals to t(D"). The wavelength multiplexer 11 'n inputs to 1 output', located at the output of the n optival switchesn allows to combine the nlight pulses $P_k(\lambda_{01}), P_k(\lambda_{02}), \ldots, P_k(\lambda_{0n})$ into the optical fiber 13 so as to form the group 110 of n light pulses delayed one from another by the time t(D").

Figure 6:
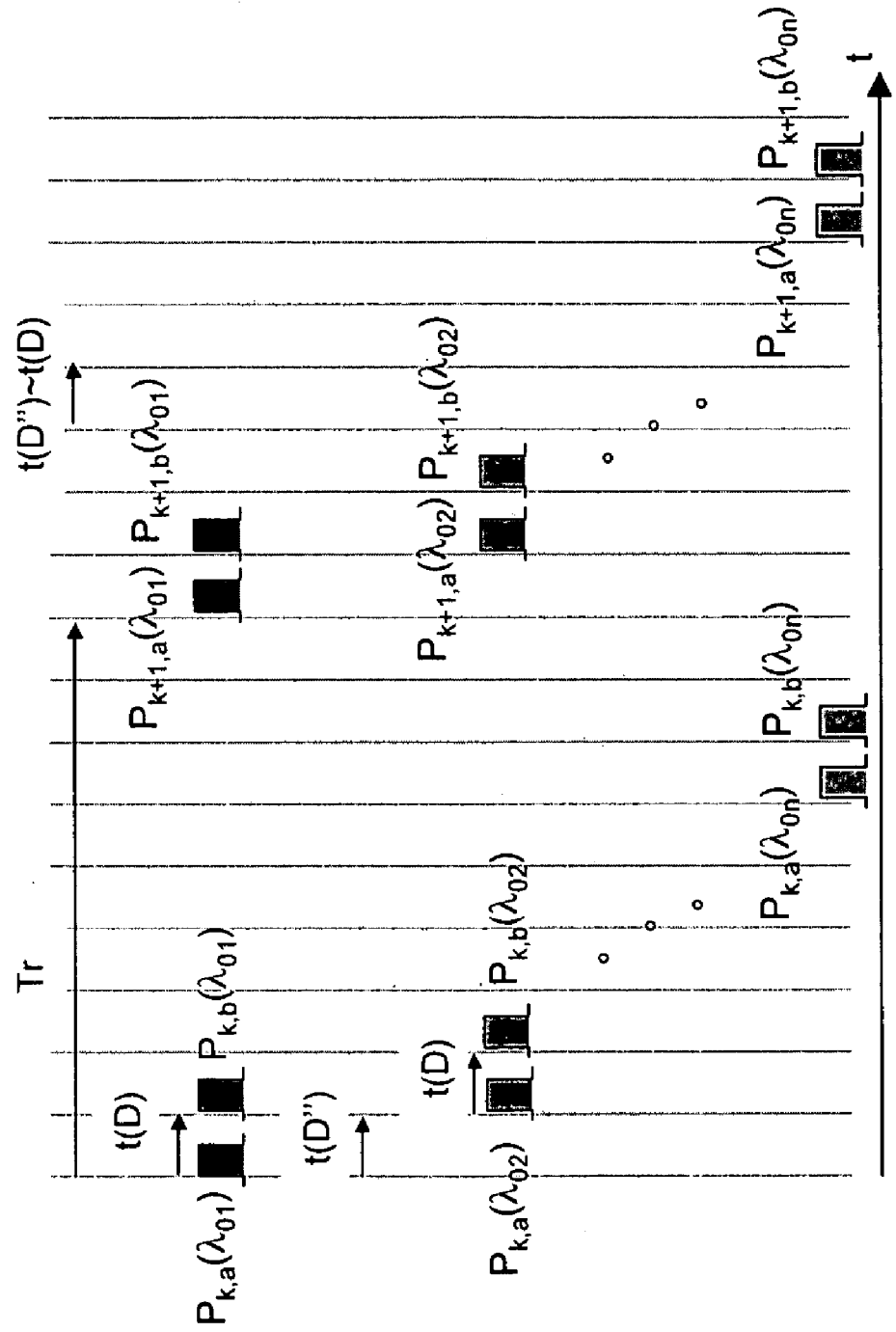
FIG. 6 is a representation of the group of n couples of light pulses resulting from the group of n light pulses represented in FIG. 5, at the output of the reference interferometer.

FIG. 6 represents the group 210 of n light pulses resulting at the output of the reference interferometer 2, from the group 110 of n light pulses at its input. More precisely, at the output of means 1, the group 110 of n light pulses $P_k(\lambda_{01}), P_k(\lambda_{02}), \ldots, P_k(\lambda_{0n})$ of wavelength respectively $\lambda_{01}, \lambda_{02}, \ldots, \lambda_{0n}$ and delayed one from another by the time t(D") are lead to the reference interferometer 2 by the optical fiber. The reference interferometer 2 is made up of two optical paths 2a et 2b of difference D, very closed to the optical path D". Thus, each of the n light pulses $P_k(\lambda_{01}), P_k(\lambda_{02}), \ldots, P_k(\lambda_{0n})$ entering the reference interferometer 2 gives rise at the output of the interferometer, to the couple of light pulses, respectively, $[P_{k,a}(\lambda_{01}), P_{k,b}(\lambda_{01})], [P_{k,a}(\lambda_{02}), P_{k,b}(\lambda_{02})], \ldots, [P_{k,a}(\lambda_{0n}), P_{k,b}(\lambda_{0n})]$. The two pulses of each of the n couples $[P_{k,a}(\lambda_{01}), P_{k,b}(\lambda_{01})], [P_{k,a}(\lambda_{02}), P_{k,b}(\lambda_{02})], \ldots, [P_{k,a}(\lambda_{0n}), P_{k,b}(\lambda_{0n})]$ are delayed one from another by a time t(D) corresponding to the time propagation of light of the optical path difference D between the paths 2a and 2b. Thus, at the output of the reference interferometer 2, the group 210 of n couples of light pulses $[P_{k,a}(\lambda_{01}), P_{k,b}(\lambda_{01})], [P_{k,a}(\lambda_{02}), P_{k,b}(\lambda_{02})], \ldots, [P_{k,a}(\lambda_{0n}), P_{k,b}(\lambda_{0n})]$ is formed, the n couples being delayed one from another by the time t(D") very closed to t(D). The group 110 of n light pulses being periodically repeated with a repetition rate Tr, the group 210 is repeated at the same repetition rate Tr. The reference interferometer 2 can was represented as a Mach Zender interferometer but can also be a Michelson interferometer.

As represented by FIG. 4, the group 210 of n couples of light pulses $[P_{k,a}(\lambda_{01}), P_{k,b}(\lambda_{01})], [P_{k,a}(\lambda_{02}), P_{k,b}(\lambda_{02})], \ldots, [P_{k,a}(\lambda_{0n}), P_{k,b}(\lambda_{0n})]$, resulting at the output of reference interferometer 2, is then driven by fiber optic 31 to a circulator 4. It is then driven by fiber optic 32 to a group (or node) 50 of n fiber optic interferometric sensors geographically located at the same point.

Figure 7:
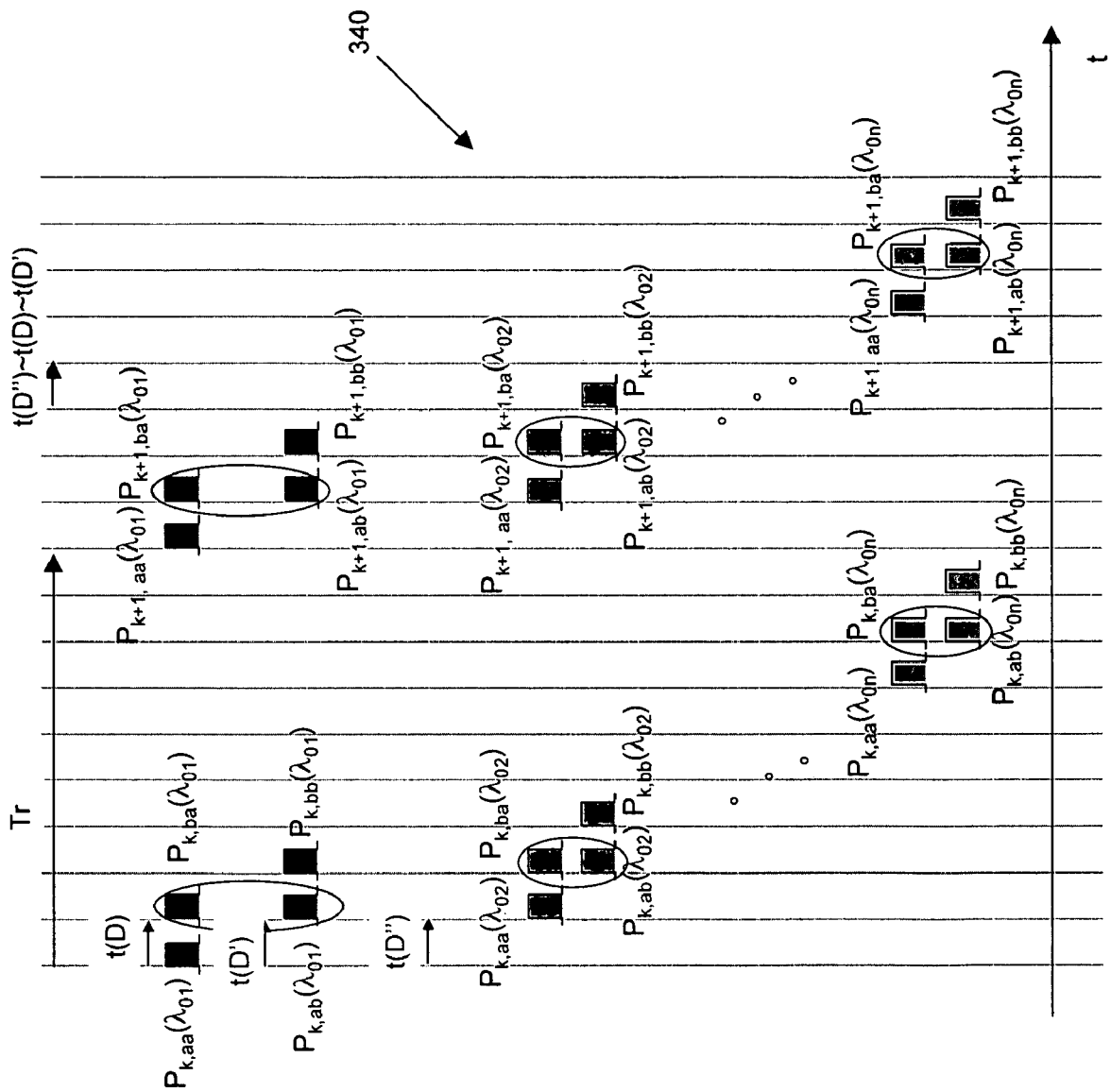
FIG. 7 is a representation of the group of n*2 couples of light pulses resulting from the n couples of light pulses represented in FIG. 6, at the output of a n FOIS-node.
Figure 8A:
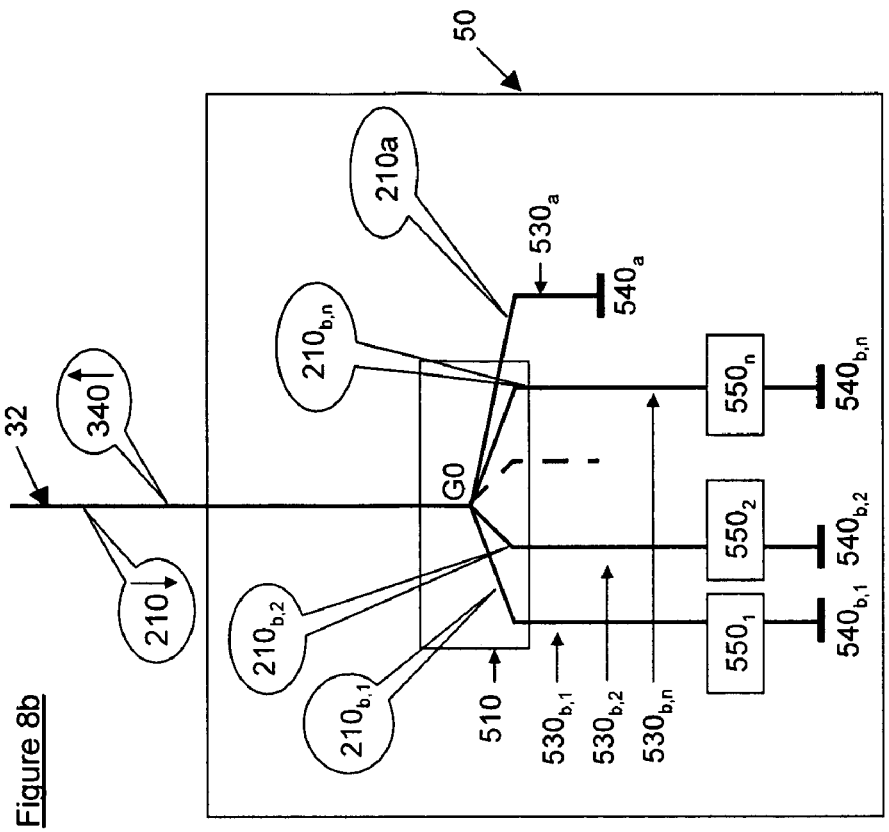
FIGS. 8a and 8b show schemes of possible ways of construction for one n FOIS-node of FIG. 4; the n FOISs of the node being spread out around the input point of the node in a 'star' arrangement.
Figure 8B:
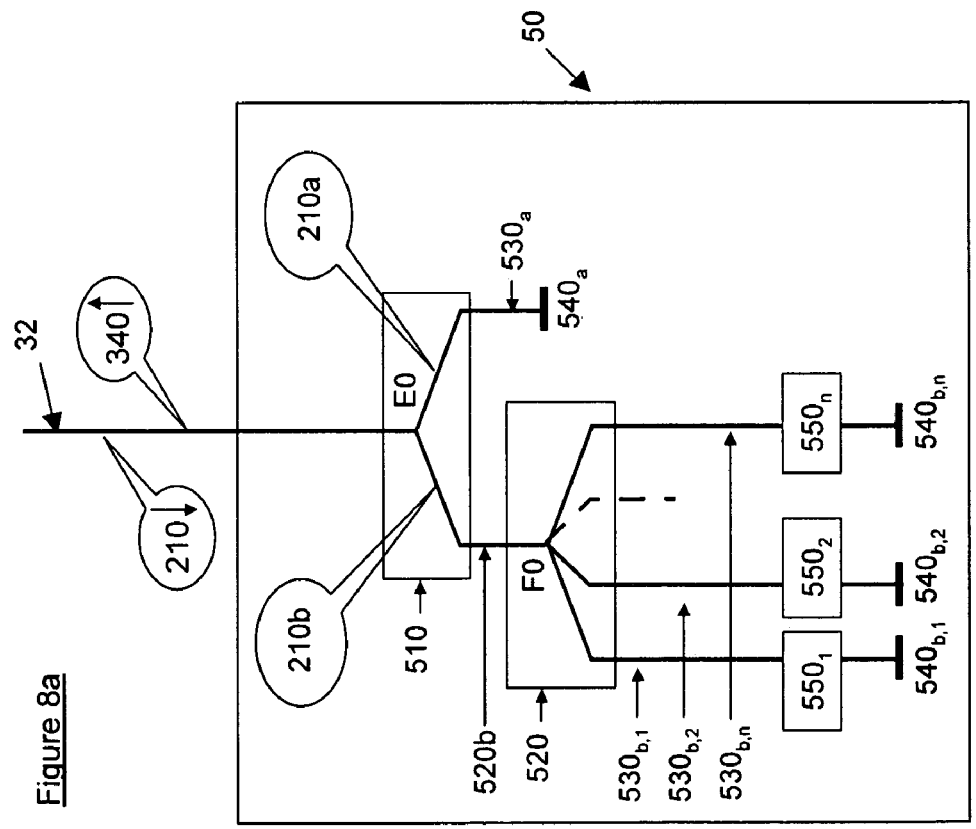

FIG. 7 represents the group 340 of n*2 couples of light pulses, resulting from the group 210 of n couples of light pulses, at the output of a group 50 of n fiber optic interferometric sensors located at the same point and set into a 'star like arrangement' around this point. FIGS. 8a and 8b show two modes of realization of such a 'star like arrangement' around a point of n fiber optic interferometric sensors forming the group 50. According to these two modes of realization, the n fiber optic interferometric sensors are Michelson interferometers.

In the mode of realization presented by FIG. 8a, the n fiber optic interferometric sensors share the same short arm forming the short optical path of the interferometers. The shared short arm is made up of the fiber optic section $530_a$ delimited by the input point E0 (of the group 50) and a reference mirror $540_a$. In addition the n interferometric sensors each comprise a long arm of its own forming the long optical path of each interferometer. The n long arms of the n interferometric sensors are each made up of the fiber optic section $520_b$ delimited by the input point E0 and point F0 (the fiber section $520_b$ is common to all the sensors), added to the distinct fiber optic section for each of the n sensors respectively $530_{b,1}$, $530_{b,2}, \ldots, 530_{b,n}$ delimited by point F0 and mirrors $540_{b,1}$, $540_{b,2}, \ldots, 540_{b,n}$ respectively. The n fiber optic interferometric sensors comprise each a compliant body respectively $550_1, 550_2, \ldots, 550_n$, on which fiber optic sections $530_{b,1}$, $530_{b,2}, \ldots, 530_{b,n}$ are respectively arranged. The round trip optical path difference between the long and short arms of each of the n fiber optic interferometric sensors of group 50 is equal to D' and is very closed to the optical path difference D of the reference interferometer 2. In the mode of realization presented by FIG. 8a, the n mirrors $540_{b,1}, 540_{b,2}, \ldots, 540_{b,n}$ can either be selective or not in wavelength. If the n mirrors $540_{b,1}, 540_{b,2}, \ldots, 540_{b,n}$ are wavelength selective, they preferentially are Fiber Bragg Gratings that selectively reflects, respectively, wavelength $\lambda_{01}, \lambda_{02}, \ldots \lambda_{0n}$. In the mode of realization presented by FIG. 8a, mirror $540_a$ is a non wavelength selective mirror that reflects all the wavelengths $\lambda_{01}, \lambda_{02}, \ldots, \lambda_{0n}$. The group 210 of n couples of light pulses $[P_{k,a}(\lambda_{01}), P_{k,b}(\lambda_{01})], [P_{k,a}(\lambda_{02}), P_{k,b}(\lambda_{02})], \ldots, [P_{k,a}(\lambda_{0n}), P_{k,b}(\lambda_{0n})]$ entering the group 50 of n fiber optic interferometric sensors is driven by fiber optic 32 to a fiber optic coupler 510 of type <<1 input towards 2 outputs>>. The group 210 of n couples of light pulses is thus power divided into two groups 210a and 210b of n couples of light pulses, carried respectively by fiber $530_a$ and $520_b$. The group 210a is carried by the short optical path $530_a$ shared by the n fiber optic interferometric sensors, and reflected by the non wavelength selective mirror 540a; it is then recoupled into the optical fiber 32 by the fiber optic coupler 510: back onto the fiber optic 32, the group 210a is made up of n couples of light pulses $[P_{k,aa}(\lambda_{01}), P_{k,ba}(\lambda_{01})], [P_{k,aa}(\lambda_{02}), P_{k,ba}(\lambda_{02})], \ldots, [P_{k,aa}(\lambda_{0n}), P_{k,ba}(\lambda_{0n})]$, the n couples being time delayed one from another by the time t(D"), the 2 pulses of each couple being time delayed one from another by the time t(D), the times t(D") being very closed to the time t(D). The group 210b of n couples of light pulses, formed onto the optical fiber 520b, is driven to a wavelength demultiplexer 520 of type <<1 input towards n outputs>>. The wavelength demultiplexer 520 separates the group 210b of n couples of pulses into n couples of pulses, respectively $[P_{k,ab}(\lambda_{01}), P_{k,bb}(\lambda_{01})]$ onto the optical fiber $530_{b,1}$, $[P_{k,ab}(\lambda_{02}), P_{k,bb}(\lambda_{02})]$ onto the optical fiber $530_{b,2}, \ldots, [P_{k,ab}(\lambda_{0n}), P_{k,bb}(\lambda_{0n})]$ onto the optical fiber $530_{b,n}$. The optical fibers $530_{b,1}, 530_{b,2}, \ldots, 530_{b,n}$ are ended respectively by the mirrors $540_{b,1}, 540_{b,2}, \ldots, 540_{b,n}$. The n couples of pulses $[(P_{k,ab}(\lambda_{01}), P_{k,bb}(\lambda_{01})], [(P_{k,ab}(\lambda_{02}), P_{k,bb}(\lambda_{02}), \ldots, (P_{k,ab}(\lambda_{0n}), P_{k,bb}(\lambda_{0n})]$ are then reflected respectively by the mirrors $540_{b,1}, 540_{b,2}, \ldots, 540_{b,n}$ and driven back to the wavelength demultiplexer 520 respectively by the optical fibers $530_{b,1}, 530_{b,2}, \ldots, 530_{b,n}$. The wavelength demultiplexer 520 (that works symmetrically regarding the light sense of propagation) combines the n couples of pulses $[(P_{k,ab}(\lambda_{01}), P_{k,bb}(\lambda_{01})], [(P_{k,ab}(\lambda_{02}), P_{k,bb}(\lambda_{02}), \ldots, [(P_{k,ab}(\lambda_{0n}), P_{k,bb}(\lambda_{0n})]$ back onto the optical fiber 520b. The recombined group of n couples of pulses $[P_{k,ab}(\lambda_{01}), P_{k,bb}(\lambda_{01})]$, $[P_{k,ab}(\lambda_{02}), P_{k,bb}(\lambda_{02})], \ldots, P_{k,ab}(\lambda_{0n}), P_{k,bb}(\lambda_{0n})$ is then recoupled onto the optical fiber 32 by the fiber optic coupler 510. Back onto the optical fiber 32, the group 210b is thus made up of n couples of pulses $[P_{k,ab}(\lambda_{01}), P_{k,bb}(\lambda_{01})], [P_{k,ab}(\lambda_{02}), P_{k,bb}(\lambda_{02})], \ldots, [P_{k,ab}(\lambda_{0n}), P_{k,bb}(\lambda_{0n})]$, the n couples of pulses being time delayed one from another by the time t(D"), the 2 pulses of each couple being time delayed one another by the time t(D), t(D") and being very closed to t(D). In addition, back onto the optical fiber 32, the two couples of pulses $[P_{k,aa}(\lambda_{01}), P_{k,ba}(\lambda_{01})]$ and $[P_{k,ab}(\lambda_{01}), P_{k,bb}(\lambda_{01})]$ (respectively $[P_{k,aa}(\lambda_{02}), P_{k,ba}(\lambda_{02})]$ and $[P_{k,ab}(\lambda_{02}), P_{k,bb}(\lambda_{02})], \ldots, [P_{k,aa}(\lambda_{0n}), P_{k,ba}(\lambda_{0n})]$ and $[P_{k,ab}(\lambda_{0n}), P_{k,bb}(\lambda_{0n})]$), from respectively groups 210a and 210b, are time delayed one from another by the time t(D") corresponding to the time propagation of light through the round trip optical path difference between the short and long arms of each of the n fiber optic interferometric sensors of group 50. Thus, at the output of the node 50 of n fiber optic interferometric sensors, the group 340 of n*2 couples of pulses $[P_{k,aa}(\lambda_{01}), P_{k,ba}(\lambda_{01})], [P_{k,ab}(\lambda_{01}), P_{k,bb}(\lambda_{01})], [P_{k,aa}(\lambda_{02}), P_{k,ba}(\lambda_{02})], [P_{k,ab}(\lambda_{02}), P_{k,bb}(\lambda_{02})], \ldots, [P_{k,aa}(\lambda_{0n}), P_{k,ba}(\lambda_{0n})], [P_{k,ab}(\lambda_{0n}), P_{k,bb}(\lambda_{0n})]$, represented by FIG. 7, is formed: the 2 couples of pulses $\{[P_{k,aa}(\lambda_{01}), P_{k,ba}(\lambda_{01})], [P_{k,ab}(\lambda_{01}), P_{k,bb}(\lambda_{01})]\}$, and the 2 couples of pulses $\{[P_{k,aa}(\lambda_{0(i+1)}), P_{k,ba}(\lambda_{0(i+1)})], [P_{k,ab}(\lambda_{0(i+1)}), P_{k,bb}(\lambda_{0(i+1)})]\}$, $1 \leq i \leq n$, being time delayed one from another by the time t(D"), the 2 couples of pulses $[P_{k,aa}(\lambda_{0i}), P_{k,ba}(\lambda_{0i})]$ and $[P_{k,ab}(\lambda_{0i}), P_{k,bb}(\lambda_{0i})]$ being time delayed one from another by the time t(D'), and the two pulses $P_{k,aa}(\lambda_{0i})$ and $P_{k,ba}(\lambda_{0i})$ of couple $[P_{k,aa}(\lambda_{0i}), P_{k,ba}(\lambda_{0i})]$ and $P_{k,ab}(\lambda_{0i})$ and $P_{k,bb}(\lambda_{0i})$ of couple $[P_{k,ab}(\lambda_{0i}), P_{k,bb}(\lambda_{0i})]$ being time delayed one from another by the time t(D), the times t(D), t(D') and t(D") being very closed. The group 110 of light pulses being time repeated with a repetition rate Tr, the group 340 of light pulses is time repeated at the same repetition rate.

In the mode of realization presented by FIG. 8b, the n fiber optic interferometric sensors each comprise the same short arm that corresponds to the fiber optic section $530_a$ delimited by the point G0 and the reference mirror $540_a$; in addition, the n interferometric sensors comprise each a long arm of its own that corresponds respectively to the fiber optic sections $530_{b,1}, 530_{b,2}, \ldots, 530_{b,n}$ delimited by the point G0 and respectively the mirrors $540_{b,1}, 540_{b,2}, \ldots, 540_{b,n}$. The n fiber optic interferometric sensors comprise each a compliant body respectively $550_1, 550_2, \ldots, 550_n$, on which fiber optic sections $530_{b,1}, 530_{b,2}, \ldots, 530_{b,n}$ are respectively arranged. The round trip optical path difference between the short and long arms of each of the n fiber optic interferometric sensors of group 50 equals D' and is very closed to the difference D between the optical paths 2a et 2b of reference interferometer 2. In the mode of realization presented by FIG. 8b, the n mirrors $540_{b,1}$, $540_{b,2}$, ..., $540_{b,n}$ are wavelength selective, and each selectively reflects, respectively wavelength $\lambda_{01}$, $\lambda_{02}$, ..., $\lambda_{0n}$. Mirrors $540_{b,1}$, $540_{b,2}$, ..., $540_{b,n}$ are preferentially Fiber Bragg Gratings. The mirror $540_a$ is a non wavelength selective mirror that reflects all the wavelengths $\lambda_{01}$, $\lambda_{02}$, ... $\lambda_{0n}$. The group 210 of n couples of pulses $[P_{k,a}(\lambda_{01})$, $P_{k,b}(\lambda_{01})]$, $[P_{k,a}(\lambda_{02}), P_{k,b}(\lambda_{02})]$, ..., $[P_{k,a}(\lambda_{0n}), P_{k,b}(\lambda_{0n})]$ entering the group 50 of n fiber optic interferometric sensors is driven by the optical fiber 32 to a fiber optic coupler 510 of type <<1 input towards (n+1) outputs>>. The fiber optic coupler 510 divides the light power coming from the optical fiber 32 onto (n+1) optical fibers $530_{b,1}$, $530_{b,2}$, ..., $530_{b,n}$ and $530a$. The group 210 of n couples of pulses $[P_{k,a}(\lambda_{01})$, $P_{k,b}(\lambda_{01})]$, $[P_{k,a}(\lambda_{02}), P_{k,b}(\lambda_{02})]$, ..., $[P_{k,a}(\lambda_{0n}), P_{k,b}(\lambda_{0n})]$ is thus divided into (n+1) groups $210_{b,1}, 210_{b,2}, \ldots, 210_{b,n}$ et $210_a$ of n couples of pulses carried on respectively by the optical fibers $530_{b,1}$, $530_{b,2}$, ..., $530_{b,n}$ et $530_a$, the (n+1) groups $210_{b,1}, 210_{b,2}, \ldots, 210_{b,n}$ and $210_a$ each comprising n couples of pulses $[P_{k,a}(\lambda_{01}), P_{k,b}(\lambda_{01})]$, $[P_{k,a}(\lambda_{02}), P_{k,b}(\lambda_{02})]$, ..., $[P_{k,a}(\lambda_{0n}), P_{k,b}(\lambda_{0n})]$. The group $210a$ is reflected by the non wavelengths selective mirror $540a$, and coupled back onto the optical fiber 32 by the fiber optic coupler 510: back onto the optical fiber 32, the group $210a$ is made up of n couples of pulses $[P_{k,aa}(\lambda_{01}), P_{k,ba}(\lambda_{01})]$, $[P_{k,aa}(\lambda_{02}), P_{k,ba}(\lambda_{02})]$, ..., $[P_{k,aa}(\lambda_{0n}), P_{k,ba}(\lambda_{0n})]$, the n couples of pulses being time delayed one from another by the time t(D"), the 2 pulses of each couple being time delayed one from another by the time t(D), the time t(D") being very closed to the time t(D). The group $210_{b,1}$ (respectively $210_{b,2}, \ldots, 210_{b,n}$) of n couples of pulses is reflected by mirror $540_{b,1}$ (respectively $540_{b,2}, \ldots$ $540_{b,n}$) that selectively reflects the wavelength $\lambda_{01}$ (respectively $\lambda_{02}, \lambda_{0n}$): back from mirror $540_{b,1}$ (respectively $540_{b,2}, \ldots, 540_{b,n}$), the group $210_{b,1}$ (respectively $210_{b,2}, \ldots, 210_{b,n}$) is then made up of the unique couple of pulses $[P_{k,ab}(\lambda_{01}), P_{k,bb}(\lambda_{01})]$ (respectively $[P_{k,ab}(\lambda_{02}), P_{k,bb}(\lambda_{02})], \ldots, [P_{k,ab}(\lambda_{0n}), P_{k,bb}(\lambda_{0n})]$), recoupled onto the optical fiber 32 by the fiber optic coupler 510. Back onto the optical fiber 32, the groups $210_{b,1}, 210_{b,2}, 210_{b,n}$ form a group of n couples of pulses $[P_{k,ab}(\lambda_{01}), P_{k,bb}(\lambda_{01})]$, $[P_{k,ab}(\lambda_{02}), P_{k,bb}(\lambda_{02})], \ldots, [P_{k,ab}(\lambda_{0n}), P_{k,bb}(\lambda_{0n})]$, the n couples of pulses being time delayed one from another by the time t(D"), the two pulses of each couple being time delayed one from another by the time t(D), the time t(D") being very closed to the time t(D). Thus, at the output of the group 50 of n fiber optic interferometric sensors, the group 340 of n*2 couples of pulses $[P_{k,aa}(\lambda_{01}), P_{k,ba}(\lambda_{01})]$, $[P_{k,ab}(\lambda_{01}), P_{k,bb}(\lambda_{01})]$, $[P_{k,aa}(\lambda_{02}), P_{k,ba}(\lambda_{02})]$, $[P_{k,ab}(\lambda_{02}), P_{k,bb}(\lambda_{02})], \ldots, [P_{k,aa}(\lambda_{0n}), P_{k,ba}(\lambda_{0n})]$, $[P_{k,ab}(\lambda_{0n}), P_{k,bb}(\lambda_{0n})]$, represented by FIG. 7, is formed: the 2 couples of pulses $\{[P_{k,aa}(\lambda_{0i}), P_{k,ba}(\lambda_{0i})]$, $[P_{k,ab}(\lambda_{0i}), P_{k,bb}(\lambda_{0i})]\}$, and the 2 couples of pulses $\{[P_{k,aa}(\lambda_{0(i+1)}), P_{k,bb}(\lambda_{0(i+1)})]$, $[P_{k,ab}(\lambda_{0(i+1)}), P_{k,bb}(\lambda_{0(i+1)})]\}$, $1 \leq i \leq n$, being time delayed one from another by the time t(D"), the 2 couples of pulses $[P_{k,aa}(\lambda_{0i}), P_{k,ba}(\lambda_{0i})]$ and $[P_{k,ab}(\lambda_{0i}), P_{k,bb}(\lambda_{0i})]$ being time delayed one from another by the time t(D'), and the two pulses $P_{k,aa}(\lambda_{0i})$ and $P_{k,ba}(\lambda_{0i})$ of couple $[P_{k,aa}(\lambda_{0i}), P_{k,ba}(\lambda_{0i})]$ and $P_{k,ab}(\lambda_{0i})$ and $P_{k,bb}(\lambda_{0i})$ of couple $[P_{k,ab}(\lambda_{0i}), P_{k,bb}(\lambda_{0i})]$ being time delayed one from another by the time t(D), the times t(D), t(D') and t(D") being very closed. The group 110 of light pulses being time repeated with a repetition rate Tr, the group 340 of light pulses is time repeated at the same repetition rate.

In accordance with FIG. 4, the group 340 of n*2 couples of pulses is then driven to the optical fiber 33 by the fiber optic circulator 4, and then carried to the optical photo-detector 70. By construction, the 2 pulses out of each of the n fiber optic interferometric sensors of group 50, $P_{k,ab}(\lambda_{0i})$ and $P_{k,ba}(\lambda_{0i})$ ($1 \leq i \leq n$), get to the photo-detector 70 at the same time, and the optical fields (born by the two pulses) can interfere together. The light pulse $P_{k,ba}(\lambda_{0i})$ carried by the long optical path 2b of reference interferometer 2 and the short optical path of the fiber optic interferometric sensor i is not subjected to any external perturbation, whereas pulse $P_{k,ab}(\lambda_{0i})$ carried by the short optical path 2a of reference interferometer 2 and the long optical path of the fiber optic interferometric sensor i is subjected to the external perturbations. Also, by construction and thanks to means 1 ensuring the time separation of the wavelengths $\lambda_{0i}$, $1 \leq i \leq n$ at the optical sources level the group 50 of n fiber optic interferometric sensors located at the same point and set into a 'star' like arrangement around the input point of the group 50, each sensor i of the group 50 being associated with a distinct wavelength $\lambda_{0i}$ of the present invention, the n fiber interferometric signals resulting from the n fiber optic sensors are time separated, without the need to add fiber optic sections of accurate length in between any two sensors, or without making use of the long sensitive arms of the sensors. The separation of the n interferometric signals from the in fiber optic interferometric sensors can thus be achieved through the time gating of the pulses. The demodulator 80 at the output of photo-detector 70 allows to continuously compute the phase difference between the optical fields born by pulses $P_{k,ab}(\lambda_{0i})$ and $P_{k,ba}(\lambda_{0i})$ ($1 \leq i \leq n$), and thus to evaluate the external perturbations locally applied on each fiber optic interferometric sensor.

The system described above shows several advantages. Indeed the time delays in between the n interferometric signals of a group of n time-multiplexed interferometric sensors are generated by the means 1 at the level of the optical sources, and not at the level of the sensors themselves in accordance to previous art systems. In addition, the 'star' like arrangement of the n fiber interferometric sensors of group 50 doesn't affect the time delays generated by the means 1. Thus, on the contrary to the previous art systems, there is no need to add fiber sections of accurate length in between any two sensors, reducing the system building costs and increasing its reliability; the fiber optic sections forming the long arm and sensitive part of each sensor are not used neither, reducing the Cross Talk between the multiplexed sensors.

Figure 9:
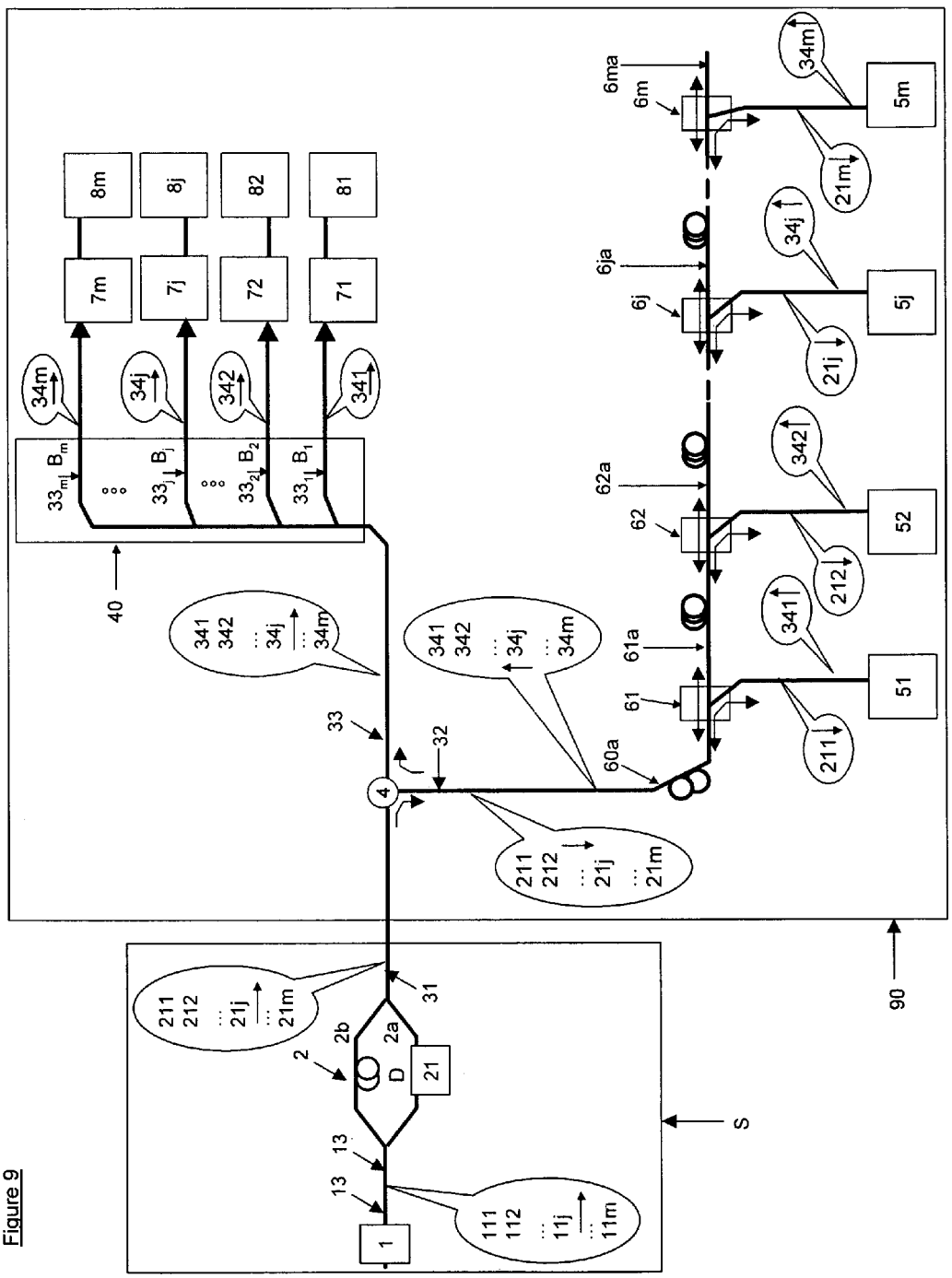
FIG. 9 shows a scheme of a system in accordance with the present invention, based on a combination of the TDM and WDM techniques, and capable of interrogating m groups (or nodes), each made of n FOISs localized at the same point, the distance or fiber length between any two nodes being allowed to be of any value.

FIG. 9 is a schematic of a system in accordance with the present invention, increasing the multiplexing density of the system described by FIG. 4 to m nodes (or groups) of n interferometric sensors each, and in which, the n fiber optic sensors are located at the same point; the m nodes of the system can be spaced by any fiber length. The means 1 generate the m groups 111, 112, ..., 11j, ..., 11m of light pulses dedicated to the interrogation respectively of the m groups (or nodes) 51, 52, ..., 5j, ..., 5m of n sensors each. The m groups 111, 112, ..., 11j, ..., 11m of pulses are driven by the optical fiber 13 to a reference interferometer 2, of which the short arm 2a comprises means 21 capable of actively phase modulating the optical field that goes through it, and of which the optical path difference between long and short arms equals D. The means 1 and reference interferometer 2 form together the interrogation system S of sub-array 90, made up of m nodes of n sensors each. At the output of reference interferometer 2, the m groups 111, 112, ..., 11j, ..., 11m of light pulses give rise to m groups 211, 212, ..., 21j, ..., 21m of light pulses that are driven by the optical fiber 31 to circulator 4, and directed by the latest onto the optical fiber 32. The optical fiber 32 enters the m groups 51, 52, ..., 5j, ..., 5m of n sensors. The m groups 51, 52, ..., 5j, ..., 5m are successively spread onto the optical fiber 32, and respectively separated by the optical fiber sections 61a, 62a, ..., 6ja, ..., 6jm. These fiber optic sections can be of any length and don't have to be equal in length. The means 61, 62, ..., 6j, ..., 6m selectively extracts, respectively the wavelength band $B_1, B_2, \ldots, B_j, \ldots, B_m$ towards, respectively the group 51, 52, ..., 5m of n fiber optic sensors. Thus, the group 211 (respectively 212, ..., 21j, ..., 21m) of pulses is carried to the group 51 (respectively 52, ..., 5j, ..., 5m) of sensors, at the output of which it gives rise to the group 341 of pulses (respectively 342, ..., 34j, ..., 34m). Group 341 (respectively 342, ..., 34j, ..., 34m) is recombined back onto the optical fiber 32 by the component 61 (respectively 62, ..., 6j, ..., 6m). The m groups 341, 342, ..., 34j, ..., 34m are driven by the optical fiber 32 to the circulator 4 that drives them to the optical fiber 33 and to a m wavelength bands demultiplexer 40 of type <<1 input towards m outputs>>. Demultiplexer 40 separates each of the m wavelength bands $B_1, B_2, \ldots, \ldots, B_j, \ldots, B_m$ respectively onto the m output optical fibers $33_1, 33_2, \ldots, 33_j, \ldots, 33_m$. Thus the m groups of pulses 341, 342, ..., 34j, ..., 34m are each driven respectively to the photodetectors 71, 72, ..., 7j, ..., 7m, followed respectively by demodulators 81, 82, ..., 8j, ..., 8m.

Figure 10:
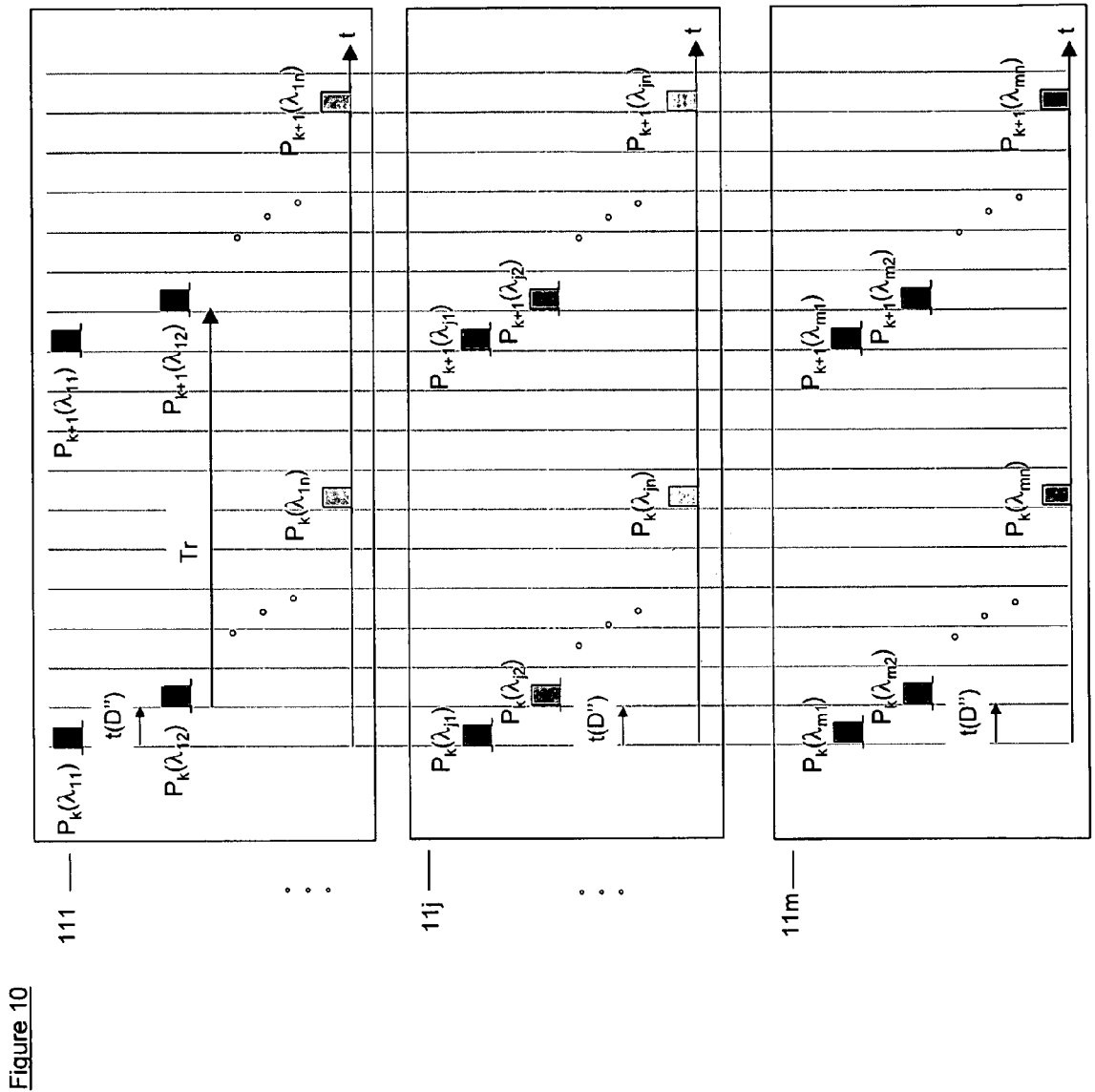
FIG. 10 is a representation of the light sent in the telemetry fiber that is required to interrogate the m*n FOISs; this light is made up of m groups of light pulses; each group consisting of n light pulses of distinct wavelengths and time delayed one from another; the m groups being generated at a repetition rate Tr.

FIG. 10 is a representation of the light coupled into the telemetry optical fiber 13, to interrogate the m groups (or nodes) 51, 52, ..., 5j, ..., 5m, each of the m groups 5j being made up of n fiber optic interferometric sensors located at the same point and set in a 'star' like arrangement around the input point of the group 5j. The light coupled into the optical fiber 13 is made up of the m groups 111, 112, ..., 11j, ..., 11m, each of the m groups 11j being made up of n light pulses $P_k(\lambda_{j1}), P_k(\lambda_{j2}), \ldots, P_k(\lambda_{jn})$ of specific wavelength respectively $\lambda_{j1}, \lambda_{j2}, \ldots, \lambda_{jn}$. The n light pulses $P_k(\lambda_{j1}), P_k(\lambda_{j2}), \ldots, P_k(\lambda_{jn})$ are time delayed one from another by the time t(D") very closed to the time t(D) of light propagation through the optical path D. The means 1 periodically generate the m groups 111, 112, ..., 11j, ..., 11m of n light pulses with a repetition rate Tr.

FIGS. 10a, 10b, 10c and 10d show different modes of realization for means 1, capable of generating the m groups 111, 112, ..., 11j, ..., 11m, each of the m groups 11j, $1 \leq j \leq m$, being made up of n light pulses $P_k(\lambda_{j1}), P_k(\lambda_{j2}), \ldots, P_k(\lambda_{jn})$ of specific wavelength respectively $\lambda_{j1}, \lambda_{j2}, \ldots, \lambda_{jn}$, the n light pulses being delayed one from another by the time t(D") very closed to the time t(D) of light propagation through the optical path difference D in the reference interferometer 2.

Figure 10A:
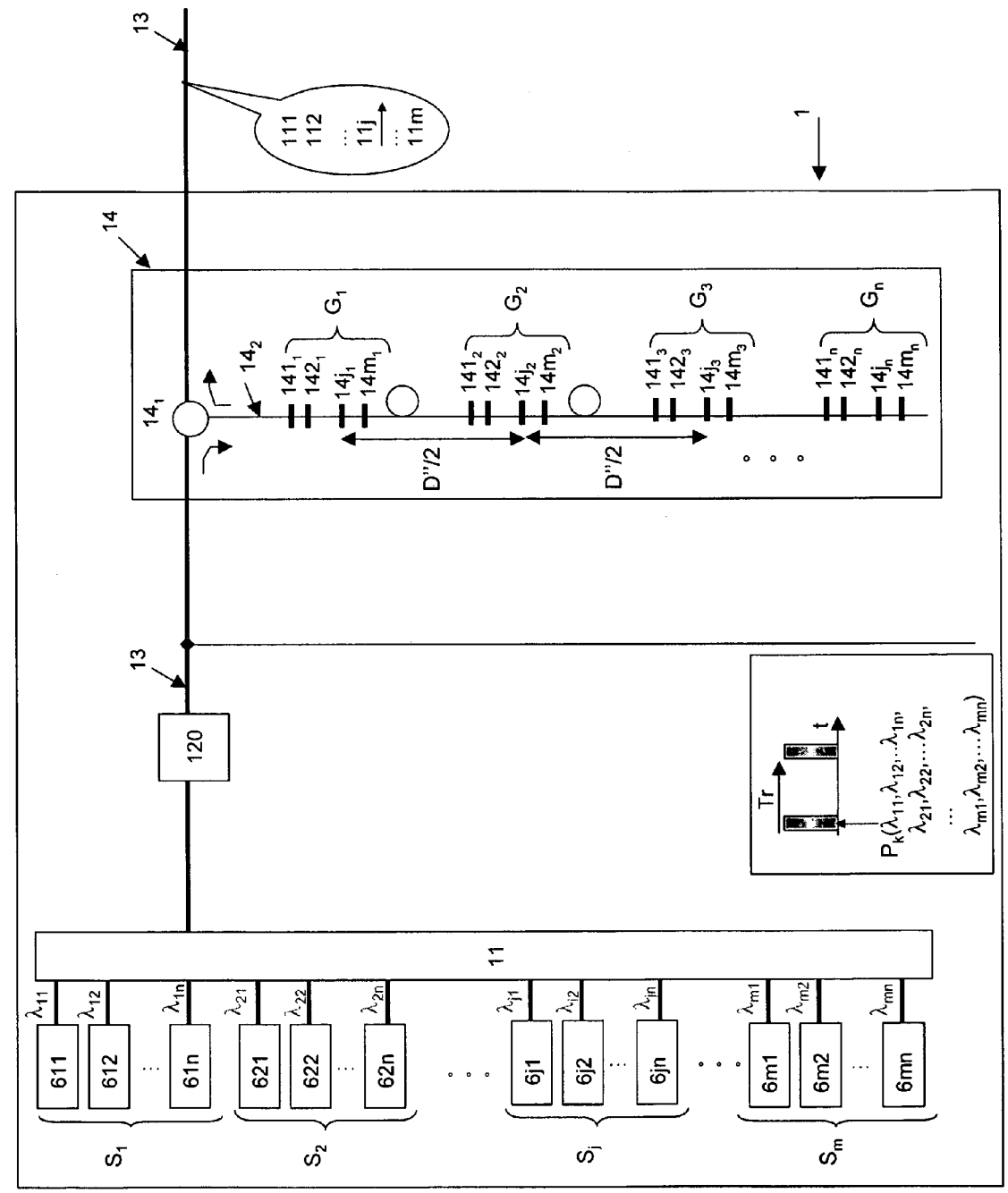
FIG. 10a, 10b, 10c, 10d show schemes of possible ways of construction for means 1 capable of generating the m groups of light pulses described in FIG. 10.
Figure 10B:
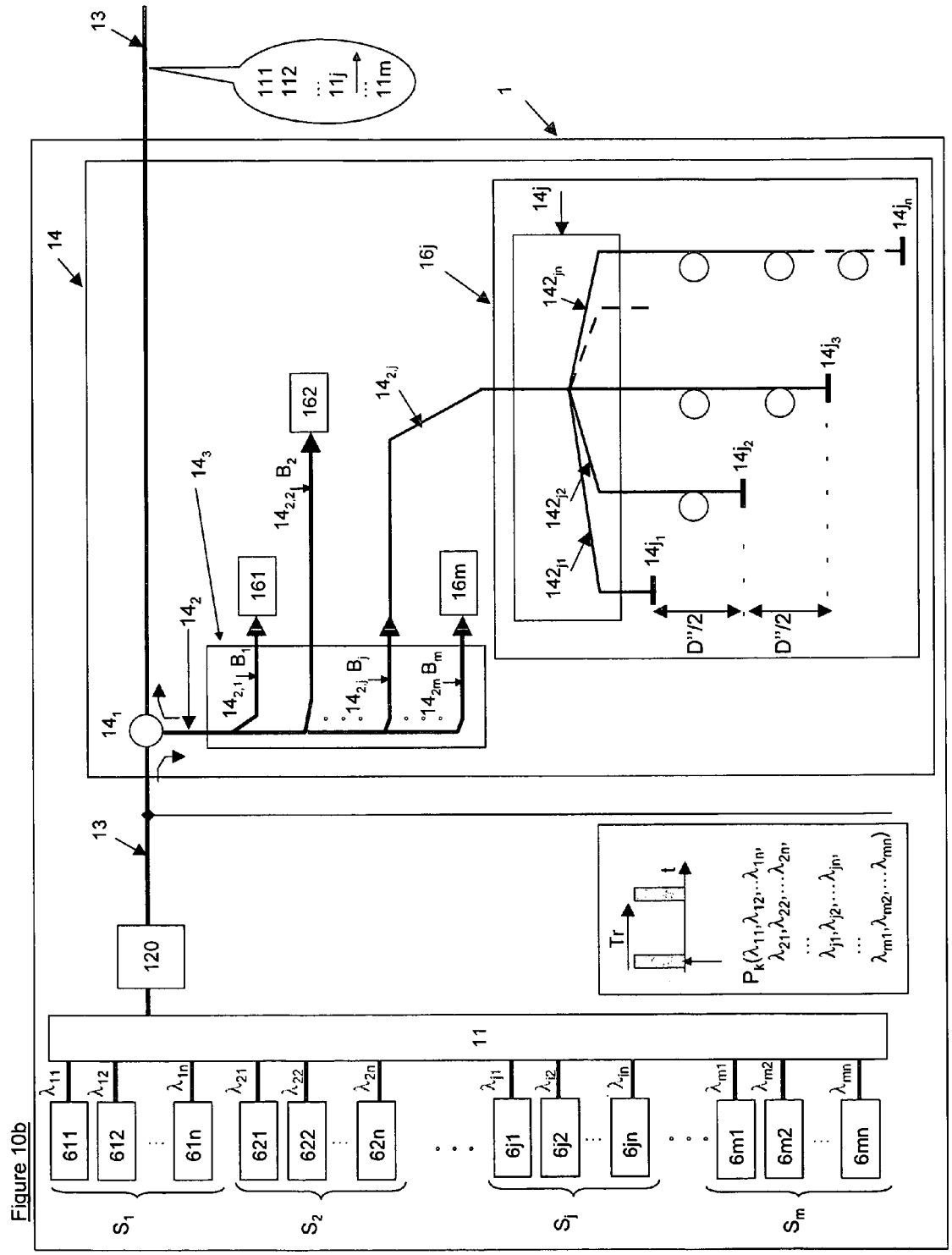
Figure 10C:
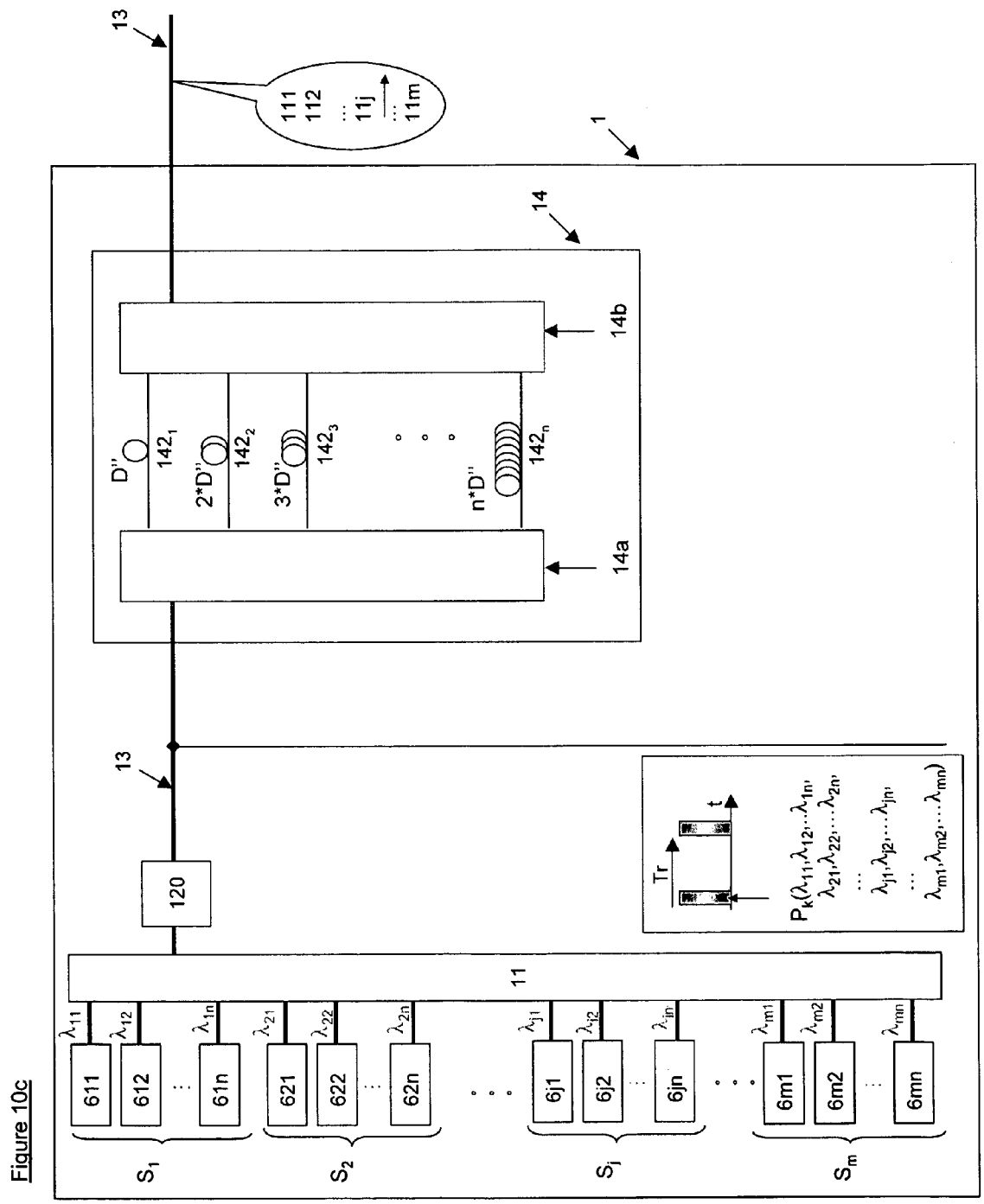

The modes of realization of means 1 shown by FIGS. 10a, 10b and 10c comprise m*n optical sources forming m groups $S_1=(611, 612, \ldots, 61n), S_2=(621, 622, \ldots, 62n), \ldots, S_j=(6j1, 6j2, \ldots, 6jn), \ldots, S_m=(6m1, 6m2, \ldots, 6mn)$. The m*n sources emit a continuous wave light of specific wavelength respectively $\lambda_{11}, \lambda_{12}, \ldots, \lambda_{1n}, \lambda_{21}, \lambda_{22}, \ldots \lambda_{2n}, \ldots, \lambda_{j1}, \lambda_{j2}, \ldots, \lambda_{jn}, \ldots, \lambda_{m1}, \lambda_{m2}, \ldots, \lambda_{mn}$ distinct one from another. The m groups $S_1, S_2, \ldots, S_j, \ldots S_m$ form m wavelength bands, respectively $B_1=(\lambda_{11}, \lambda_{12}, \ldots, \lambda_{1n}), B_2=(\lambda_{21}, \lambda_{22}, \ldots, \lambda_{2n}), \ldots, B_j=(\lambda_{j1}, \lambda_{j2}, \ldots, \lambda_{jn}), \ldots, B_m=(\lambda_{m1}, \lambda_{m2}, \ldots, \lambda_{mn})$. At the output of the m*n optical sources (611, 612, ..., 61n), (621, 622, ..., 62n), ..., (6j1, 6j2, ..., 6jn), ..., (6m1, 6m2, ..., 6mn), a wavelength multiplexer 11 combines the m*n lights of specific wavelength $\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn}$ onto the optical fiber 13; the continuous wave light that comprises the m*n wavelengths $\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn}$ is carried to an optical switch 120. The latest periodically generates a light pulse $P_k(\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn})$, spectrally made up of the m*n wavelengths $\lambda_1, \lambda_{12}, \ldots, \lambda_{1n}, \lambda_{21}, \lambda_{22}, \ldots, \lambda_2n, \ldots, \lambda_{j1}, \lambda_{j2}, \ldots, \lambda_{jn}, \ldots, \lambda_{m1}, \lambda_{m2}, \ldots, \lambda_{mn}$. The light pulse $P_k(\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn})$ resulting at the output of the optical switch 120, is thus driven to means 14 by the optical fiber 13. From a light pulse $P_k(\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn})$, spectrally made up of the m*n wavelengths $\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn}$, the means 14 are capable of generating the m groups of pulses 111, 112, ..., 11j, ..., 11m, each of the m groups 11j, $1 \leq j \leq m$, being made up of n light pulses $P_k(\lambda_{j1}), P_k(\lambda_{j2}), \ldots, P_k(\lambda_{jn})$ of specific wavelength respectively $\lambda_{j1}, \lambda_{j2}, \ldots, \lambda_{jn}$, the n pulses being delayed one from another by a time t(D") very closed to the time t(D).

Means 14 can be achieved among different modes of realization described by FIGS. 10a, 10b and 10c.

In the mode of realization of FIG. 10a, the means 14 comprise a fiber optic circulator $14_1$ that drives the light from the optical fiber 13 to the optical fiber $14_2$. The optical fiber $14_2$ comprises m*n mirrors $141_1, 141_2, \ldots, 141_n, 142_1, 142_2, \ldots, 142_n, \ldots, 14j_1, 14j_2, \ldots, 14j_n, \ldots, 14m_1, 14m_2, \ldots, 14m_j, \ldots, 14m_n$ that selectively reflect respectively the wavelength $\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn}$. The m*n mirrors are Fiber Bragg Gratings. The m*n mirrors are gathered into n groups $G_1=(141_1, 142_1, \ldots, 14j_1, \ldots, 14m_1), G_2=(141_2, 142_2, \ldots, 14j_2, \ldots, 14m_2), \ldots G_n=(141_n, 142_n, \ldots, 14j_n, \ldots, 14m_n)$, each group containing m mirrors successively written along the optical fiber $14_2$. For $1 \leq j \leq m$, the n mirrors $14j_1, 14j_2, \ldots, 14j_n$ are distant one from another by a single trip optical path equal to D"/2. The light reflected by the mirrors gets back to circulator $14_1$, and to the optical fiber 13. At the output of means 14, the light pulse $P_k(\lambda_{11}, \lambda_{12}, \ldots, \lambda_{1n}, \lambda_{21}, \lambda_{22}, \ldots, \lambda_{2n}, \ldots, \lambda_{j1}, \lambda_{j2}, \ldots, \lambda_{jn}, \ldots, \lambda_{m1}, \lambda_{m2}, \ldots, \lambda_{mn})$ gives rise to the m groups 111, 112, ..., 11j, ..., 11m, each of the m groups 11j being made up of n pulses $P_k(\lambda_{j1}), P_k(\lambda_{j2}), \ldots, P_k(\lambda_{jn})$ of specific wavelength respectively $\lambda_{j1}, \lambda_{j2}, \ldots, \lambda_{jn}$, the n light pulses $P_k(\lambda_{j1}), P_k(\lambda_{j2}), \ldots, P_k(\lambda_{jn})$ being time delayed one from another by the time t(D") corresponding to the time propagation of light through the round trip between two successive mirrors $14j_{i+1}, 14j_i$ ($1 \leq i \leq n-1$).

In the mode of realization of FIG. 10b, the means 14 comprise a fiber optic circulator $14_1$ that drives the light from the optical fiber 13 to the optical fiber $14_2$, a wavelength band demultiplexer $14_3$ of type <<1 input towards m outputs>> that separates the m bands $B_1, B_2, \ldots, B_j, \ldots, B_m$ at its input, onto m optical fibers, respectively $14_{2,1}, 14_{2,2}, \ldots, 14_{2,j}, \ldots, 14_{2,m}$. Each of the m optical fibers $14_{2,1}, 14_{2,2}, \ldots, 14_{2,j}, \ldots, 14_{2,m}$ is ended by means respectively 161, 162, ..., 16j, ..., 16m. The means 161, 162, ..., 16j, ..., 16m are built in accordance with the means 160 described in FIG. 5b. More precisely, the means 16j, $1 \leq j \leq m$, comprise an optical fiber $14_{2,j}$ and a wavelength demultiplexer 14j of type <<1 input towards n outputs>> separating the n wavelengths $\lambda_{j1}, \lambda_{j2}, \lambda_{j3}, \ldots, \lambda_{jn}$ of the light pulse $P_k=P_k(\lambda_{j1}, \lambda_{j2}, \lambda_{j3}, \ldots, \lambda_{jn})$ onto n optical fibers $142_{j1}, 142_{j2}, 142_{j3}, \ldots, 142_{jn}$. Each of the n optical fibers $142_{j1}, 142_{j2}, 142_{j3}, \ldots, 142_{jn}$ is ended by a mirror, respectively $14j_1, 14j_2, 14j_3, \ldots, 14j_n$, selective or not in wavelength. In addition, the fiber optic section $142_{j,(i+1)}$ (between the output of the demultiplexer $14_j$ and mirror $14j_{i+1}$) and the fiber optic section $142_{j,i}$ (between the output of the demultiplexer 14j and mirror 14j$_i$) where $1 \leq i \leq n-1$ form optical paths of difference D''/2.

In the mode of realization of FIG. 10c, the means 14 comprise means 14a separating the m*n wavelengths of the output light of the optical switch 120 into n packets of m wavelengths each ($\lambda_{11}, \lambda_{21}, \ldots, \lambda_{m1}$), ($\lambda_{12}, \lambda_{22}, \ldots, \lambda_{m2}$), ($\lambda_{13}, \lambda_{23}, \ldots, \lambda_{m3}$), ..., ($\lambda_{1n}, \lambda_{2n}, \ldots, \lambda_{mn}$), respectively onto the n optical fibers 142$_1$, 142$_2$, 142$_3$, ..., 142$_n$, means 14b re-combining the n packets of wavelengths onto the optical fiber 13.

In addition, the difference of the two optical paths formed by the two fiber sections 142$_i$ and 142$_{(i+1)}$, $1 \leq i \leq n-1$, is equal to D''. Means 14a and 14b can be formed by a set of interleavers.

Figure 10D:
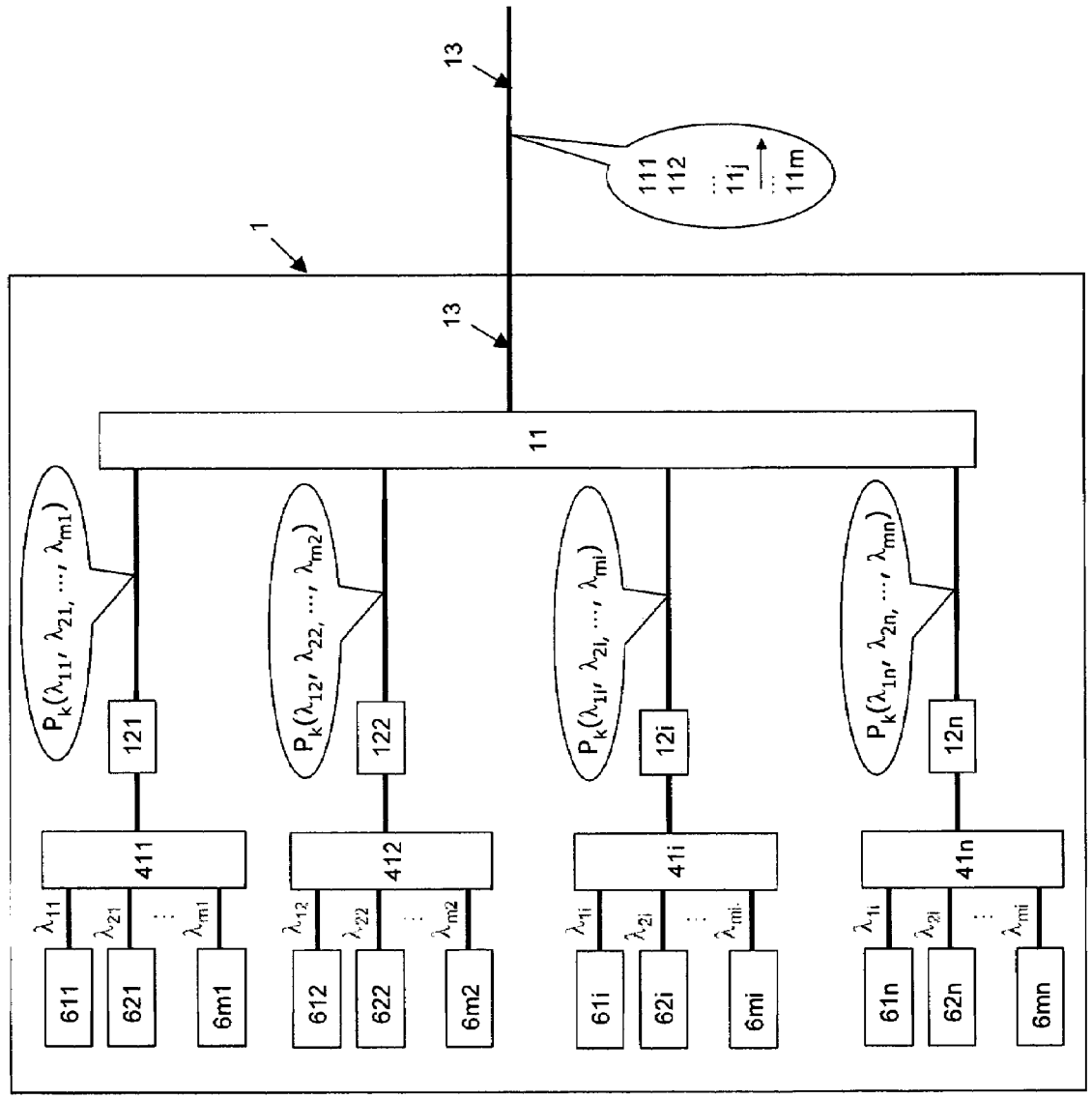

The means 1 can be achieved among the mode of realization described by FIGS. 10d where they comprise m*n optical source emitting a continuous wave light of specific wavelength ($\lambda_{11}, \lambda_{21}, \ldots, \lambda_{m1}, \lambda_{12}, \lambda_{22}, \ldots, \lambda_{m2}, \ldots, \lambda_{1n}, \lambda_{2n}, \ldots, \lambda_{mn}$), a set of n wavelength multiplexers 411, 412, ..., 41i, ..., 41n of type <<m inputs towards one output>>, each of the n multiplexers 41i, $1 \leq i \leq n$, combining the m wavelengths $\lambda_{1i}, \lambda_{2i}, \ldots, \lambda_{mi}$ onto an optical switch 12i, n optical switches 121, 122, ..., 12i, ..., 12n that generates the n pulses of light respectively, $P_k(\lambda_{11}, \lambda_{21}, \ldots, \lambda_{m1})$, $P_k(\lambda_{12}, \lambda_{22}, \ldots, \lambda_{m2})$, ..., $P_k(\lambda_{1i}, \lambda_{2i}, \ldots, \lambda_{mi})$, ..., $P_k(\lambda_{1n}, \lambda_{2n}, \ldots, \lambda_{mn})$ time delayed one from another by the time t(D''), means 11 that combine the n light pulses $P_k(\lambda_{11}, \lambda_{21}, \ldots, \lambda_{m1})$, $P_k(\lambda_{12}, \lambda_{22}, \ldots, \lambda_{m2})$, ..., $P_k(\lambda_{1i}, \lambda_{2i}, \ldots, \lambda_{mi})$, ..., $P_k(\lambda_{1n}, \lambda_{2n}, \ldots, \lambda_{mn})$ onto the optical fiber 13. The m groups 111, 112, ..., 11j, ..., 11m are thus formed onto the optical fiber 13. The means 11 can be built with a set of interleavers.

Figure 11:
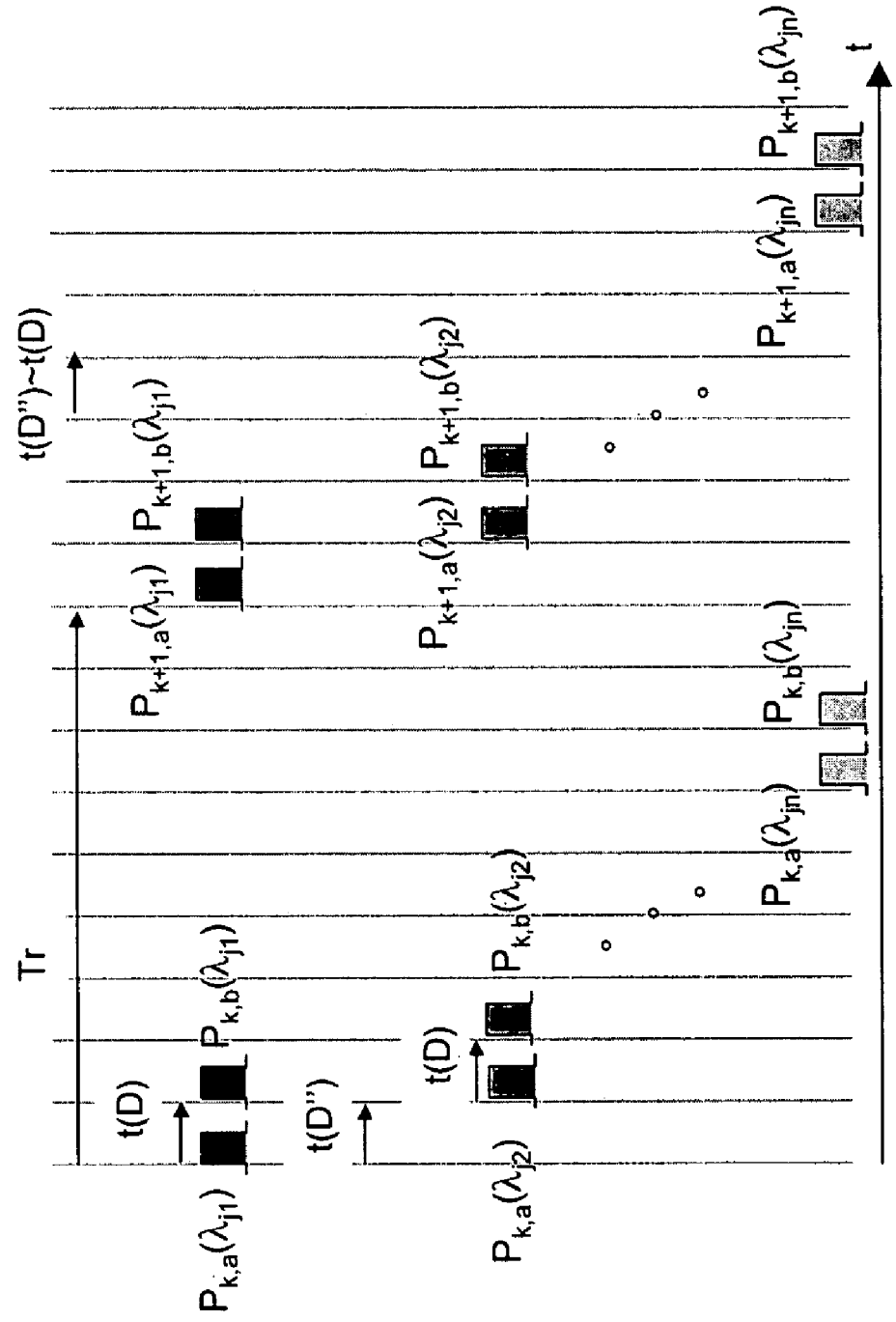
FIG. 11 is a representation of the $j^{th}$ group, $1 \leq j \leq m$, of n couples of light pulses, resulting from the $j^{th}$ group of n light pulses represented in FIG. 10, at the output of the reference interferometer.

FIG. 11 represents the group 21j ($1 \leq j \leq m$) of n couples of light pulses resulting at the output of reference interferometer 2, from the group 11j of n light pulses. More precisely, at the output of means 1, the group 11j of n light pulses $P_k(\lambda_{j1})$, $P_k(\lambda_{j2})$, ..., $P_k(\lambda_{jn})$ of wavelength respectively $\lambda_{j1}, \lambda_{j2}, \ldots, \lambda_{jn}$ and delayed one from another by the time t(D''), is driven by the optical fiber 13 to the reference interferometer 2. The reference interferometer 2 is formed by the two optical paths 2a and 2b of difference D, very closed to the optical path D''. Thus, each of the n pulses $P_k(\lambda_{j1})$, $P_k(\lambda_{j2})$, ..., $P_k(\lambda_{jn})$ entering the reference interferometer 2 gives rise at its output to a couple of pulses, respectively [$P_{k,a}(\lambda_{j1})$, $P_{k,b}(\lambda_{j1})$], [$P_{k,a}(\lambda_{j2})$, $P_{k,b}(\lambda_{j2})$], ..., [$P_{k,a}(\lambda_{jn})$, $P_{k,b}(\lambda_{jn})$]. The two pulses of each of the n couples [$P_{k,a}(\lambda_{j1})$, $P_{k,b}(\lambda_{j1})$], [$P_{k,a}(\lambda_{j2})$, $P_{k,b}(\lambda_{j2})$], ..., [$P_{k,a}(\lambda_{jn})$, $P_{k,b}(\lambda_{jn})$] are time delayed one from another by the time difference t(D) corresponding to the time propagation of light through the optical path difference between paths 2a et 2b. Thus, at the output of reference interferometer 2, the group 21j made up of n couples of light pulses [$P_{k,a}(\lambda_{j1})$, $P_{k,b}(\lambda_{j1})$], [$P_{k,a}(\lambda_{j2})$, $P_{k,b}(\lambda_{j2})$], ..., [$P_{k,a}(\lambda_{jn})$, $P_{k,b}(\lambda_{jn})$] is formed, the two pulses of each of the n couples being delayed one from another by the time t(D), the n couples being delayed one from another by the time t(D'') very closed to t(D).

Figure 12:
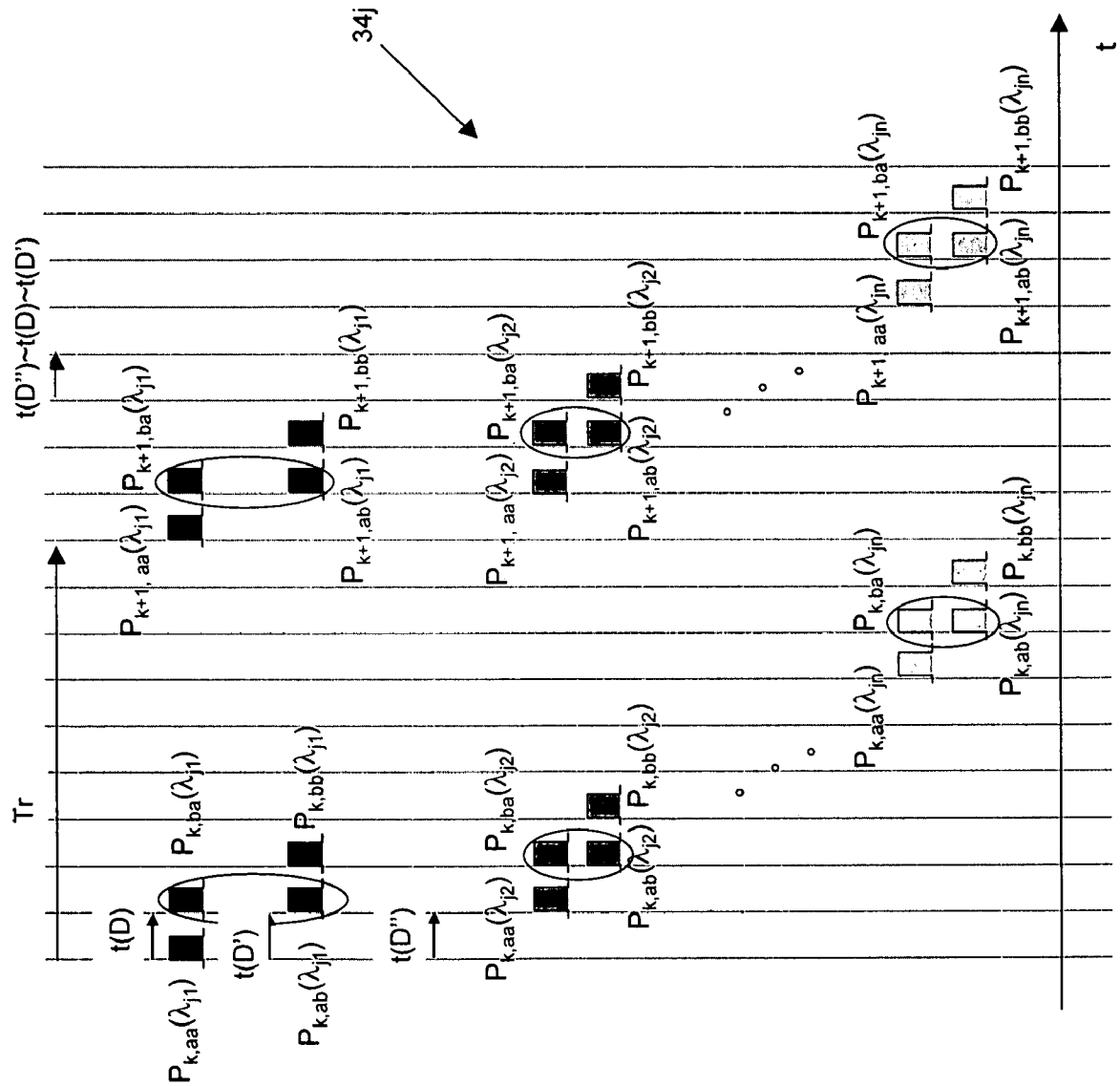
FIG. 12 is a representation of the $j^{th}$ group, $1 \leq j \leq m$, of n*2 couples of light pulses, resulting from the $j^{th}$ group of n couples of light pulses represented in FIG. 11, at the output of the $j^{th}$ n FOIS-node.

FIG. 12 represents the group 34j ($1 \leq j \leq m$) of n*2 couples of light pulses, resulting from the group 21j of n couples of pulses at the output of a group 5j of n fiber optic interferometric sensors located at the same point and set into a 'star' like arrangement around the input point of the group 5j.

Figure 13:
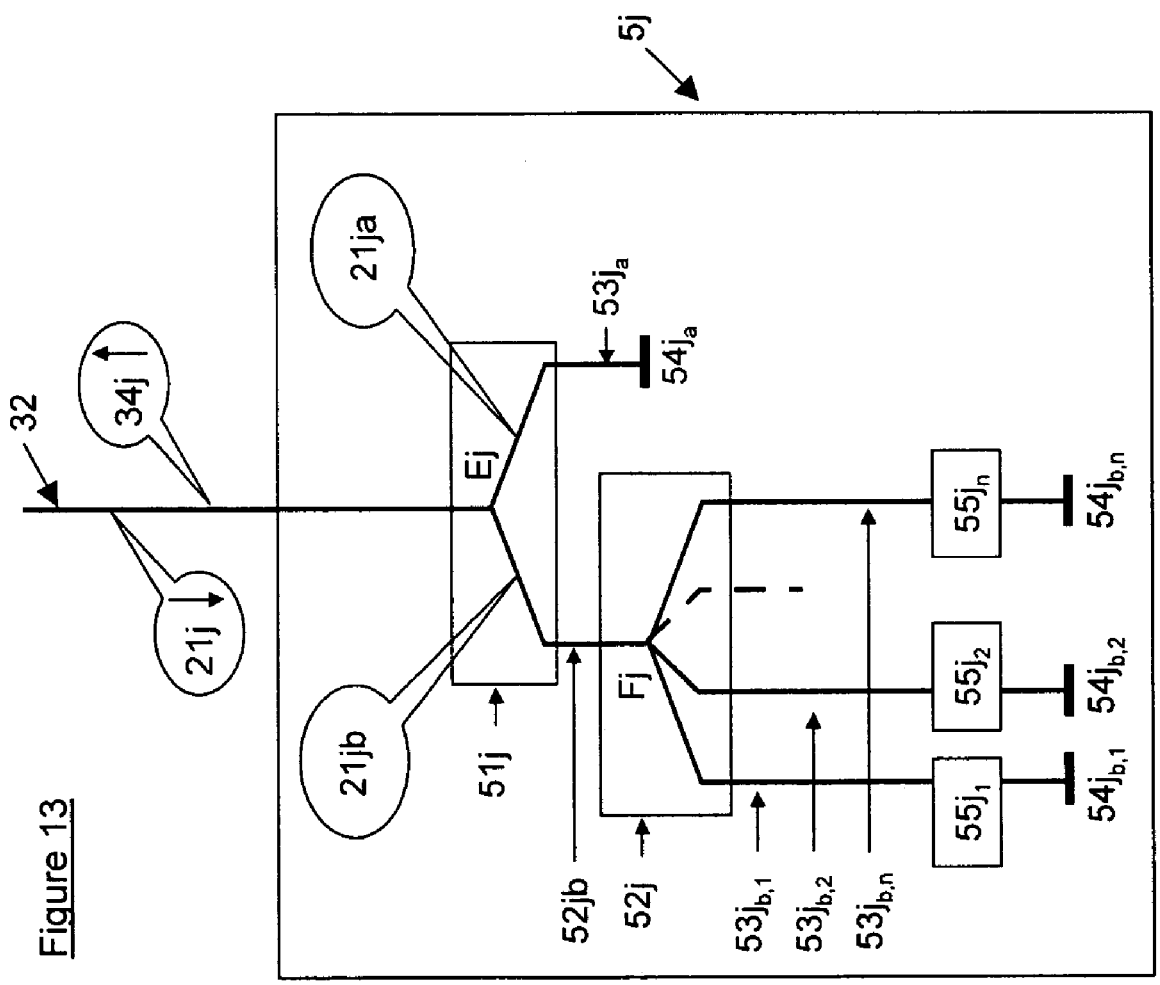
FIG. 13 shows a scheme of one possible way of construction for one n FOIS-node j, $1 \leq j \leq m$, of FIG. 9; the n FOISs of the aforementioned node j being spread out around the input point of the node in a 'star' arrangement.

The group 5j ($1 \leq j \leq m$) is similar to the group 50 and can thus be built in accordance with the two modes of realization for the group 50 described by FIGS. 8a and 8b. One mode of realization for the group 5j is described in FIG. 13; it is similar to that described by FIG. 8a for the building of group 50. More precisely, in the mode of realization presented by FIG. 13, the n fiber optic interferometric sensors share the same short arm forming the short optical path of the interferometers. The shared short arm is made up of the fiber optic section 53j$_a$ delimited by the input point Ej (of the group 5j) and a reference mirror 54j$_a$. In addition the n interferometric sensors each comprise a long arm of its own forming the long optical path of each interferometer. The n long arms of the n interferometric sensors are each made up of the fiber optic section 520$_b$ delimited by the input point Ej and point Fj (the fiber section 52j$_b$ is common to all the sensors), added to the distinct fiber optic section for each of the n sensors respectively 53j$_{b,1}$, 53i$_{b,2}$, ..., 53j$_{b,n}$ delimited by point Fj and mirrors 54j$_{b,1}$, 54j$_{b,2}$, ..., 54j$_{b,n}$ respectively. The n fiber optic interferometric sensors comprise each a compliant body respectively 55j$_1$, 55j$_2$, ..., 55j$_n$, on which fiber optic sections 53j$_{b,1}$, 53j$_{b,2}$, ..., 53j$_{b,n}$ are respectively arranged. The round trip optical path difference between the long and short arms of each of the n fiber optic interferometric sensors of group 5j is equal to D' and is very closed to the optical path difference D of the reference interferometer 2. In the mode of realization presented by FIG. 13, the n mirrors 54j$_{b,1}$, 54j$_{b,2}$, ..., 54j$_{b,n}$ can either be selective or not in wavelength. If the n mirrors 54j$_{b,1}$, 54j$_{b,2}$, ..., 54j$_{b,n}$ are wavelength selective, they preferentially are Fiber Bragg Gratings that selectively reflects, respectively, wavelength $\lambda_{j1}, \lambda_{j2}, \ldots, \lambda_{jn}$. In the mode of realization presented by FIG. 13, mirror 54j$_a$ is a non wavelength selective mirror that reflects all the wavelengths $\lambda_{j1}, \lambda_{j2}, \ldots, \lambda_{jn}$. The group 21j of n couples of light pulses [$P_{k,a}(\lambda_{j1})$, $P_{k,b}(\lambda_{j1})$], [$P_{k,a}(\lambda_{j2})$, $P_{k,b}(\lambda_{j2})$], ..., [$P_{k,a}(\lambda_{jn})$, $P_{k,b}(\lambda_{jn})$] entering the group 5j of n fiber optic interferometric sensors is driven by fiber optic 32 to a fiber optic coupler 51j of type <<1 input towards 2 outputs>>. The group 21j of n couples of light pulses is thus power divided into two groups 21ja and 21jb of n couples of light pulses, carried respectively by fiber 53j$_a$ and 52i$_b$. The group 21ja is carried by the short optical path 53j$_a$ shared by the n fiber optic interferometric sensors, and reflected by the non wavelength selective mirror 54ja; it is then recoupled into the optical fiber 32 by the fiber optic coupler 51j: back onto the fiber optic 32, the group 21ja is made up of n couples of light pulses [$P_{k,aa}(\lambda_{j1})$, $P_{k,ba}(\lambda_{j1})$], [$P_{k,aa}(\lambda_{j2})$, $P_{k,ba}(\lambda_{j2})$], ..., [$P_{k,aa}(\lambda_{jn})$, $P_{k,ba}(\lambda_{jn})$], the n couples being time delayed one from another by the time t(D''), the 2 pulses of each couple being time delayed one from another by the time t(D), the times t(D'') being very closed to the time t(D). The group 21jb of n couples of light pulses, formed onto the optical fiber 52jb, is driven to a wavelength demultiplexer 52j of type <<1 input towards n outputs>>. The wavelength demultiplexer 52j separates the group 21jb of n couples of pulses into n couples of pulses, respectively [$P_{k,ab}(\lambda_{j1})$, $P_{k,bb}(\lambda_{j1})$] onto the optical fiber 53j$_{b,1}$, [$P_{k,ab}(\lambda_{j2})$, $P_{k,bb}(\lambda_{j2})$] onto the optical fiber 53j$_{b,2}$, ..., [$P_{k,ab}(\lambda_{jn})$, $P_{k,bb}(\lambda_{jn})$] onto the optical fiber 53j$_{b,n}$. The optical fibers 53j$_{b,1}$, 53j$_{b,2}$, ..., 53j$_{b,n}$ are ended respectively by the mirrors 54j$_{b,1}$, 54j$_{b,2}$, ..., 54j$_{b,n}$. The n couples of pulses [($P_{k,ab}(\lambda_{j1})$, $P_{k,bb}(\lambda_{j1})$], [($P_{k,ab}(\lambda_{j2})$, $P_{k,bb}(\lambda_{j2})$), ..., [($P_{k,ab}(\lambda_{jn})$, $P_{k,bb}(\lambda_{jn})$] are then reflected respectively by the mirrors 54j$_{b,1}$, 54j$_{b,2}$, ..., 54j$_{b,n}$ and driven back to the wavelength demultiplexer 52j respectively by the optical fibers 53j$_{b,1}$, 53j$_{b,2}$, ..., 53j$_{b,n}$. The wavelength demultiplexer 52j (that works symmetrically regarding the light sense of propagation) combines the n couples of pulses [($P_{k,ab}(\lambda_{j1})$, $P_{k,bb}(\lambda_{j1})$], [($P_{k,ab}(\lambda_{j2})$, $P_{k,bb}(\lambda_{j2})$], ..., [($P_{k,ab}(\lambda_{jn})$, $P_{k,bb}(\lambda_{jn})$] back onto the optical fiber 52jb. The recombined group of n couples of pulses [$P_{k,ab}(\lambda_{j1})$, $P_{k,bb}(\lambda_{j1})$], [$P_{k,ab}(\lambda_{j2})$, $P_{k,bb}(\lambda_{j2})$], ..., $P_{k,ab}(\lambda_{jn})$, $P_{k,bb}(\lambda_{jn})$ is then recoupled onto the optical fiber 32 by the fiber optic coupler 51j. Back onto the optical fiber 32, the group 21jb is thus made up of n couples of pulses [$P_{k,ab}(\lambda_{j1})$, $P_{k,bb}(\lambda_{j1})$], [$P_{k,ab}(\lambda_{j2})$, $P_{k,bb}(\lambda_{j2})$], ..., [$P_{k,ab}(\lambda_{jn})$, $P_{k,bb}(\lambda_{jn})$], the n couples of pulses being time delayed one from another by the time t(D"), the 2 pulses of each couple being time delayed one from another by the time t(D), t(D") and being very closed to t(D). In addition, back onto the optical fiber 32, the two couples of pulses [$P_{k,aa}(\lambda_{j1})$, $P_{k,ba}(\lambda_{j1})$] and [$P_{k,ab}(\lambda_{j1})$, $P_{k,bb}(\lambda_{j1})$] (respectively [$P_{k,aa}(\lambda_{j2})$, $P_{k,ba}(\lambda_{j2})$] and [$P_{k,ab}(\lambda_{j2})$, $P_{k,bb}(\lambda_{j2})$], ..., [$P_{k,aa}(\lambda_{jn})$, $P_{k,ba}(\lambda_{jn})$] and [$P_{k,ab}(\lambda_{jn})$, $P_{k,bb}(\lambda_{jn})$]), from respectively groups 21ja and 21jb, are time delayed one from another by the time t(D') corresponding to the time propagation of light through the round trip optical path difference between the short and long arms of each of the n fiber optic interferometric sensors of group 5j.

Thus, at the output of the node 5j of n fiber optic interferometric sensors, the group 34j of n*2 couples of pulses [$P_{k,aa}(\lambda_{j1})$, $P_{k,ba}(\lambda_{j1})$], [$P_{k,ab}(\lambda_{j1})$, $P_{k,bb}(\lambda_{j1})$], [$P_{k,aa}(\lambda_{j2})$, $P_{k,ba}(\lambda_{j2})$], [$P_{k,ab}(\lambda_{j2})$, $P_{k,bb}(\lambda_{j2})$], ..., [$P_{k,aa}(\lambda_{jn})$, $P_{k,ba}(\lambda_{jn})$], [$P_{k,ab}(\lambda_{jn})$, $P_{k,bb}(\lambda_{jn})$], represented by FIG. 12, is formed: the 2 couples of pulses {[$P_{k,aa}(\lambda_{ji})$, $P_{k,ba}(\lambda_{ji})$], [$P_{k,ab}(\lambda_{ji})$, $P_{k,bb}(\lambda_{ji})$]}, and the 2 couples of pulses {[$P_{k,aa}(\lambda_{j(i+1)})$, $P_{k,ba}(\lambda_{j(i+1)})$], [$P_{k,ab}(\lambda_{j(i+1)})$, $P_{k,bb}(\lambda_{j(i+1)})$]}, $1 \leq i \leq n$, being time delayed one from another by the time t(D"), the 2 couples of pulses [$P_{k,aa}(\lambda_{ji})$, $P_{k,ba}(\lambda_{ji})$] and [$P_{k,ab}(\lambda_{ji})$, $P_{k,bb}(\lambda_{ji})$] being time delayed one from another by the time t(D'), and the two pulses $P_{k,aa}(\lambda_{ji})$ and $P_{k,ba}(\lambda_{ji})$ of couple [$P_{k,aa}(\lambda_{ji})$, $P_{k,ba}(\lambda_{ji})$] and $P_{k,ab}(\lambda_{ji})$ and $P_{k,bb}(\lambda_{ji})$ of couple [$P_{k,ab}(\lambda_{ji})$, $P_{k,bb}(\lambda_{ji})$] being time delayed one from another by the time t(D), the times t(D), t(D') and t(D") being very closed. The group 11j of light pulses being time repeated with a repetition rate Tr, the group 34j of light pulses is time repeated at the same repetition rate.

By construction, the 2 pulses out of each of the fiber optic interferometric sensor i ($1 \leq i \leq n$) of group 5j ($1 \leq j \leq m$), $P_{k,ab}(\lambda_{ji})$ and $P_{k,ba}(\lambda_{ji})$, get to the photo-detector 7j at the same time, and the optical fields (born by the two pulses) can interfere together. The light pulse $P_{k,ba}(\lambda_{ji})$ carried by the long optical path 2b of reference interferometer 2 and the short optical path of the fiber optic interferometric sensor i of group 5j is not subjected to any external perturbation, whereas pulse $P_{k,ab}(\lambda_{ji})$ carried by the short optical path 2a of reference interferometer 2 and the long optical path of the fiber optic interferometric sensor i is subjected to the external perturbations. Also, by construction and thanks to means 1 ensuring the time separation of the wavelengths $\lambda_{ji}$, $1 \leq i \leq n$ at the optical sources level the group 5j of n fiber optic interferometric sensors located at the same point and set into a 'star' like arrangement around the input point Ej of the group 5j, each sensor i of the group 5j being associated with a distinct wavelength $\lambda_{ji}$ of the present invention, the n fiber interferometric signals resulting from the n fiber optic sensors are time delayed on the photo-detector 7j, without the need to add fiber optic sections of accurate length in between any two sensors, or without making use of the long sensitive arms of the sensors. The separation of the n interferometric signals from the n fiber optic interferometric sensors can thus be achieved through the time gating of the pulses. The demodulator 8j at the output of photo-detector 7j allows to continuously compute the phase difference between the optical fields born by pulses $P_{k,ab}(\lambda_{ji})$ and $P_{k,ba}(\lambda_{ji})$ ($1 \leq i \leq n$), and thus to evaluate the external perturbations locally applied on each fiber optic interferometric sensor of the group 5j.

As for the separation of the interferometric signals of the interferometers of any two different groups, it is achieved by wavelength band demultiplexing through the means 61, 62, ..., 6j.

The advantages of the system shown by FIG. 9 are similar to those of the system described by FIG. 4. Indeed the time delays in between the n interferometric signals of a group of n time-multiplexed interferometric sensors are generated by means 1 at the level of the optical sources, and not at the level of the sensors themselves in accordance to previous art systems. In addition, the 'star' like arrangement of the n fiber interferometric sensors of a group 5j, $1 \leq j \leq m$, doesn't affect the time delays generated by the means 1. Thus, on the contrary to the previous art systems, there is no need to add fiber sections of accurate length in between any two sensors, reducing the system building costs and increasing its reliability; the fiber optic sections forming the long arm and sensitive part of each sensor are not used neither, reducing the Cross Talk between the multiplexed sensors. Besides, groups 51, 52, ..., 5m being multiplexed in wavelength band, their distribution along the optical fiber 32 can be any: any two groups can be distant by any fiber length.

The interrogation system S, comprising means 1 and reference interferometer 2, can be efficiently shared by several sub arrays, each made up of m groups of n sensors. FIG. 14 is a schematic of a system in accordance with the present invention, increasing the multiplexing density of the system described by FIG. 9 to l sub arrays, each made up of m nodes (or groups) of n interferometric sensors, and in which, the n fiber optic sensors of a same node are located at the same point, the m nodes of each of the l sub arrays can be spaced by any fiber length, and the distribution of the l sub arrays of the system can be any. Such a system comprises a single interrogation system S described in FIG. 9, of which light is coupled to a fiber optic coupler 310 of type <<1 input towards l outputs>>. The fiber optic coupler 310 divides the light power out from the interrogation system S, onto l optical fibers 311, 312, ..., 31r, ..., 31l. The latest feed l sub arrays respectively 91, 92, ..., 9y, ... 9l, each made up of m nodes of n sensors. The sub arrays 91, 92, ..., 9y, ... 9l are similar to the sub array 90 shown in FIG. 9.

The advantages of the system shown by FIG. 14 are similar to those of the system described by FIG. 9. Indeed the time delays in between the n interferometric time multiplexed signals, of a group 5j ($1 \leq j \leq m$) of sub array y ($1 \leq y \leq l$), are generated by means 1 at the level of the optical sources, and not at the level of the sensors themselves in accordance to previous art systems. In addition, the 'star' like arrangement of the n fiber interferometric sensors of a group 5j, $1 \leq j \leq m$, doesn't affect the time delays generated by the means 1. Thus, whereas the previous art systems multiplexing l*m*n sensors require to add l*m*n fiber sections of accurate length in between any two sensors, in the system described by FIG. 14 and proposed here, this fabrication constraint doesn't hold; more precisely, the time delays between the time multiplexed interferometric signals from the sensors are generated one for all at the level of the means 1. The fiber optic sections forming the long arm and sensitive part of each sensor are not used neither, reducing the Cross Talk between the multiplexed sensors.

FIG. 15 shows a fiber optic circulator. This component is used in the previous art systems and in the present invention. In a fiber optic circulator, the light propagation is possible only from point A to point B and from point B to point C. The light propagation from point B to point A and from point B to point C is not permitted. This component operates non selectively regarding the wavelength of the light.

FIG. 16 shows a fiber optic coupler of type <<1 input E towards k outputs, S1, S2, . . . , Sk>>. This component is used in the previous art systems as a type <<1 input towards 2 outputs>>, and is used in the present invention as a type <<1 input towards ≧2 outputs . In a fiber optic coupler, the propagation of light is permitted in both directions, i.e. from the input E to the k outputs S1, S2, . . . , Sk or from each of the k outputs S1, S2, . . . , Sk to the input E. Thus a light with intensity I at the input E of the coupler is transmitted into the k outputs S1, S2, . . . , Sk, the optical intensity I1, I2, . . . , Ik of the transmitted lights into each of the k output fibers S1, S2, . . . , Sk respectively is equal to I/k. This component operates non selectively regarding the wavelength of the light.

FIG. 17a represents the reflection and transmission properties of a non wavelength selective mirror 54 lit up by a broad band light source 100. This component is used in the previous art systems and in the present invention.

FIG. 17b represents the reflection and transmission properties of a Fiber Bragg Grating $54j_{b,i}$ lit up by a broad band light source 100: the light reflected by the component is a thin wavelength band around the Bragg wavelength $\lambda_{ji}$, whereas the transmitted light spectrum is the complement of the reflected light spectrum.

FIGS. 18a, 18b and 18c represents several reflection and transmission properties allowed for mirrors $54_{ja}$ ($0 \leq j \leq m$) of the present invention. They can be non wavelength selective (FIG. 18a), selective in wavelength bands (FIG. 18b) or selective in wavelength (FIG. 18c).

Lit up by a broad band source, the component $54_{ja}$ in FIG. 18b selectively reflects the wavelength band $B_j$ and transmits the complement spectrum.

Lit up by a broad band source, the component $54_{ja}$ in FIG. 18c selectively reflects the n wavelengths $\lambda_{j1}, \lambda_{j2}, \ldots, \lambda_{jn}$ in the band $B_j$ and transmits the complement spectrum.

FIG. 19 shows a wavelength demultiplexer of type <<1 input towards n outputs>>. This component is used in the previous art systems and in the present invention. A wavelength demultiplexer separates the n wavelengths $\lambda_1, \lambda_2, \ldots, \lambda_i, \ldots, \lambda_n$ of a light coupled at its input $D_0$ onto its n outputs $D_1, D_2, \ldots, D_j, \ldots, D_n$. The light propagation is permitted in the two directions; therefore the component can operate as a wavelength demultiplexer or as a wavelength.

FIG. 20 shows a 'wavelength dropper'. This component is used in the previous art systems. A '$\lambda_i$ wavelength dropping component' extracts the wavelength $\lambda_i$ on its output $Ej_2$ from an n wavelength $\lambda_1, \lambda_2, \ldots, \lambda_i, \ldots, \lambda_n$ light coupled at its input $Ej_1$; the (n−1) remaining wavelengths $\lambda_1, \lambda_2, \ldots, \lambda_{i-1}, \lambda_{i+1}, \ldots, \lambda_n$ are transmitted on its output $E_{j3}$. The light propagation is permitted in the two directions, therefore the component can operate as a 'wavelength dropper' or a 'wavelength insertion' component.

FIG. 21 shows a wavelength band demultiplexer of type <<1 input towards m outputs>>. The component is used in the present invention. A wavelength band demultiplexer separates the m wavelength bands $B_1, B_2, \ldots, B_j, \ldots, B_n$ of a light coupled at its input $D_0$, into m outputs $D_1, D_2, \ldots, D_j, \ldots, D_m$. The light propagation is permitted in the two directions, therefore the component can operate as a wavelength band demultiplexer or multiplexer.

FIG. 22 shows a 'wavelength band dropper'. This component is used in the present invention. A '$B_j$ wavelength band dropper' extracts the wavelength band $B_j$ on its output $Ej_2$ from an m wavelength bands $B_1, B_2, \ldots, B_j, \ldots, B_m$ light coupled at its input $Ej_1$ ; the (m−1) remaining bands $B_1, B_2, \ldots, B_{j-1}, B_{j+1}, \ldots, B_m$ are transmitted on its output $E_{j3}$. The light propagation is permitted in the two directions, therefore the component can operate as a 'wavelength band dropper' or a 'wavelength band insertion' component.

FIG. 23 shows an <<inter leaver>> component. The component is used in the present invention. A light made up of a wavelength comb ($\lambda_1, \lambda_2, \lambda_3, \lambda_4, \lambda_5, \lambda_6, \ldots, \lambda_{2n}, \lambda_{2n+1}$) with a $\Delta\lambda$ wavelength spacing, coupled at the input I of the inter leaver is separated onto its two outputs $S_1$ and $S_2$, into two lights made up of the combs respectively ($\lambda_1, \lambda_3, \lambda_5, \ldots, \lambda_{2n+1}$) and ($\lambda_2, \lambda_4, \lambda_6, \ldots, \lambda_{2n}$) with a $2.\Delta\lambda$ wavelength spacing. The light propagation is permitted in the two directions.

The present invention is not limited to the only modes of realization described above. More precisely, the fiber optic interferometric sensors can be Fabry Perot interferometers or any interferometric means, selective in wavelength and allowing the proposed time multiplexing.

In the present description, one single reference mirror 54ja ($0 \leq j \leq m$) is used in per node of sensors, nevertheless, one reference mirror can be used per sensor.

The invention claimed is
1. Apparatus for multiplexing Fiber Optic Interferometric Sensors (FOISs), which apparatus comprises:
   means (1) forming an optical source for providing m*n distinct wavelengths $\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn}$, the optical source including means for generating m groups (111, 112, . . . , 11m) of light pulses, each group 11j ($1 \leq j \leq m$) being made up of n light pulses $P_k(\lambda_{j1}), P_k(\lambda_{j2}), \ldots, P_k(\lambda_{jn})$ of distinct wavelengths $\lambda_{j1}, \lambda_{j2}, \ldots, \lambda_{jn}$, the n light pulses $P_k(\lambda_{j1}), P_k(\lambda_{j2}), \ldots, P_k(\lambda_{jn})$ being time delayed one from another,
   Fiber Optic Interferometric Sensors arranged to receive light pulses from the optical source, the sensors distributed in m groups (51, 52, . . . , 5m) of n sensors each, the n sensors of a same group being located at the same point and set into a star like arrangement around the input point of the group, and each of the n sensors of a same group 5j, $1 \leq j \leq m$, being associated with wavelength selective means so that it is interrogated by one light pulse only among the pulses $P_k(\lambda_{j1}), P_k(\lambda_{j2}), \ldots, P_k(\lambda_{jn})$ of distinct wavelengths respectively $\lambda_{j1}, \lambda_{j2}, \ldots, \lambda_{jn}$.

2. Apparatus according to claim 1, further comprising a reference interferometer (2), arranged to receive light pulses comprising an optical field from the optical source, the reference interferometer made up of a short arm (2a) and a long arm (2b) forming two optical paths defining a difference equal to an optical path D, one of the two arms comprising means (21) for actively phase modulating the optical field that propagates through it and arranged to send the modulated optical field to the Fiber Optic Interferometric Sensors.

3. Apparatus according to claim 1, in which the means (1) forming the optical source comprise
   m*n optical sources (611, 612, . . . , 61n, . . . , 621, 622, . . . , 62n, . . . , 6m1, 6m2, . . . , 6mn),
   a wavelength multiplexer (11),
   an optical switch (120) for generating a light pulse $P_k(\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn})$,
   means (14) for generating, from a light pulse $P_k(\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn})$,
   m groups of light pulses 111, 112, . . . , 11m, each of the m group 11j, $1 \leq j \leq m$, being made up of n light pulses $P_k(\lambda_{j1}), P_k(\lambda_{j2}), \ldots, P_k(\lambda_{jn})$ of distinct wavelengths respectively $\lambda_{j1}, \lambda_{j2}, \ldots, \lambda_{jn}$ and delayed one from another by a time t(D"), the time t(D") corresponding to the time of light propagation through an optical path D", within the means (14) for generating light pulses, and the time t(D") being very close to the time t(D) corresponding to the time of light propagation through the optical path D.

4. Apparatus according to claim 3, in which the means (14) comprise an optical fiber ($14_2$) along which n groups $G_1$, $G_2, \ldots, G_n$ of mirrors are successively written, each group $G_i$, $1 \leq i \leq n$, comprising m mirrors ($141_1, 142_1, \ldots, 14mi$), the n mirrors ($14j_1, 14j_2, \ldots, 14j_n$), $1 \leq j \leq m$, being spaced one from another on the fiber ($14_2$) by a round trip optical path equal to D", the m*n mirrors ($141_1, 142_1, \ldots, 14m_1, 141_2, 142_2, \ldots, 14m_2, \ldots, 141_n, 142_n, \ldots, 14m_n$) selectively reflecting the specific wavelength respectively $\lambda_{11}, \lambda_{12}, \ldots, \lambda_{1n}, \lambda_{21}, \lambda_{22}, \ldots, \lambda_{m1}, \lambda_{m2}, \ldots, \lambda_{mn}$.

5. Apparatus according to claim 4, in which the m mirrors ($141_1, 142_1, \ldots, 14m_1, 141_2, 142_2, \ldots, 14m_2, \ldots, 141_n, 142_n, \ldots, 14m_n$) are Fibre Bragg Gratings.

6. Apparatus according to claim 3, in which the means (14) comprise a wavelength band demultiplexer ($14_3$) of type 1 input towards m outputs for separating the m*n specific wavelengths ($\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn}$) into m bands $B_1=(\lambda_{11}, \lambda_{12}, \ldots, \lambda_{1n})$, $B_2=(\lambda_{21}, \lambda_{22}, \ldots, \lambda_{2n}), \ldots, B_m=(\lambda_{m1}, \lambda_{m2}, \ldots, \lambda_{mn})$ of n wavelengths each, towards m means ($161, 162, \ldots, 16m$), each group $16j$, $1 \leq j \leq m$, comprising a wavelength demultiplexer ($14j$) of type 1 input towards n outputs for separating the n wavelengths ($\lambda_{j1}, \lambda_{j2}, \ldots, \lambda_{jn}$) at its input towards n outputs leading to n mirrors $14j_1, 14j_2, \ldots, 14j_n$, the n mirrors selectively reflecting the wavelength respectively $\lambda_{j1}, \lambda_{j2}, \ldots, \lambda_{jn}$, and the difference between the two optical paths delimited, by the mirror $14j_1$ and the associated output of the demultiplexer ($14j$), and the mirror $14j_{i+1}$ and the associated output of the demultiplexer ($14j$), $1 \leq i \leq n$, corresponding to the optical path D"/2.

7. Apparatus according to claim 6, in which the m means ($16j$, $1 \leq j \leq m$) each comprise n optical fibers ($142_{j1}, 142_{j2}, \ldots, 142_{jn}$) leading the n wavelengths $\lambda_{j1}, \lambda_{j2}, \ldots, \lambda_{jn}$ out from the wavelength demultiplexer ($14j$) towards the n mirrors ($14j_1, 14j_2, \ldots, 14j_n$).

8. Apparatus according to claim 6, in which mirrors ($14j_1, 14j_2, \ldots, 14j_n$), $1 \leq j \leq m$, are Fiber Bragg Gratings.

9. Apparatus according to claim 3, in which the means (14) comprise a wavelength demultiplexer of type 1 input towards m*n outputs for separating the m*n specific wavelengths $\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn}$ at its input onto its m*n outputs leading to the m*n mirrors respectively $141_1, 141_2, \ldots, 141_n, 142_1, 142_2, \ldots, 142_n, \ldots, 14m_1, 14m_2, \ldots, 14m_n$, the m*n mirrors selectively reflecting the specific wavelength respectively $\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn}$, and the difference between the two optical paths delimited, by the mirror $14j_i$ and the associated output of the demultiplexer, and the mirror $14j_{i+1}$ and the associated output of the demultiplexer, $1 \leq i \leq n$ and $1 \leq j \leq m$, corresponding to the optical path D"/2.

10. Apparatus according to claim 9, in which the means (14) comprise m*n optical fibers, leading the m*n wavelengths $\lambda_{11}, \lambda_{12}, \ldots, \lambda_{1n}, \lambda_{21}, \lambda_{22}, \ldots, \lambda_{2n}, \ldots, \lambda_{m1}, \lambda_{m2}, \ldots, \lambda_{mn}$, out of the wavelength demultiplexer of type 1 input towards m*n outputs, to m*n mirrors respectively $141_1, 141_2, \ldots, 141_n, 142_1, 142_2, \ldots, 142_n, \ldots, 14m_1, 14m_2, \ldots, 14m_n$.

11. Apparatus according to claim 9, in which the m*n mirrors $141_1, 141_2, \ldots, 141_n, 142_1, 142_2, \ldots, 142_n, \ldots, 14m_1, 14m_2, \ldots, 14m_n$ are Fiber Bragg Gratings.

12. Apparatus according to claim 3, in which the means (14) comprise means ($14a$) for separating the m*n wavelengths $\lambda_{11}, \lambda_{12}, \ldots, \lambda_{1n}, \lambda_{21}, \lambda_{22}, \ldots, \lambda_{2n}, \ldots, \lambda_{m1}, \lambda m_2, \ldots, \lambda_{mn}$ at its input into n packets of m wavelengths each ($\lambda_{11}, \lambda_{21}, \ldots, \lambda_{m1}$), ($\lambda_{12}, \lambda_{22}, \ldots, \lambda_{m2}$), ..., ($\lambda_{1n}, \lambda_{2n}, \ldots, \lambda_{mn}$), onto n fibers, respectively $142_1, 142_2, \ldots, 142_n$, and means ($14b$) for combining the n packets on a single fibre, the difference of the two optical paths formed by two fiber optic sections $142_i$ and $142_{(i+1)}$, $1 \leq i \leq n-1$, corresponding to the optical path D".

13. Apparatus according to claim 12, in which means ($14a$) and ($14b$) are formed by a set of inter leavers.

14. Apparatus according to claim 1, in which the means (1) forming the optical source comprise m*n optical sources each emitting a specific wavelength $\lambda_{11}, \lambda_{12}, \ldots, \lambda_{1n}, \lambda_{21}, \lambda_{22}, \ldots, \lambda_{2n}, \ldots \lambda_{m1}, \lambda_{m2}, \ldots, \lambda_{mn}$, n multiplexers in wavelength $411, 412, \ldots, 41n$ of type m inputs towards one output, each of the n wavelength multiplexers $41i$, $1 \leq i \leq n$, combining the m wavelengths $\lambda_{1i}, \lambda_{2i}, \ldots, \lambda_{mi}$ at its inputs onto its output, n optical switches $121, 122, \ldots, 12n$ at the output of the n multiplexers, respectively $411, 412, \ldots, 41n$ for generating n light pulses $P_k(\lambda_{11}, \lambda_{21}, \ldots, \lambda_{m1})$, $P_k(\lambda_{12}, \lambda_{22}, \ldots, \lambda_{m2}), \ldots, P_k(\lambda_{1n}, \lambda_{2n}, \ldots, \lambda_{mn})$ delayed one from another by a time t(D"), means (11) for combining the n light pulses $P_k(\lambda_{11}, \lambda_{21}, \ldots, \lambda_{m1})$, $P_k(\lambda_{12}, \lambda_{22}, \ldots, \lambda_{m2}), \ldots, P_k(\lambda_{1n}, \lambda_{2n}, \ldots, \lambda_{mn})$ out of the n optical switches $121, 122, \ldots, 12n$ onto a single fiber.

15. Apparatus according to claim 14, which apparatus comprises means for driving the optical switches.

16. Apparatus according to claim 1, in which the m groups ($51, 52, \ldots, 5m$) of n fiber optic interferometric sensors are distributed along an optical fiber (32) and spaced one from another by fiber optic sections ($61_a, 62_a, \ldots, 6(m-1)_a$) of any length.

17. Apparatus according to claim 16, which apparatus comprises means ($61, 62, \ldots, 6m$) for dropping a part of the light carried by optical fiber (32) to the groups respectively $51, 52, \ldots, 5m$.

18. Apparatus according to claim 17, in which means ($61, 62, \ldots, 6m$) are fiber optic wavelength band add/drop components associated with the bands respectively ($B_1, B_2, \ldots, B_m$).

19. Apparatus according to claim 1, in which each group $5j$, $1 \leq j \leq m$, of n fiber optic interferometric sensors, comprises a fiber optic coupler ($51j$) of type 1 input towards 2 outputs, of which one output is coupled to an optical fiber ($53j_a$) ended by a reference mirror ($54j_a$), and of which the other output is coupled to a wavelength demultiplexer ($52j$) of type 1 input towards n outputs for separating the n wavelengths of band $B_j$ at its input onto n fibers ($53j_{b,1}, 53j_{b,2}, \ldots, 53j_{b,n}$) ended by the mirrors respectively ($54j_{b,1}, 54j_{b,2}, \ldots, 54j_{b,n}$).

20. Apparatus according to claim 19, in which for each group $5j$, $1 \leq j \leq m$, of n fiber optic interferometric sensors, the short optical path of each of the n sensors corresponds to the optical path between the input of the fiber optic coupler ($51j$) and the reference mirror ($54j_a$), and the long optical path associated with each of the n sensors corresponds to the optical path between the input of the fiber optic coupler ($51j$) and the n mirrors ($54j_{b,1}, 54j_{b,2}, \ldots, 54j_{b,n}$), the round trip difference between the short and long optical paths being equal to D', and the optical path D' being very close to the optical paths D and D".

21. Apparatus according to claim 19, in which each of the n mirrors ($54j_{b,1}, 54j_{b,2}, \ldots, 54j_{b,n}$), $1 \leq j \leq m$, is a Fiber Bragg Grating selectively reflecting the wavelength respectively ($\lambda_{j1}, \lambda_{j2}, \ldots, \lambda_{jn}$).

22. Apparatus according to claim 19, in which each of the n mirrors ($54j_{b,1}, 54j_{b,2}, \ldots, 54j_{b,n}$), $1 \leq j \leq m$, is not selective in wavelength.

23. Apparatus according to claim 1, in which each group 5j, $1 \leq j \leq m$, of n fiber optic interferometric sensors, comprises a fiber optic coupler of type 1input towards n+1 outputs, of which one output is coupled to an optical fiber ended by a reference mirror ($54j_a$), and of which the other outputs are coupled in n optical fibers ended by the mirrors respectively $54j_{b,1}, 54j_{b,2}, \ldots, 54j_{b,n}$.

24. Apparatus according to claim 23, in which for the group , $1 \leq j \leq m$, of n fiber optic interferometric sensors, the short optical path of each of the n fiber optic interferometric sensors corresponds to the optical path between the input of the fiber optic coupler and the reference mirror ($54j_a$), and in which the long optical paths associated with each of the n sensors correspond to the optical path between the input of the fiber optic coupler and the n mirrors ($54j_{b,1}, 54j_{b,2}, \ldots, 54j_{b,n}$), the round trip difference between the short and long optical paths being equal to D', and the optical path D' being very close to the optical paths D and D".

25. Apparatus according to claim 23, in which for the group 5j, $1 \leq j \leq m$, of n fiber optic interferometric sensors, the n mirrors ($54j_{b,1}, 54j_{b,2}, \ldots, 54j_{b,n}$) are Fiber Bragg Gratings that selectively reflect the wavelength respectively $\lambda_{j1}, \lambda_{j2}, \ldots, \lambda_{jn}$.

26. Apparatus according to claim 23, in which the reference mirror ($54j_a$) associated with group 5j, $1 \leq j \leq m$, is a mirror that selectively reflects the wavelength band $B_j$.

27. Apparatus according to claim 23, in which the reference mirror ($54j_a$) associated with group 5j, $1 \leq j \leq m$, is a mirror that selectively reflects the wavelengths $\lambda_{j1}, \lambda_{j1}, \ldots, \lambda_{jn}$ of band Bj.

28. Apparatus according to claim 23, in which the reference mirror ($54j_a$) associated with group 5j, $1 \leq j \leq m$, is a non wavelength selective mirror.

29. Apparatus according to claim 2, in which the reference interferometer (2) is a Mach-Zehnher interferometer.

30. Apparatus according to claim 1, in which the fiber optic interferometers forming the sensors are Michelson interferometers.

31. Apparatus according to claim 1, which apparatus includes a wavelength band demultiplexer (40), to separate lights of different wavelengths from the optical source, m photo-detectors (71, 72, . . . 7m) arranged to receive and detect separated lights from the demultiplexer, and m demodulators (81, 82, . . . , 8m) arranged to demodulate the deteceted lights from the demultiplexer.

32. Apparatus according to claim 31, which apparatus is capable of interrogating one sub array (90), the sub array (90) comprising at least m groups (51, 52, . . . , 5m) of n fiber optic interferometric sensors, the wavelength band demultiplexer (40), the m photo-detectors (71, 72, . . . 7m) and the m demodulators (81, 82, . . . , 8m).

33. Apparatus according to claim 1, which apparatus is capable of interrogating I sub arrays (91, 92, . . . , 9 I), each made up of m groups (51, 52, . . . , 5m) of n sensors, and coupled by means (310) to the means (1) forming the optical source and the reference interferometer (2).

34. Apparatus according to claim 33, in which the means (310) are made up of a fiber optic coupler of type 1 input towards I outputs.

* * * * *